(12) United States Patent
Fournier et al.

(10) Patent No.: US 11,155,323 B2
(45) Date of Patent: Oct. 26, 2021

(54) UNIVERSAL MOUNTING SYSTEM FOR WATERSPORT TOW BOATS

(71) Applicant: Dukes Marketing LLC, Gilbert, AZ (US)

(72) Inventors: Luke Joseph Fournier, Gilbert, AZ (US); Gerald Geoffrey Lembas, Mesa, AZ (US)

(73) Assignee: Dukes Marketing LLC, Gilbert, AZ (US)

( * ) Notice: Subject to any disclaimer, the term of this patent is extended or adjusted under 35 U.S.C. 154(b) by 30 days.

(21) Appl. No.: 16/789,354

(22) Filed: Feb. 12, 2020

(65) Prior Publication Data

US 2020/0298936 A1 Sep. 24, 2020

Related U.S. Application Data

(60) Provisional application No. 62/804,494, filed on Feb. 12, 2019.

(51) Int. Cl.
*B63B 17/00* (2006.01)
(52) U.S. Cl.
CPC .................................. *B63B 17/00* (2013.01)
(58) Field of Classification Search
CPC ............ B63B 17/00; B63B 2017/0054; B63B 2017/0063; B63B 34/00; G03B 17/561
See application file for complete search history.

(56) References Cited

U.S. PATENT DOCUMENTS

| | | | | |
|---|---|---|---|---|
| 2,195,366 A * | 3/1940 | Haigh | ..................... | B25H 5/00 108/44 |
| 4,669,414 A * | 6/1987 | Molino | ................... | B63B 27/14 114/343 |
| 5,096,102 A * | 3/1992 | Tolson | ..................... | B60R 9/06 224/501 |
| 5,219,105 A * | 6/1993 | Kravitz | .................... | B60R 9/06 224/500 |
| 5,593,076 A * | 1/1997 | Biondo | ..................... | B60R 9/06 224/488 |
| 8,485,207 B1 * | 7/2013 | Boyington | ............ | A45B 11/00 135/88.08 |
| 2003/0205599 A1 * | 11/2003 | Brown | ................... | F41A 23/16 224/401 |

* cited by examiner

*Primary Examiner* — Ajay Vasudeva
(74) *Attorney, Agent, or Firm* — Fish & Richardson P.C.

(57) ABSTRACT

In one implementation, an accessory mount system for a watersport tow boat includes a boat mount that is configured to be attached to a boat mounting surface that is adjacent to or part of a swim platform that extends from a rear of the watersport tow boat. The accessory mount system can further include an accessory arm that includes a first end and a second end, where the first end is configured to be fixedly attached to the accessory arm mounting surface of the boat mount and the second end is configured to be positioned above a top surface of the swim platform when the accessory arm is attached to the watersport tow boat via the boat mount. The accessory mount system can further include an accessory adapter positioned at the second end of the accessory arm.

29 Claims, 75 Drawing Sheets

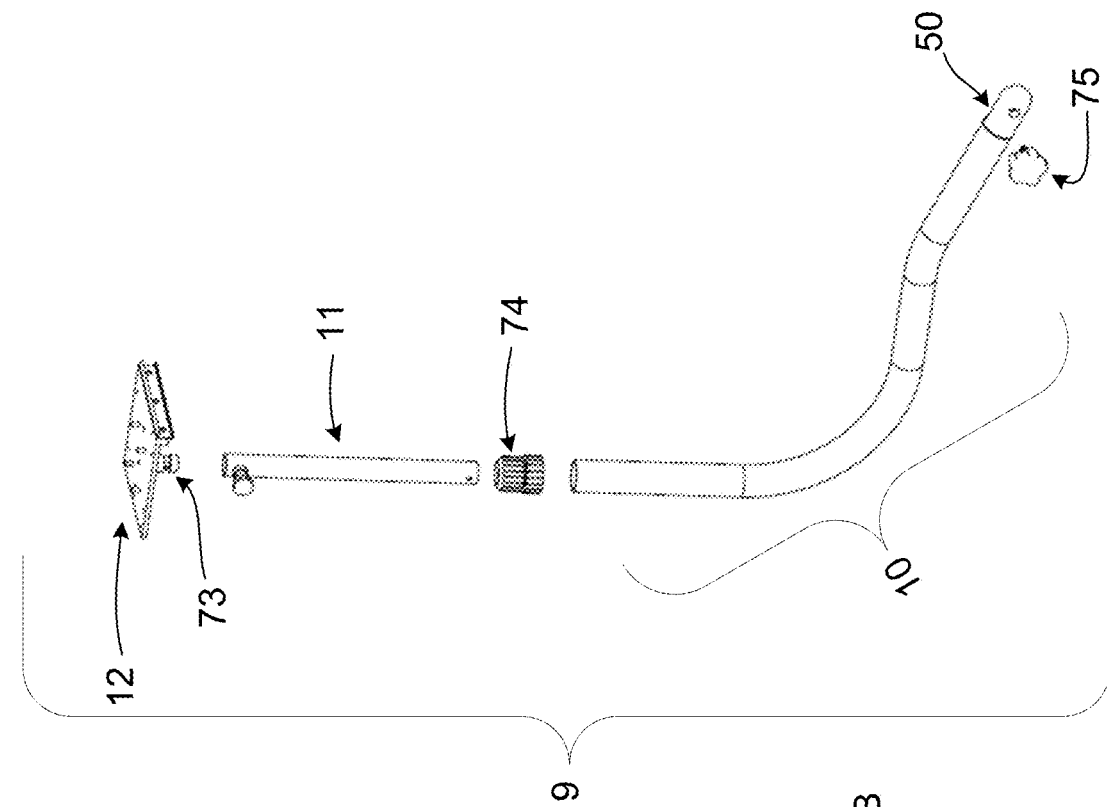
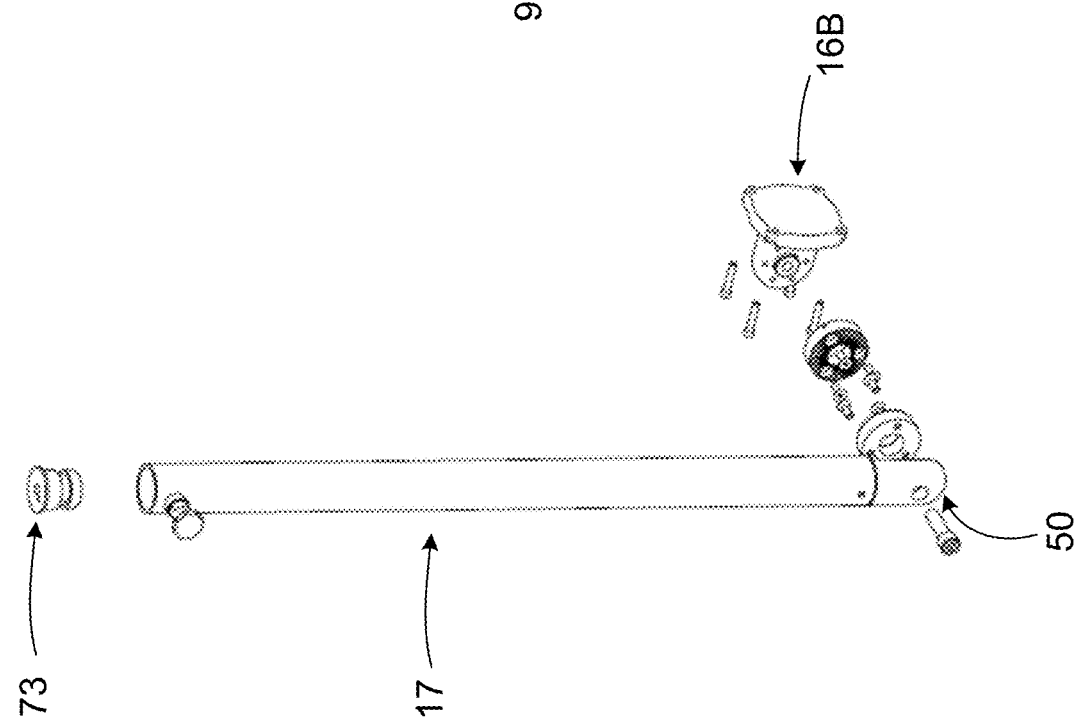

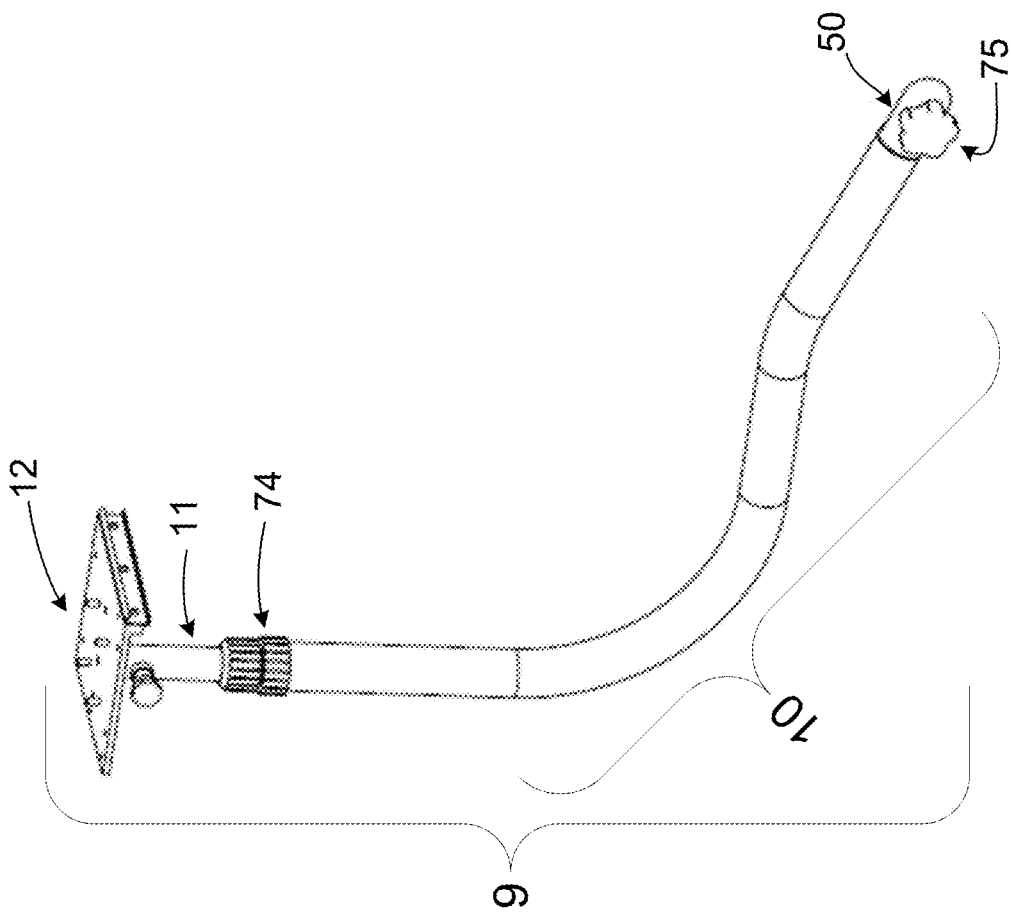

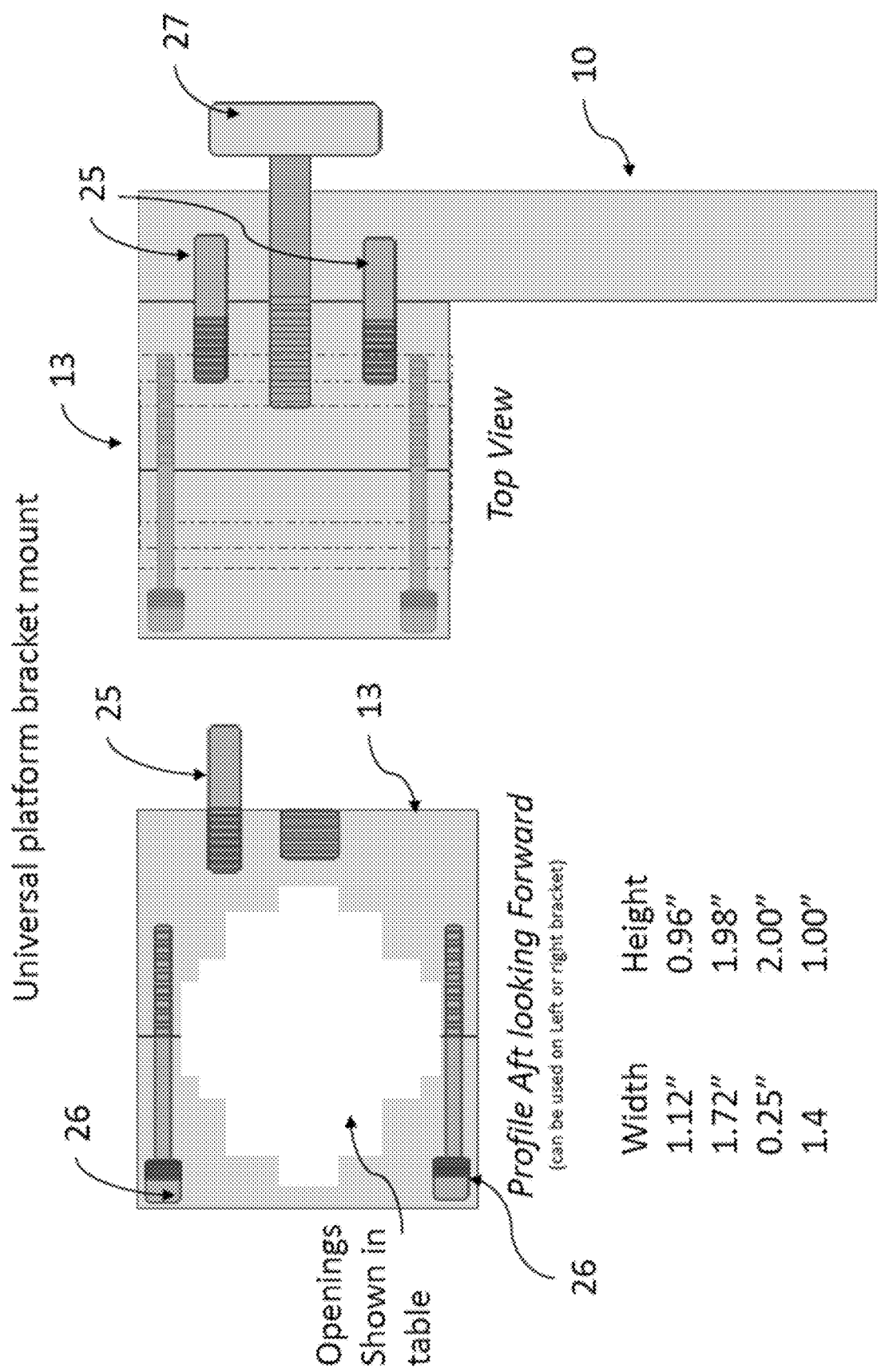

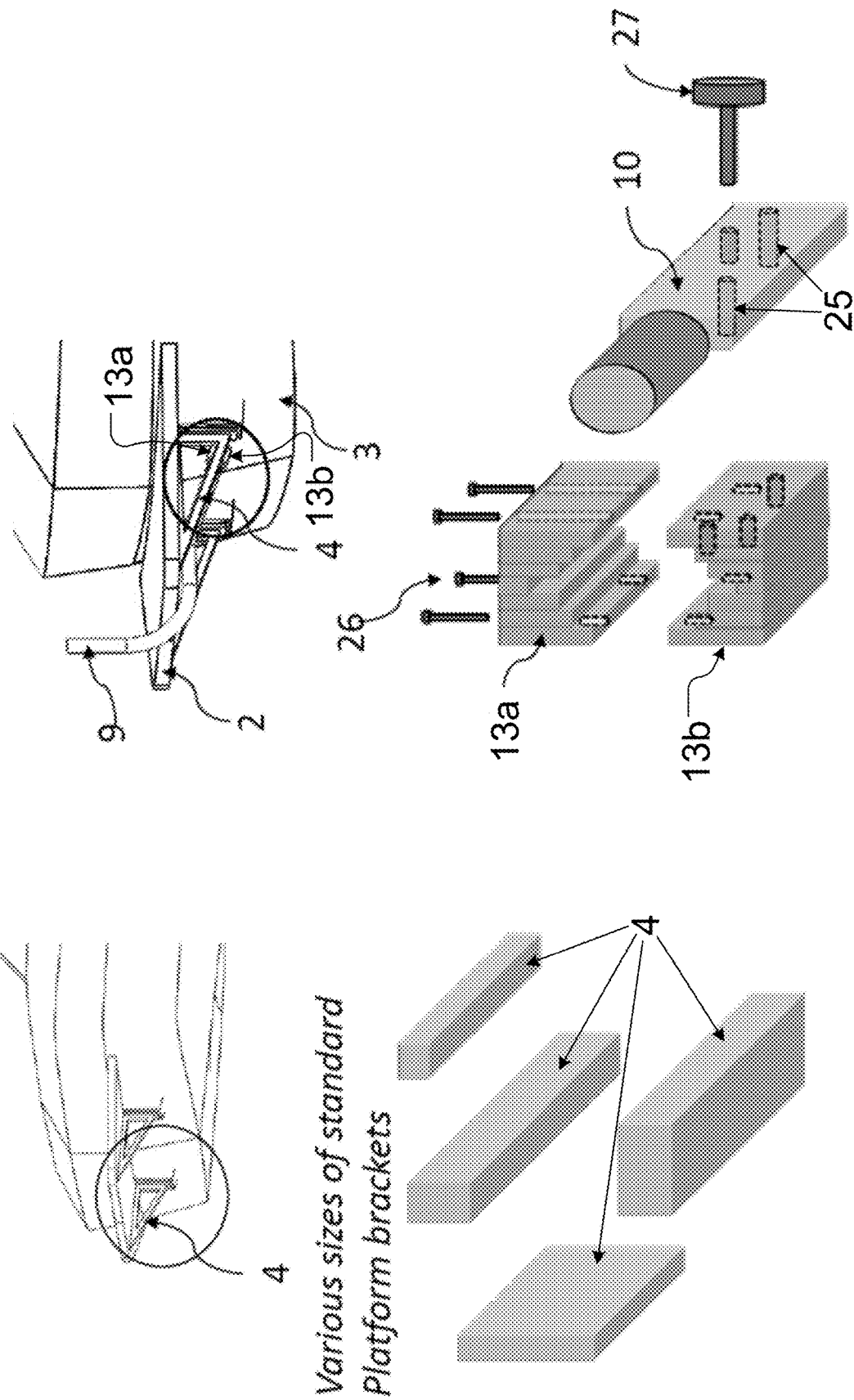

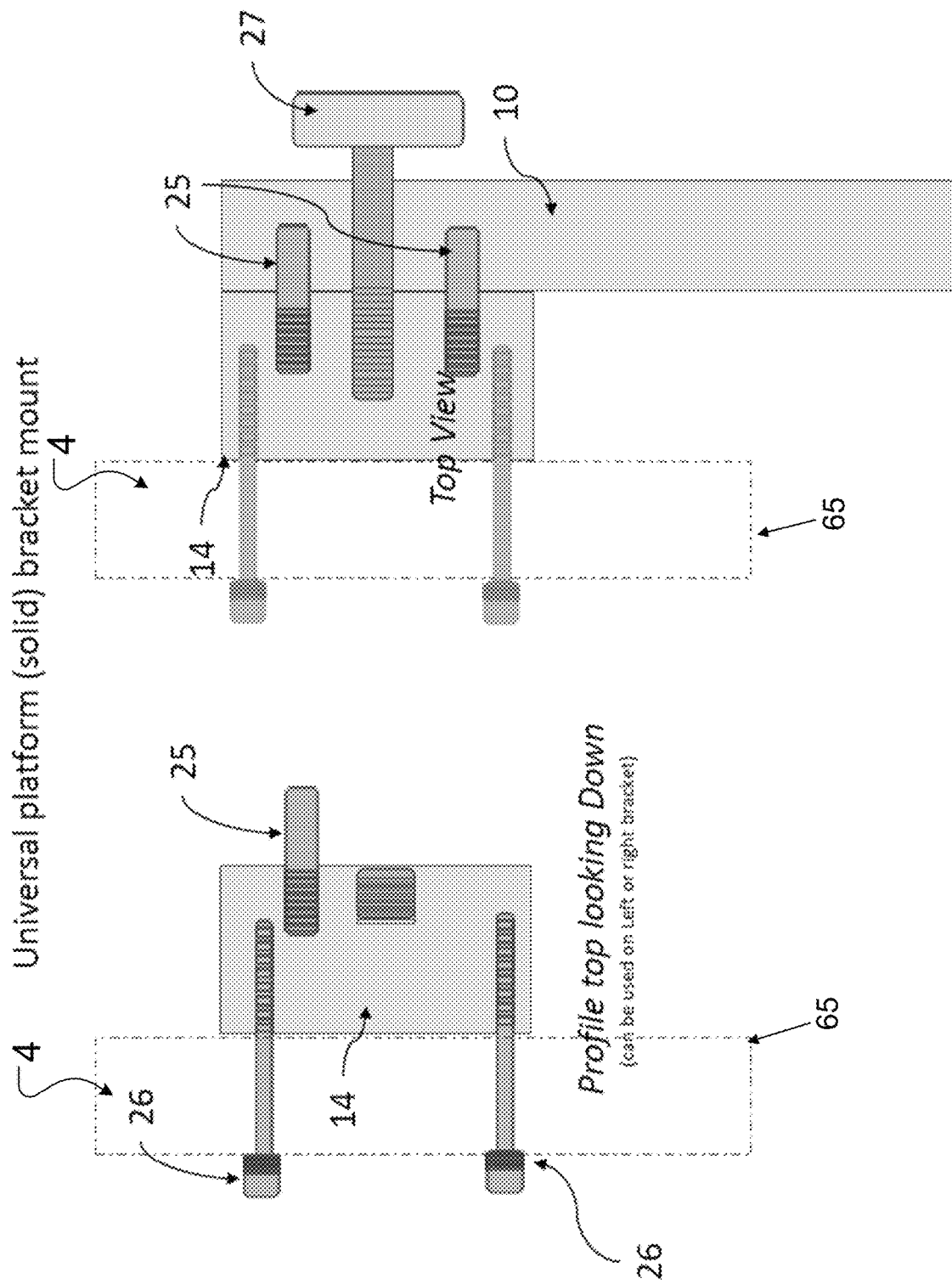

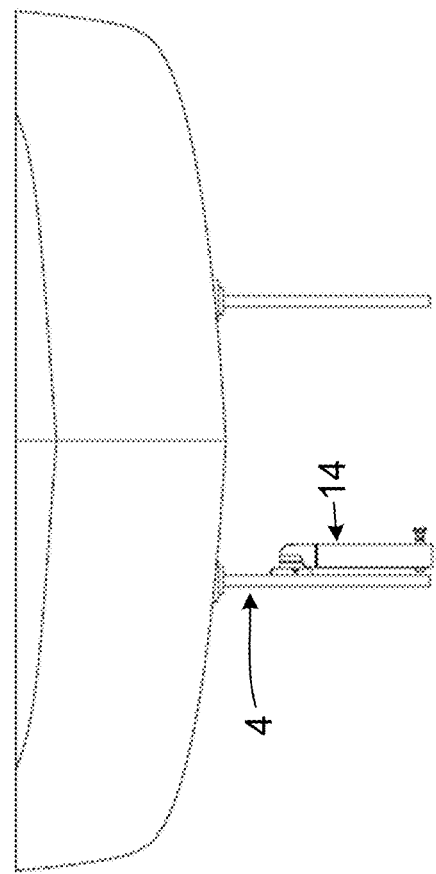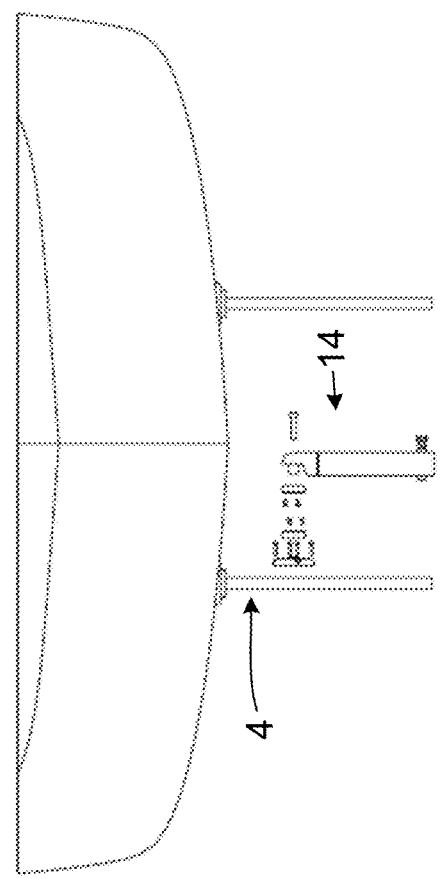

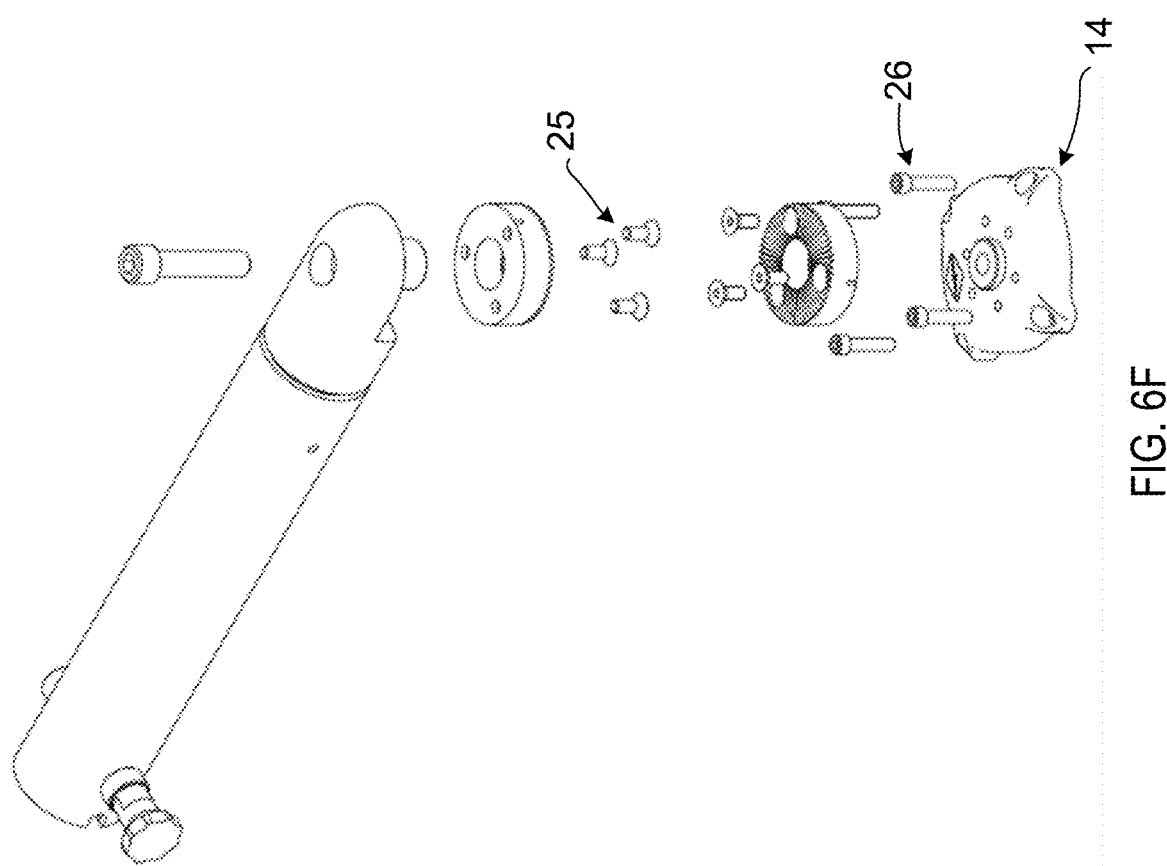

Mounting configuration using Universal under platform mount
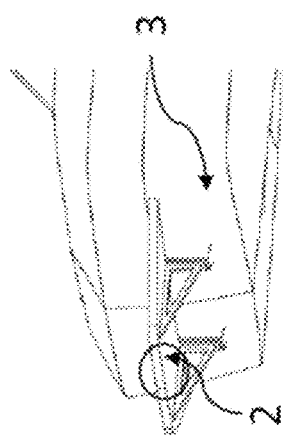
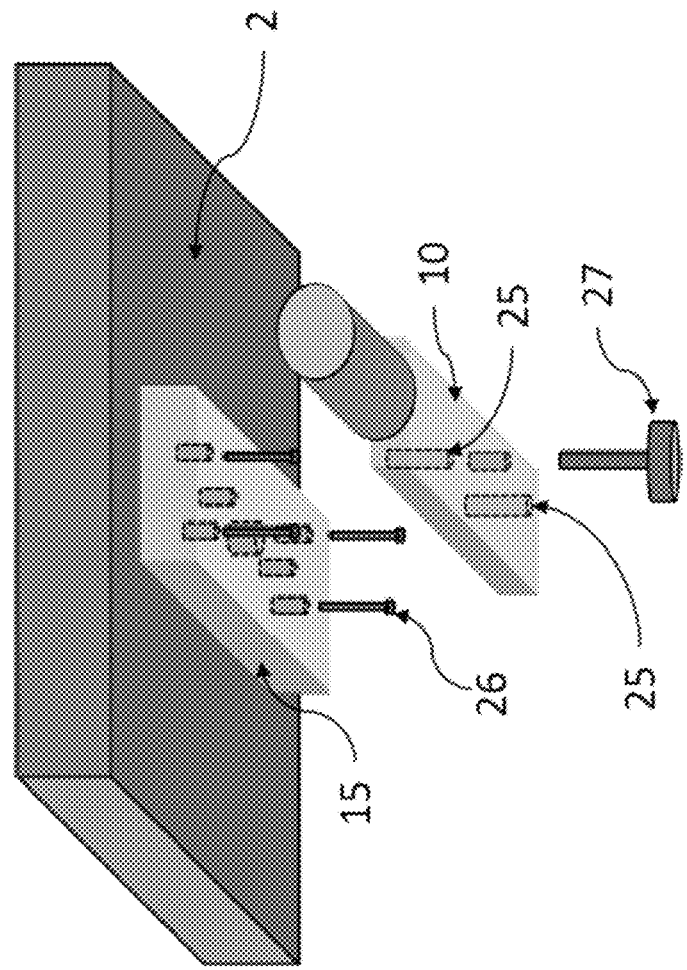
FIG. 9A

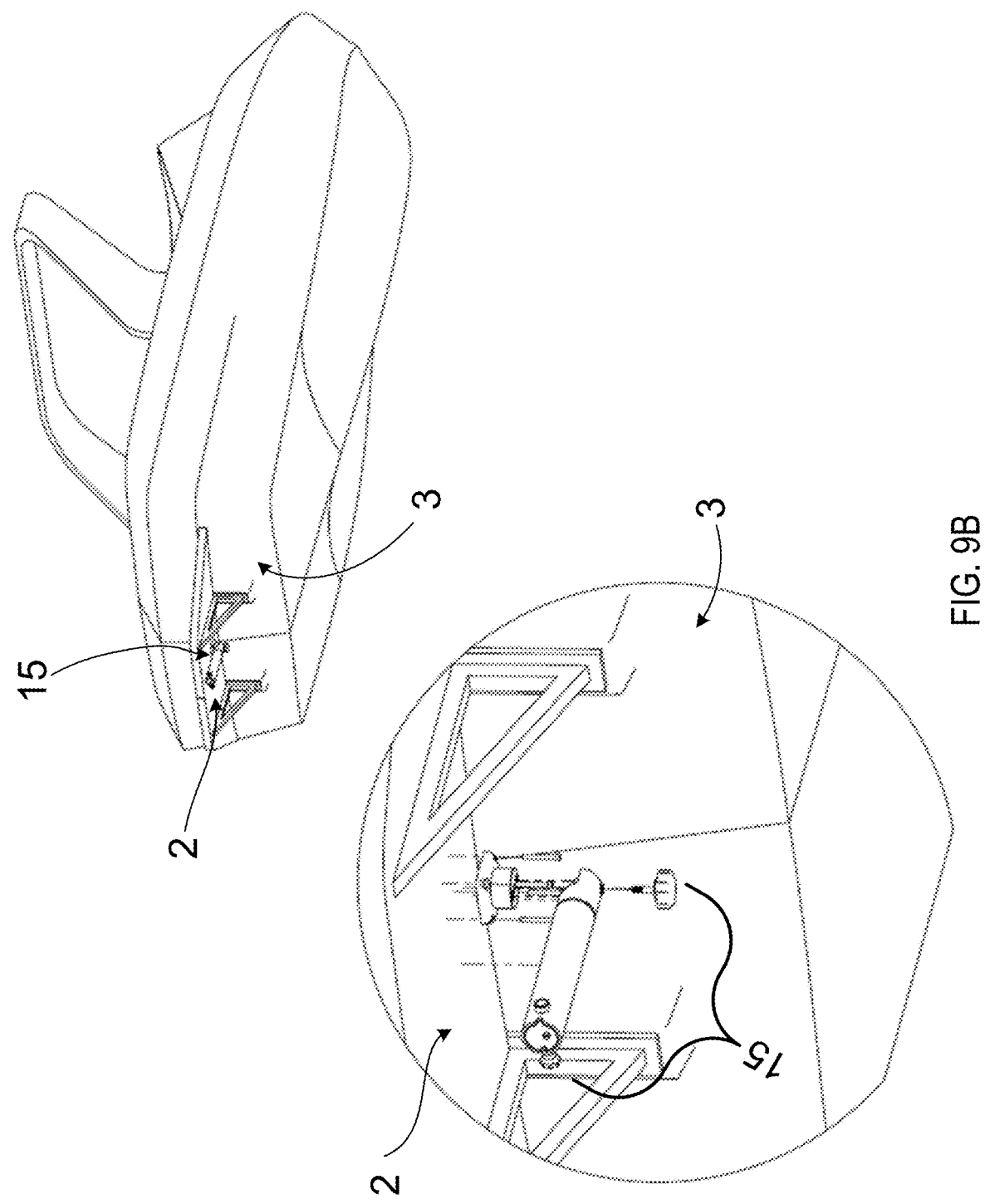

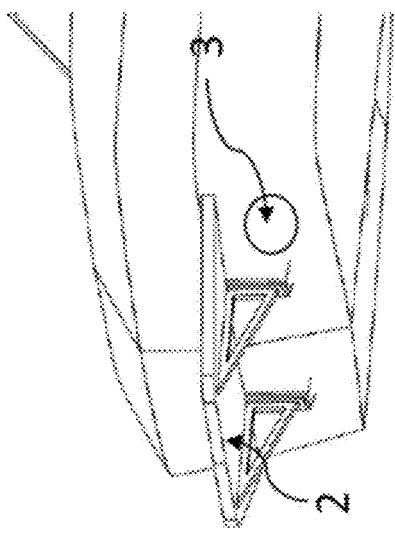
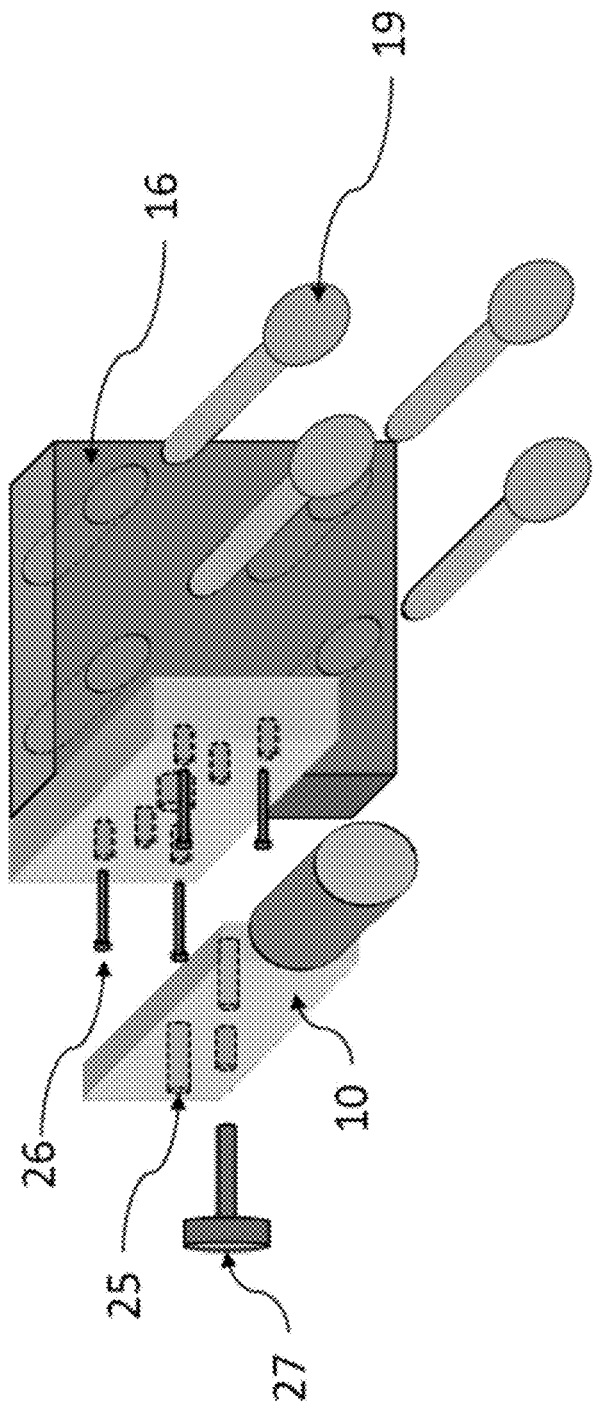
FIG. 10A

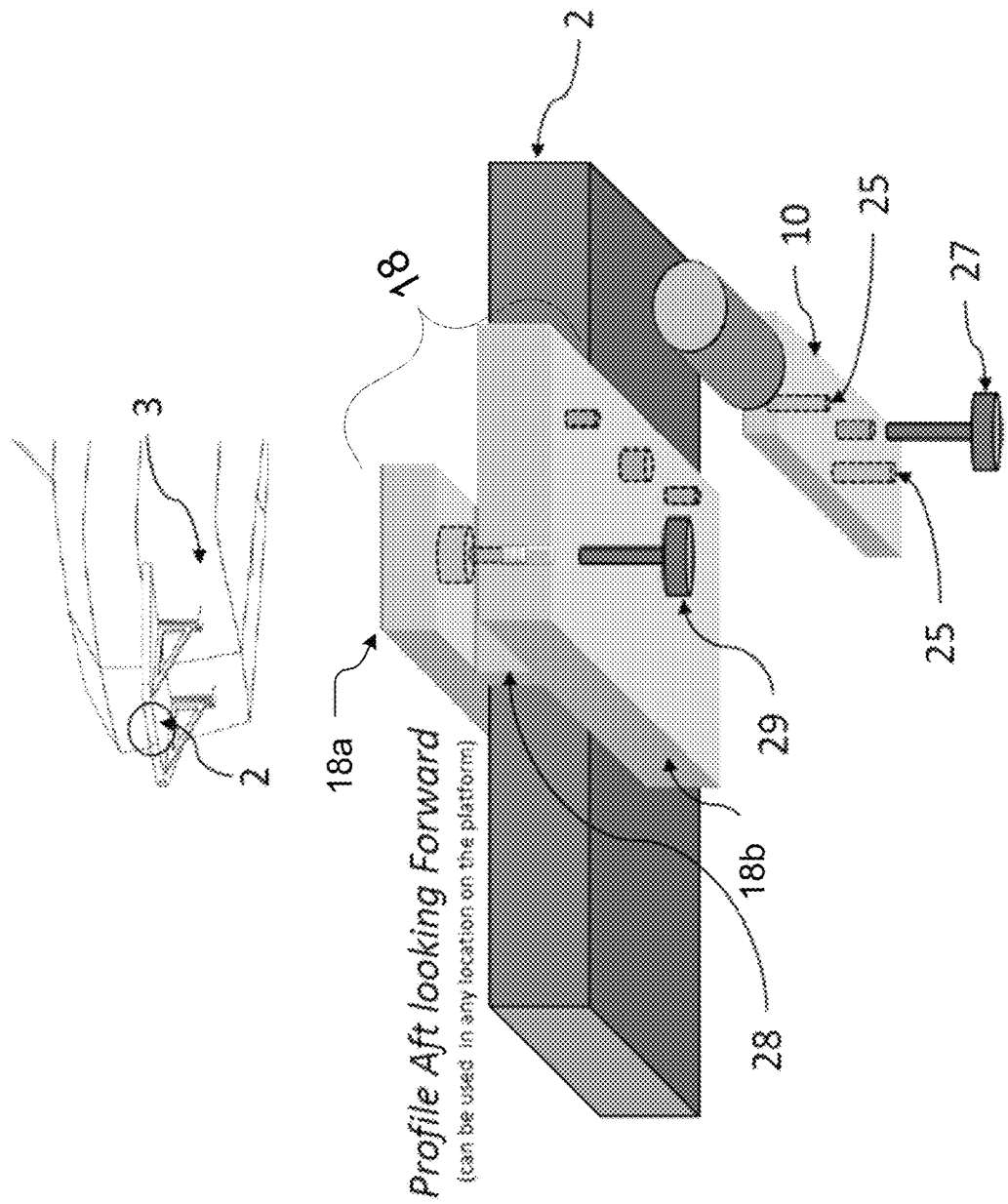

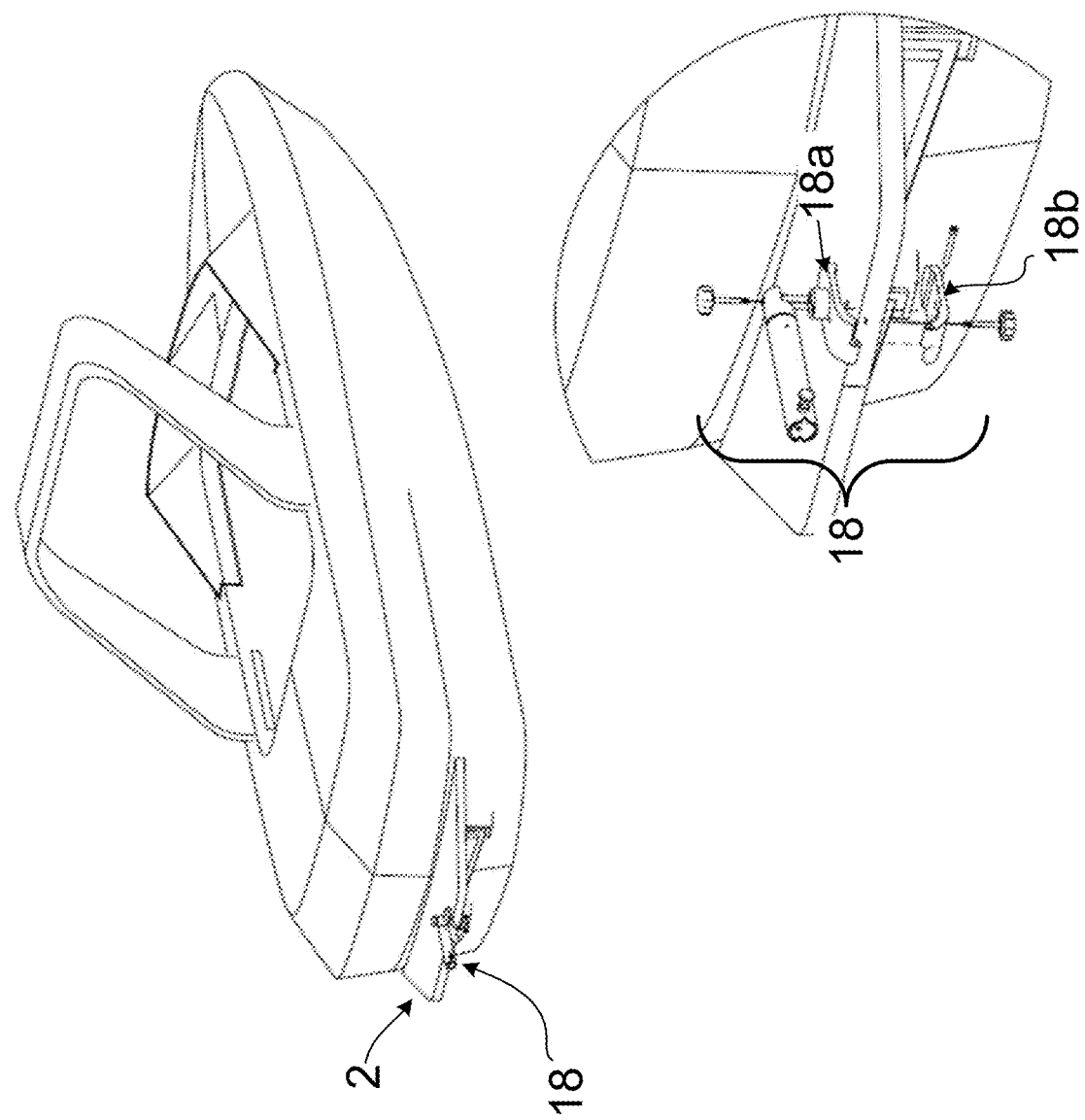

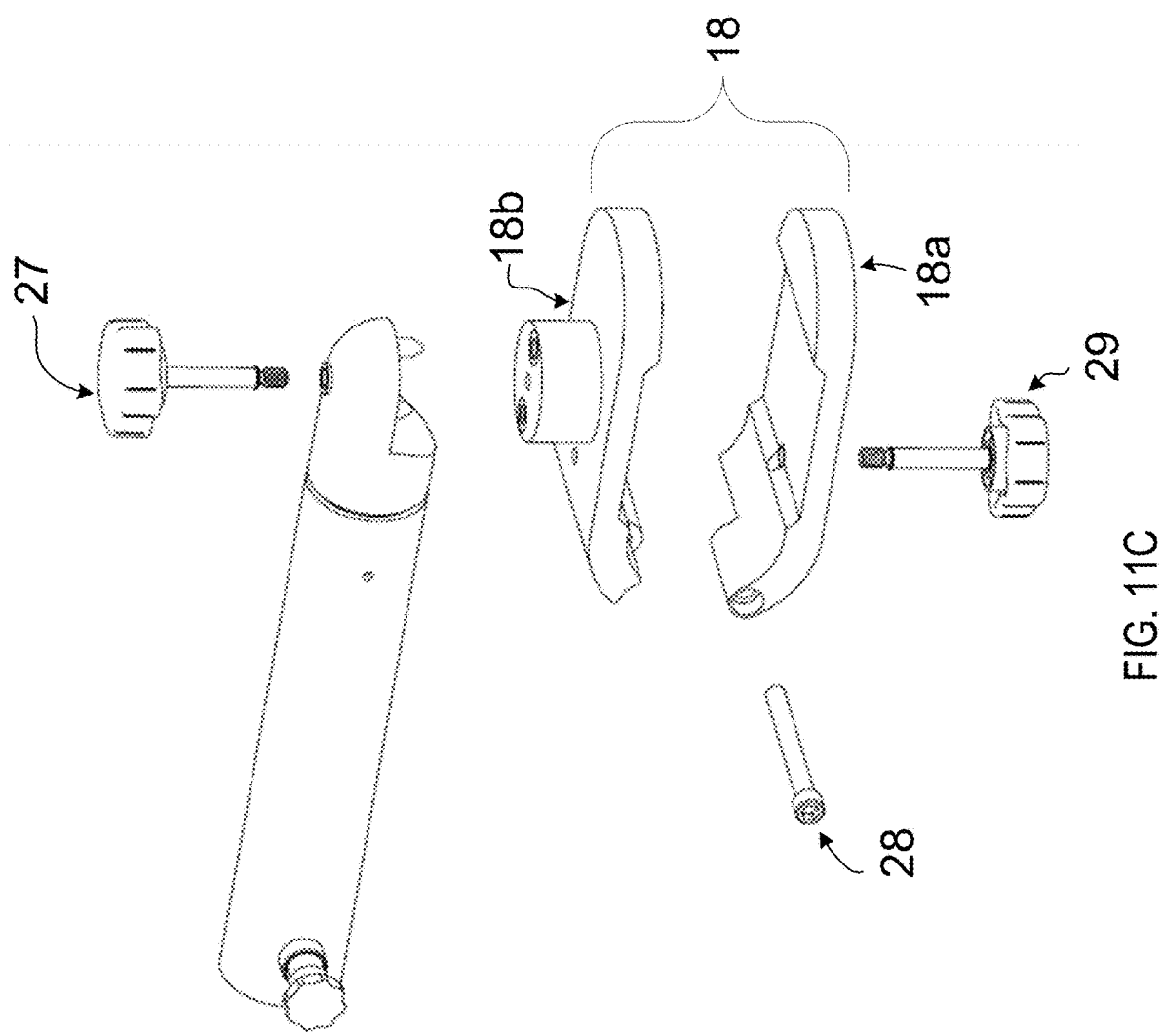

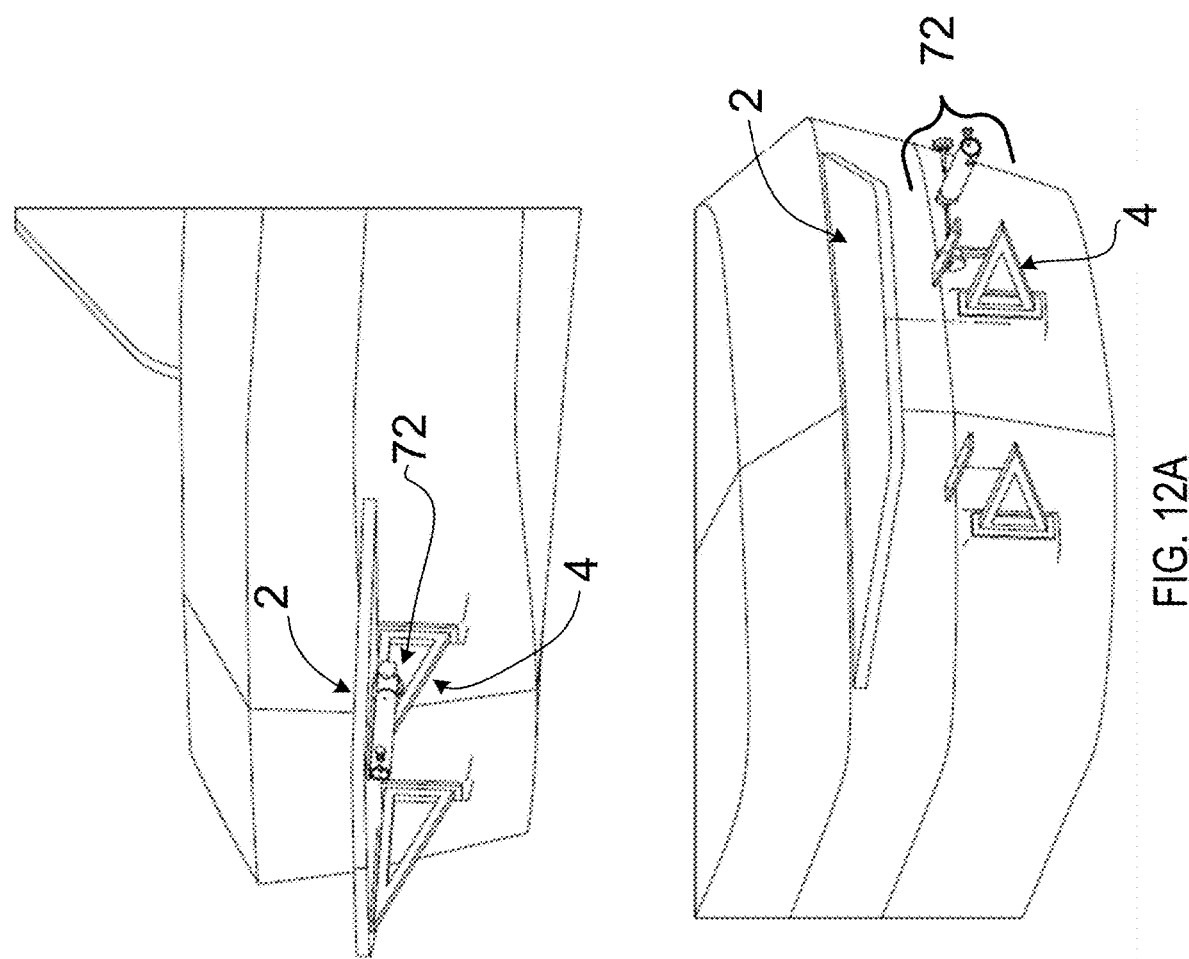

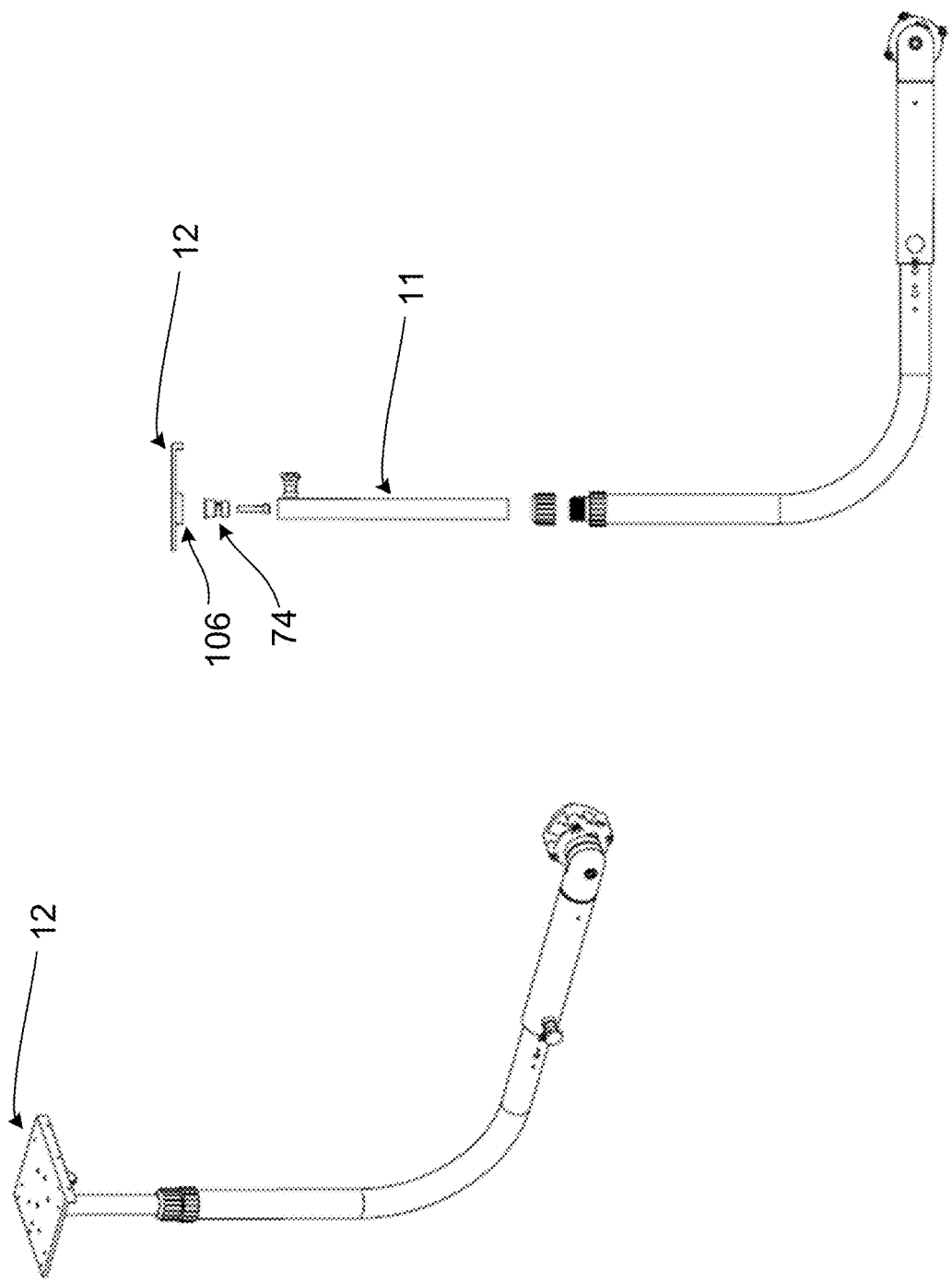

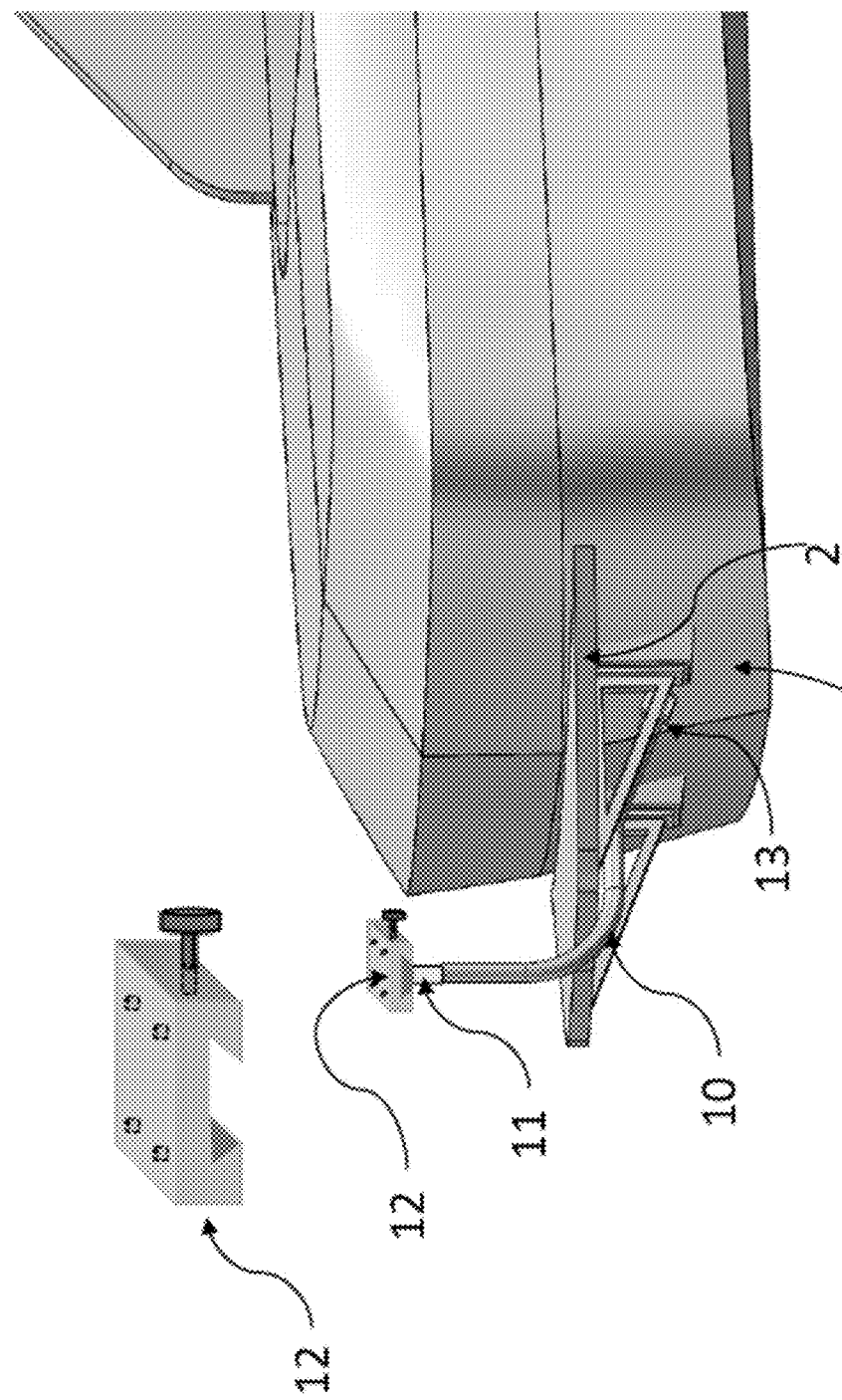

Transom swim platform accessory mount shown installed with Cooking Grill and Umbrella option Transom swim platform accessory mount shown installed with Cooking Grill option Transom swim platform accessory mount shown installed with Cooking Grill option Transom swim platform accessory mount shown installed with Cooking Grill option

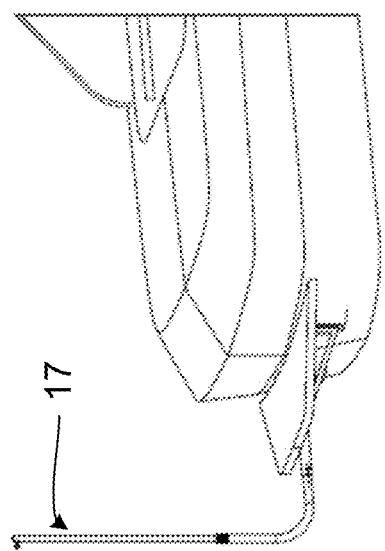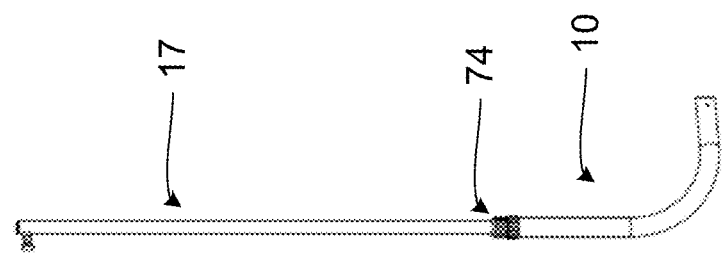
FIG. 21B

Transom swim platform accessory mount shown with umbrella And single hammock option Transom swim platform accessory mount shown with umbrella
And double hammock option Transom swim platform accessory mount shown with umbrella
And double hammock option Transom swim platform accessory mount shown with single paddle board
Rack option Transom swim platform accessory mount shown with single paddle board Rack option Transom swim platform accessory mount shown with double paddle board
Rack option

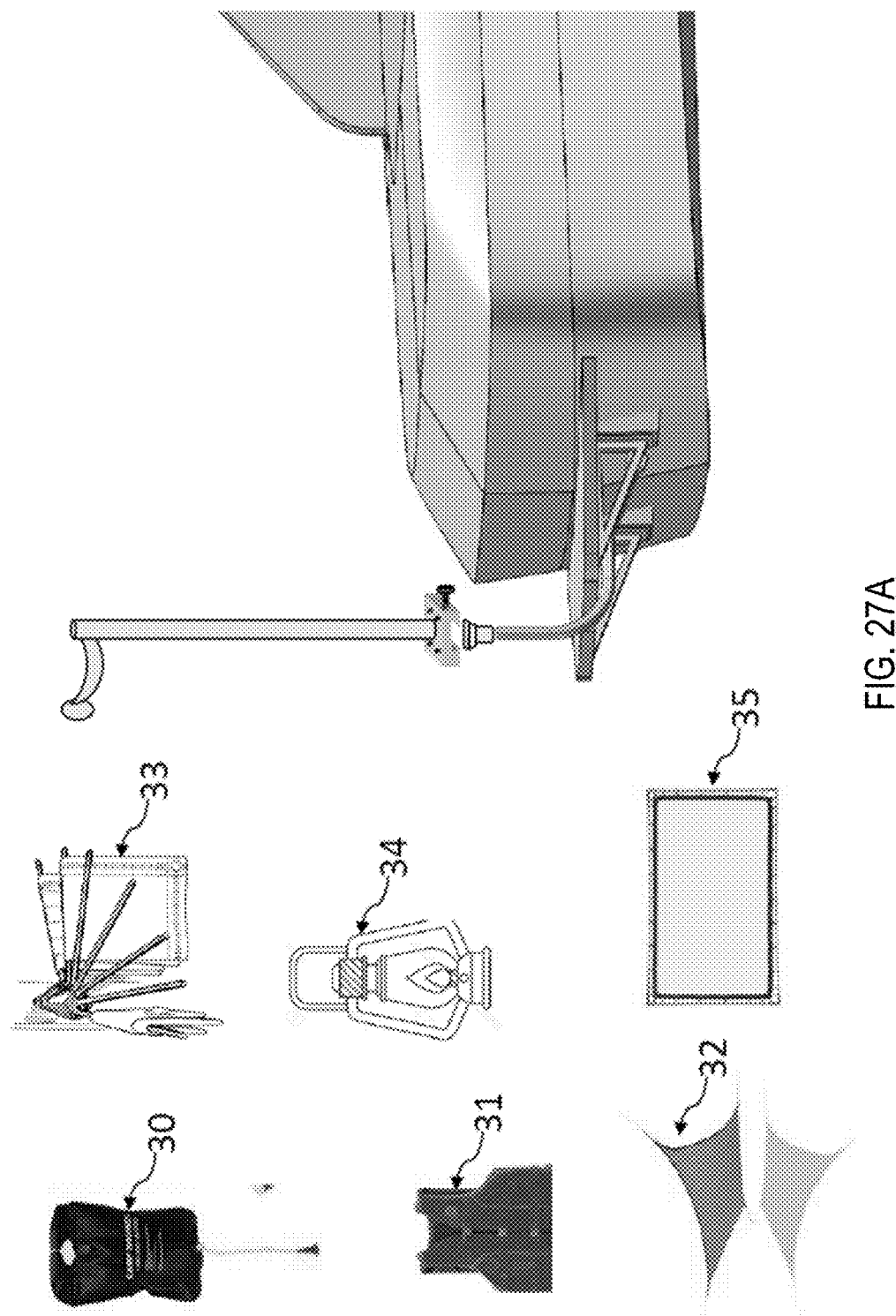

UNIVERSAL MOUNTING SYSTEM FOR WATERSPORT TOW BOATS

CLAIM OF PRIORITY

This application claims priority to U.S. Provisional Application Ser. No. 62/804,494, filed on Feb. 12, 2019, the entire contents of which are hereby incorporated by reference.

TECHNICAL FIELD

This document generally describes a universal mounting system that can be attached to a back deck (e.g., swim platform) of a watersport tow boat (e.g., ski boat, wake boarding boat) for mounting various items, such as grills, tables, umbrellas, hammocks, etc.

BACKGROUND

Watersport tow boats are boats that are designed to be used for watersport activities, such as wakeboarding, tow behind surfing, water skiing, tubing, and others. Watersport tow boats typically include an inboard motor and a platform (also called a swim platform) that extends from the back of the boat, cantilevered over the water. The platform provides a person participating in watersports a place to prepare for participating in a watersport activity, as well as a place to easily enter and exit the water. The relative height of the swim platform is typically below the top deck of the boat (closer to the water level) so that it is easier for people to enter and exit the water.

Watersport tow boats also include a tow rope mount to which a tow rope to pull people behind the boat is mounted. The tow rope mount is frequently located in an elevated position above the surface of the water, such as on a tower that is positioned near the center of the boat (center both front to back, and side to side on the boat). The back and sides of the boat can be clear of railings, attachments, and other accessories that may impinge upon the free movement of the rope while a person is being towed behind the boat (e.g., person wakeboarding behind boat). Additionally, the front of the watersport tow boat can be free of other railings, attachments, and other accessories that may block the driver's view of the water, other water crafts, and the person being towed behind the boat.

Watersport tow boats are popular vehicles for entertaining families, friends, and groups of people. Watersport tow boats have changed over time in several ways. In one aspect, watersport tow boats have become more specialized to provide optimal performance for particular watersport activities, like wakeboard, wake surfing, waterskiing, and others watersport activities. For example, watersport tow boats customized for wake surfing include structures to provide a larger wake that will permit a person to surf on the wake behind the boat. Similarly, watersport tow boats customized for wakeboarding include structures to provide a certain wake structure that will permit wakeboarders to jump and do tricks off of the wake, while permitting attachment of a tow rope that will allow the wakeboarders to readily move across the wake and to perform aerial tricks without obstruction.

In another aspect, some watersport tow boats have increased in size and capacity to accommodate larger groups of people and gear, and to accommodate use for extended periods of time (e.g., all-day activity, multi-day activity). However, as boats have increased in size and capacity, they have continued to be designed with a primary focus on designs that permit and promote high caliber watersport performance.

SUMMARY

This document generally describes a universal mounting system (e.g., hardware and support device) used for mounting accessories (e.g., directly or indirectly via an accessory adapter) to a watersport tow boat's transom, swim platform, and/or swim platform support brackets. Universal mounting systems can be conveniently attached to and removed from watersport tow boats, for example, using a quick release feature. Additionally, universal mounting systems can be sized and configured for easy stowage on the boat in any of the stowage compartments, such as through collapsible, stackable, and other features that reduce the size of the universal mounting system when not in use. In addition to being readily attachable/removable from boats, universal mounting systems are configured so that the boat can still be used for watersport activities while the universal mounting systems (in whole or components thereof) are attached to the boat. For example, the universal mounting system can be mounted to rear of the boat in ways that will not affect the wake that is formed by the boat (and used for watersports, such as wake surfing and wakeboarding) and that will not affect the free movement of a tow rope attached to the boat. For instance, an accessory arm of the universal mounting system that is mounted to the boat can follow a contour of other structures on the boat, such as extending from a mounting location on swim platform brackets at an angle between 13 and 20 degrees so that it contours to a shape of the existing swim platform brackets. Such an angle can prevent disruption of a wake shape while the boat is moving at any speed.

Universal mounting systems can be considered "universal" in several ways. For example, the universal mounting system can include a universal adapter that attaches to boats. Different boat manufacturers and different boat models can have different structures to which the universal mounting system can be mounted. For example, different boat manufacturers can use differently designed and dimensioned brackets to support swim platforms. Universal adapters are configured to be releasably mounted to different makes and models of boats without additional or modified components to permit the cross-make/model mounting. For example, universal adapters can be configured to be attached to brackets that support the boat's rear swim platform. In another example, universal adapters can be clamped onto a side or top deck of the swim platform. Such examples can permit for cross-make/model mounting without drilling/altering structures on the boats (e.g., drilling holes into boat deck and attaching adapter with screws). In other examples, the universal adapter can be mounted through drilling into/modifying structures on a boat, such as the universal mounting system being screwed into a transom of the boat, into the a solid swim platform bracket, and/or into an underside of the swim platform. Other configurations are also possible.

In another example, universal mounting systems can include an accessory adapter that permit a wide variety of accessories to be mounted to a boat and, as a result, for additional activities and uses to be added to boats. For example, the accessory adapter can permit for grills, canopies, umbrellas, tables, hammock posts, cameras, and other accessories to readily be mounted to and used with boats. Permitting swapping and use of different accessories on boats can expand the use and functionality of the boats.

In one implementation, an accessory mount system for a watersport tow boat includes a boat mount that is configured to be attached to a boat mounting surface that is adjacent to or part of a swim platform that extends from a rear of the watersport tow boat, wherein the boat mount includes a mounting surface that is configured to be fixedly attached to the boat mounting surface, wherein the boat mount also includes an accessory arm mounting surface. The accessory mount system can further include an accessory arm that includes a first end and a second end, wherein the first end is configured to be fixedly attached to the accessory arm mounting surface of the boat mount, wherein the second end is configured to be positioned above a top surface of the swim platform when the accessory arm is attached to the watersport tow boat via the boat mount. The accessory mount system can further include an accessory adapter positioned at the second end of the accessory arm, wherein the accessory adapter includes one or more surfaces configured to support and releasably attach one or more accessories to the watersport tow boat.

The accessory mount system can optionally include one or more of the following features. The accessory arm mounting surface of the boat mount can include one or more alignment pins that fixedly attached to the boat mount and extend from the accessory arm mounting surface. The boat mount can include at least two alignment pins that are configured to extend into at least two corresponding alignment apertures defined in the accessory arm to fixedly align the boat mount and the accessory arm. The accessory arm mounting surface can define a threaded opening that is configured to receive a knob. The boat mounting surface can include a bracket that supports and attaches the swim platform to the boat. The boat mount can include separable top and bottom portions that are configured to extend around and be secured to the bracket. The top portion and the bottom portion can collectively define a void that is dimensioned to fit the bracket. The top portion and the bottom portion can collectively define a void that is contoured and dimensioned to fit a plurality of differently dimensioned swim platform brackets. The void can be defined with a stepped configuration that is adapted to fit swim platform brackets of different combinations of height and width dimensions. The top portion and the bottom portion of the boat mount can be secured around the bracket by one or more screws connecting the top portion and the bottom portion to each other. The boat mount can be secured to the bracket without the use of any components being screwed into the bracket.

The boat mounting surface can include a solid bracket that supports and attaches the swim platform to the boat. The boat mount can be screwed into the solid bracket. The boat mounting surface can include the swim platform. The boat mount can be screwed into an underside of the swim platform. The boat mounting surface can include the swim platform. The boat mount can include a platform clamp mount that is secured to the swim platform with a clamp. The clamp can be secured to the swim platform without the use of any components being screwed into the swim platform. The boat mounting surface can include a transom of the boat. The boat mount can be screwed into the transom.

The accessory arm can be configured (i) to extend from the first end along and follow the contour of a boat component to a side of the swim platform and (ii) to extend beyond the side and above of the swim platform to the second end. The boat component can include a bracket that supports and attaches the swim platform to the boat. The side of the swim platform can include a rear side of the swim platform. The boat component can include an underside of the swim platform. The side of the swim platform can include a rear side of the swim platform. The boat component can include a transom of the boat. The side of the swim platform can include a lateral side of the swim platform. The one or more accessories can include a grill. The one or more accessories can include an umbrella. The one or more accessories can include an accessory extension that extends from the accessory adapter. The one or more accessories can include a hammock. A first end of the hammock can be attached to a tower of the boat and a second end of the hammock can be attached to the accessory mount system. The one or more accessories can include a storage rack. The one or more accessories can include a camp shower. The one or more accessories can include a life jacket dryer. The one or more accessories can include a shade sail attachment. The one or more accessories can include a towel drying rack. The one or more accessories can include a light. The one or more accessories can include one or more of: a movie screen and a projector. The one or more accessories can include a table. The one or more accessories can include a game surface. The one or more accessories can include a camera. The one or more accessories can include a drone launching pad.

The accessory arm can include an extendible portion between the first end and the second end. The extendible portion can have an extendible height along a substantially vertical dimension. The extendible portion of the accessory arm can be configured to, at least in part, extend above the top surface of the swim platform. The extendible portion can have an extendible length along a substantially horizontal dimension. The extendible portion can be configured to, at least in part, extend underneath a bottom surface of the swim platform.

The accessory arm can include a first extendible portion and a second extendible portion between the first and the second end. The first extendible portion can have an extendible height along a substantially vertical dimension. The second extendible portion can have an extendible length along a substantially horizontal dimension. The first extendible portion of the accessory arm can be configured to, at least in part, extend above the top surface of the swim platform. The second extendible portion can be configured to, at least in part, extend underneath a bottom surface of the swim platform.

Various embodiments can provide one or more advantages. For example, universal mounting systems can permit for accessories to be readily mounted to watersport tow boats without altering the performance of these boats for watersport activities. For instance, universal mounting systems can be mounted to watersport tow boats in ways that do not affect or alter the wake produced by the boats, regardless of the speed the boats are driving.

In another example, universal mounting systems can permit for mounting of accessories to boats without drilling into or otherwise altering any structures/surfaces on boats. For instance, universal mounting systems can be attached to and detached from boats with attachment mechanisms (e.g., quick release mounting hardware) that do not use of screws, adhesives, or other affixing agents that may damage/alter structures on the boat.

In another example, universal mounting systems can be configured to attached to multiple different makes and models of boats using the same components. For instance, a single universal mounting system can be mounted to multiple different makes and models of boats without the need for adaptors or other components that are specialized to specific makes/models of boats. This can reduce the overall cost and complexity of the system, for example, by reducing the number of components included in a universal mounting system kit to permit it to be used across different makes/models.

In another example, universal mounting systems can expand the functionality and uses of watersport tow boats, permitting them to be more readily adapted to meet the needs of their users. For instance, by permitting recreation accessories to be mounted to a watersport tow boat, such as grills, hammocks, and tables, users can expand the use a watersport tow boat to also serve as a leisure watercraft, like a pontoon boat. Similarly, by permitting enhanced watersport related accessories to be mounted to a watersport tow boat, such as high performance cameras and/or drone landing pads, a watersport tow boat can be used for filming watersport activities. Other extensions and additions to a watersport tow boat's functionality can be provided by universal mounting systems, all without compromising the primary watersport functionality of the boats.

In another example, universal mounting systems can be set up and deployed from any boating configuration, sports preset, or ballast level without the need to prepare for installation. This allows for the immediate and practical configuration of the accessory without losing valuable time between activities.

The details of one or more embodiments are set forth in the accompanying drawings and the description below. Other features and advantages will be apparent from the description and drawings, and from the claims.

BRIEF DESCRIPTION OF DRAWINGS

FIGS. 3A-G depict one or more components comprising the swim platform accessory mount.

FIGS. 4A-E depict a universal platform bracket mount.

FIGS. 5A-D depict exemplary mounting configurations using the universal platform bracket mount.

FIGS. 6A-F depict exemplary use of a universal platform solid bracket mount.

FIGS. 9A-B depict a mounting configuration using the universal under platform mount.

FIGS. 10A-D depict a mounting configuration using a universal transom mount.

FIGS. 11A-C depict a mounting configuration using a universal platform clamp mount.

FIGS. 12A-B depict a universal bracket mount.

FIGS. 15A-B depict an accessory adapter.

FIGS. 17A-B depicts a universal platform bracket mount with an accessory adapter.

FIGS. 21A-B depict the swim platform accessory mount installed with an accessory adapter extension.

FIGS. 27A-B depict exemplary embodiments of an accessory adapter extension used for various types of activities.

DETAILED DESCRIPTION

Figure 1A:
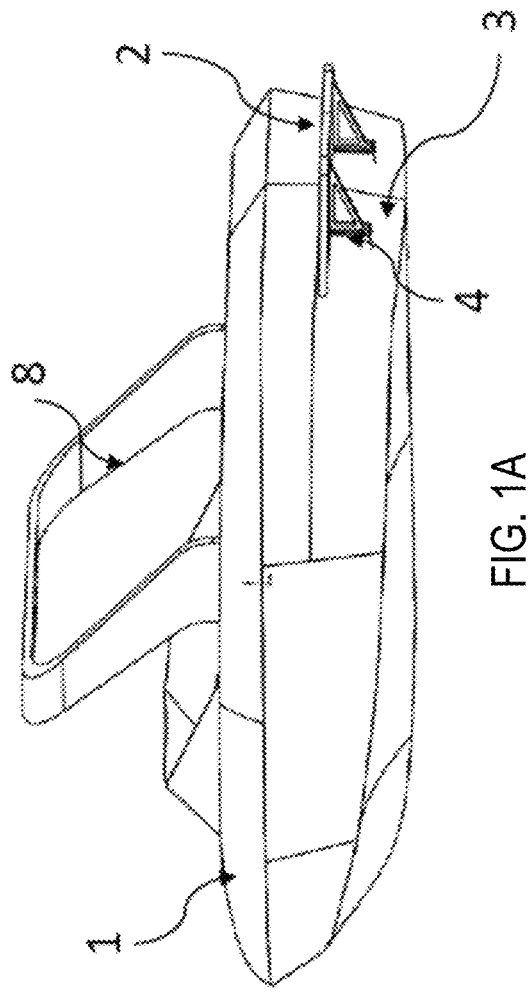
FIGS. 1A-C depict views of an example watersport tow boat.

This document generally describes universal mounting systems for watersport tow boats, which can be mounted to various structures on the boats, such as the boats' transom and/or swim platform area. Universal mounting systems can include a mount that is designed to be mounted to watersport tow boats with little or no impact on the boats' functionality. For example, mounting the universal mounting system to a swim platform still allows for full use of the swim platform while the accessory mount is installed and/or in use with accessories that are attached to the mount (e.g., grill, hammock, umbrella). In another example, the universal mounting system can be mounted to a boat without negatively impacting the watersport performance of the boat, such as altering the shape or dimensions of the wake produced by the boat for watersport. The universal mounting system is designed so that, when attached to a watersport tow boat, the wake and watersport performance of the boat is unaffected at every speed for the boat. Similarly, the wake and watersport performance of the boat is unaffected when accessories (e.g., grill attachment) are attached to the universal mount and/or when accessories removed but a mounting bracket or other parts of the system are left in place (e.g., attached to the boat). Additionally, the universal mounting system can be positioned off of the back/side of a watersport tow boat so that its use does not reduce or otherwise negatively impact the usable space and/or functionality of the swim platform, transom, passenger space, and/or other spaces on the boat, which may be limited due the nature of watersport tow boats being designed for watersport performance.

Universal mounting systems provide mounts to which accessories can be attached and used by passengers (and others nearby) watersport tow boats. Mounts provided by universal mounting system can be structurally sound and can permit a variety of accessory uses, such as storage, cooking, entertainment, and lounging. For example, universal mounting systems can provide non-movable and non-rotational attachment for accessories to watersport tow boats that are sufficient to carry and support significant loads (e.g., 50 lbs, 100 lbs, 200 lbs, 300 lbs, greater than 300 lbs) without rotation of the mount relative to the boat, movement of the mount relative to the boat, detachment from the boat, and/or damage to any boat structures.

Universal mounting systems can provide multiple mounting configurations with the same mounting components that are designed to accommodate multiple different makes and/or models of watersport tow boats. For example, the same mounting hardware can fit and be mounted to multiple different swim platform brackets used by different boat manufacturers without the need for additional or different mounting hardware. Universal mounting systems can be mounted to watersport tow boats without modifications or alterations to any portion of the boat while still providing sufficient structural support and ease of use. Alternatively, universal mounting systems can be mounted to watersport tow boats through minor alterations to one or more boat structures, such as drilling one or more holes into the swim platform, transom, or one or more swim platform brackets. All configurations, regardless of whether mounted with or without alterations/modifications to boat structures, provide for sufficient structural support and ease of use.

Universal mounting systems and their components can be made from materials resist corrosion caused by a marine and/or salt environment, such as stainless steel, anodized aluminum, brass, oil impregnated bronze, and/or other appropriate materials. For example, mating pins and/or bushings can utilize oil impregnated bronze bushings and fittings. In another example, a combination of stainless steel and brass fastening hardware can be used. In another example, dissimilar materials can be used for each of the one or more nut and bolt connections to prevent environmental buildup and/or the possibility of galling threads. In another example, stainless steel pipes and/or adjustment buttons can be used for one or more sliding brackets. Other materials and/or material combinations can be used for various components of universal mounting systems.

Various implementations of the universal mounting systems can solve one or more problems, shortcomings, or needs associated with watersport tow boats. For example, as more people can fit on the boats and spend more time on the boats, there can be a need to add additional space without impacting other features of the boat, such as watersport activities and/or onboard activities. In addition, there can be a need to add space for practical equipment storage, cold food and beverage stowage, and more functional space so that it is easier and more enjoyable to complete activities on board and in the water. There can also be a need to utilize available space on the boat for accessory mounting, food preparation and/or cooking, and storage of items that cannot practically fit in a rack or storage compartment already on the boat, such as stowage under the seats. Universal mounting systems can satisfy all of these needs by providing a mount that is positioned off of the back or side of the boat, which can add additional space for accessories without impinging upon existing space within the boat. Additionally, the universal mount can permit a wide variety of swappable accessories to be mounted to accommodate any of a variety of different needs, which may change over time or within the same boat outing.

In another example of problems/needs/shortcomings that are solved by various implementations of the universal mounting systems, existing watersport tow boats lack structures above or below the swim platform to which accessories can be releasably mounted in a way that is safe, practical, and/or useful for use from a stern area of the boat. This includes accessories that require structural support (e.g., canopies, hammocks), as well as ease of access while passengers are sitting, standing, or otherwise occupying the swim platform of the boat. Existing watersport tow boats do have storage and available locations for accessories in seat stowage compartments, tower rack locations, and on top of a Bimini to store items such as skis, boards, and small surfboards. However, unlike cruisers, pontoons, and yachts, watersport tow boats do not have available space for additional accessories, such as freeboard, fishing rod holders, or other railing tubes that are used in sports or activities the passengers may complete while spending a day on the boat. It is not practical nor ideal for the design of watersport tow boats to include freeboard, fishing rod holders, or other railing tubes. As a result, the optimal location to mount large accessories such as these on a watersport tow boat is the swim platform, which is commonly used by passengers to enter and exit the boat. Universal mounting systems provide a ready solution to these and other storage related problems on watersport tow boats by providing a storage location at the stern of the boat that is elevated above and off of the swim platform, which permits for storage as well as passenger entry/exit from the watercraft.

In another example of problems/needs/shortcomings that are solved by various implementations of the universal mounting systems, there can be a need for a watersport tow boat's stern area, rear port, and starboard area to remain clear of obstruction in order to prevent any interference with a tow rope that is being pulled from either a ski pylon near the stern, a center drive, or a tower mounted tow hook. There can also be a need to maintain an integrity of a wake that is generated from the boat's hull or a wake enhancing device as the boat passes through the water and a person is riding the wake on a board, skis, or other watersport device. Universal mounting systems can provide solutions to both of these needs, as described throughout this document. For example, a mount can extend at an angle up and beyond the swim platform of the boat so as not to affect the wake while the boat is in use, and can extend upward and permit attachment of a variety of accessories (e.g., grill, canopy, umbrella, hammock posts).

Universal mounting systems can be included as an original equipment item on a new boat or an aftermarket addition (e.g., a kit). With the original equipment items and/or the aftermarket addition, the universal mounting systems can use a universal mounting bracket that can permit the same mounting equipment to be used across different makes and/or models of watersport tow boats.

Figure 1C:
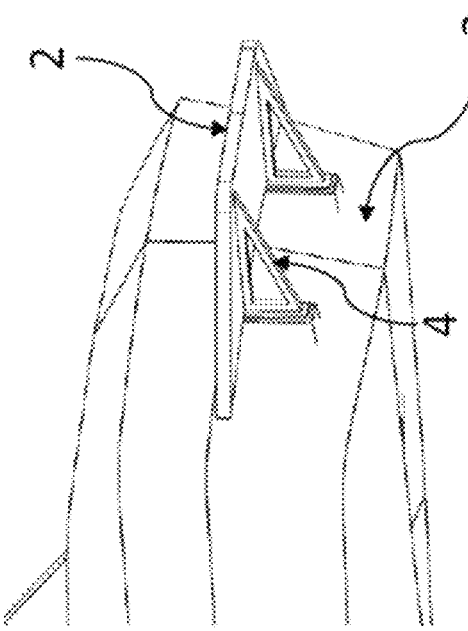
Figure 1B:
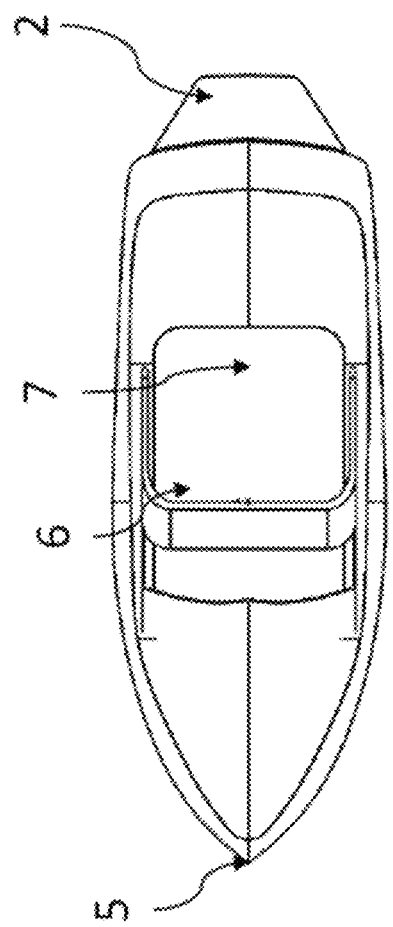

FIGS. 1A-C depict views of an example watersport tow boat 1. In FIG. 1A, a swim platform 2 is attached to a rear of the boat 1, a transom 3 is a flat surface forming a stern of the boat 1, and one or more swim platform brackets 4 attach the swim platform 2 to the transom 3. FIG. 1A also depicts a tower 8 that is elevated above the top deck of the boat 1. FIG. 1B is a top view of the boat 1, showing the bow 5, a cockpit 6 is where a driver controls and maneuvers the boat 1, and a seating area 7 is where one or more passengers may be sitting, standing, lounging, or engaging in other activities while on the boat 1. FIG. 1B further demonstrates a top view of the swim platform 2 which extends from the back of the boat 1. FIG. 1C depicts an exploded side view of the back of the boat 1, including the swim platform 2 and one or more swim platform brackets 4 that attach the swim platform 2 to the transom 3. As depicted, the swim platform 2 is cantilevered from the stern of the boat 1 with a triangular bracket.

Figure 2A:
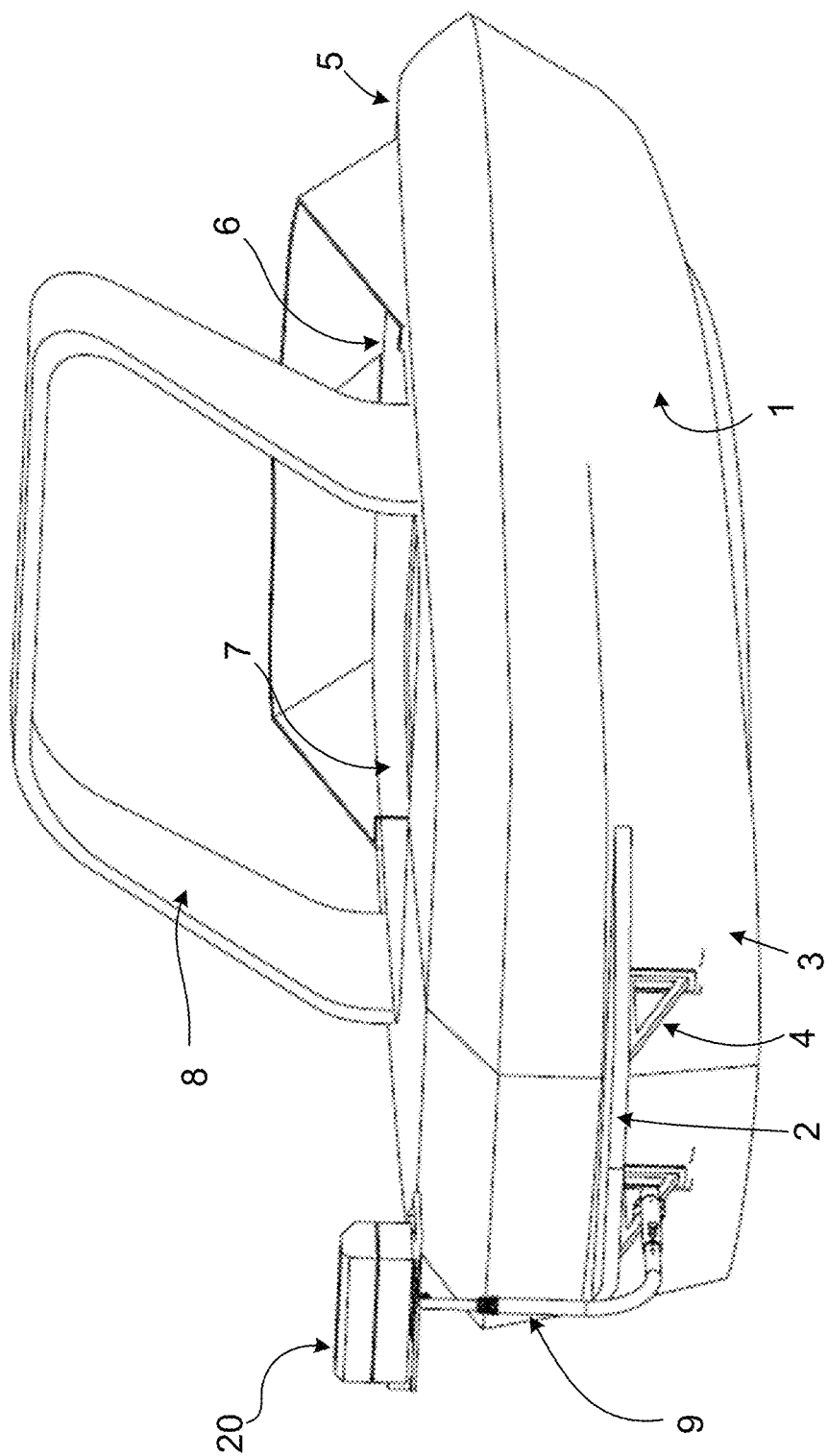
FIGS. 2A-C depict an example view of the watersport tow boat with a universal mounting system, a swim platform accessory mount, described herein.
Figure 2B:
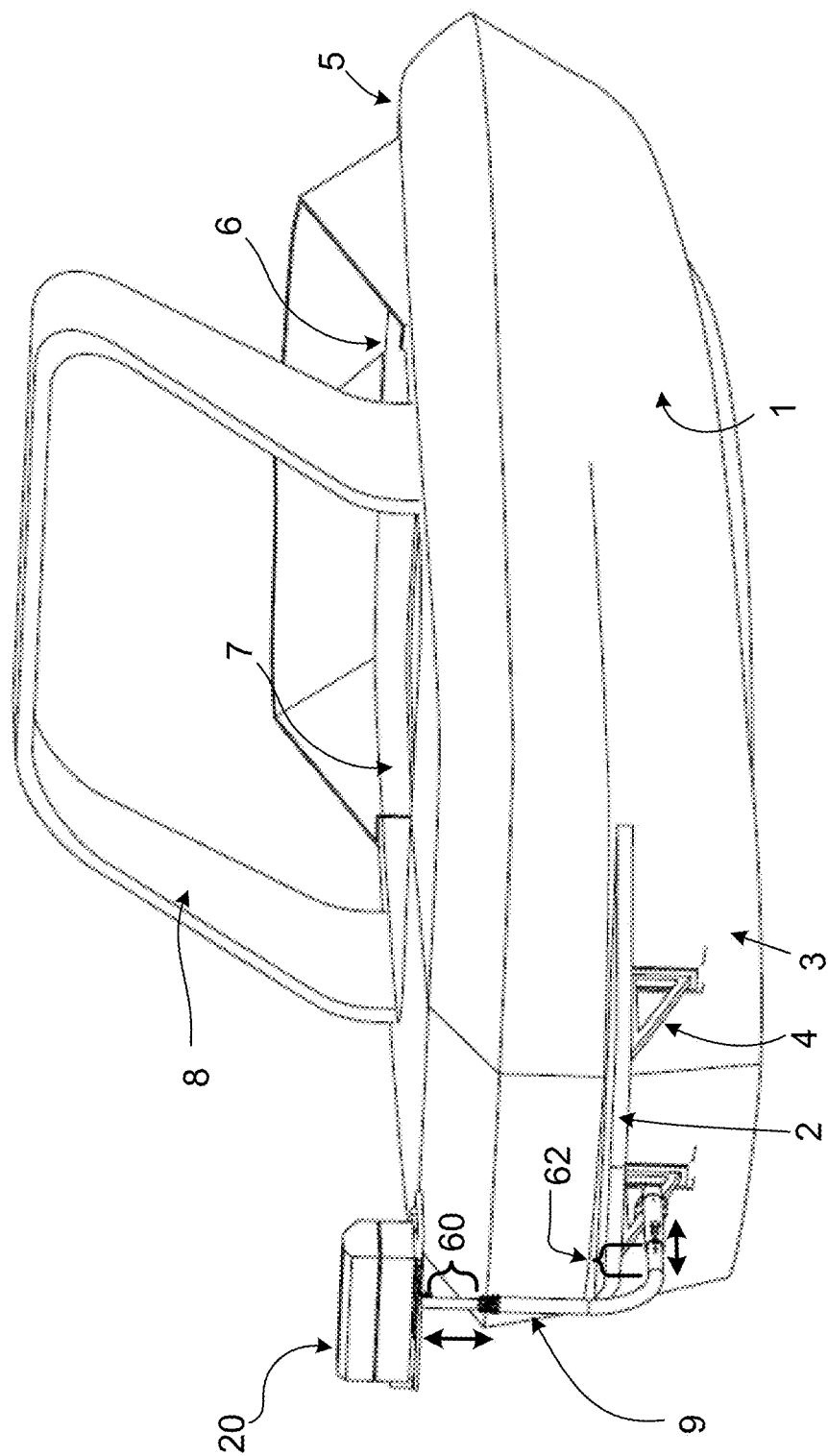
Figure 2C:
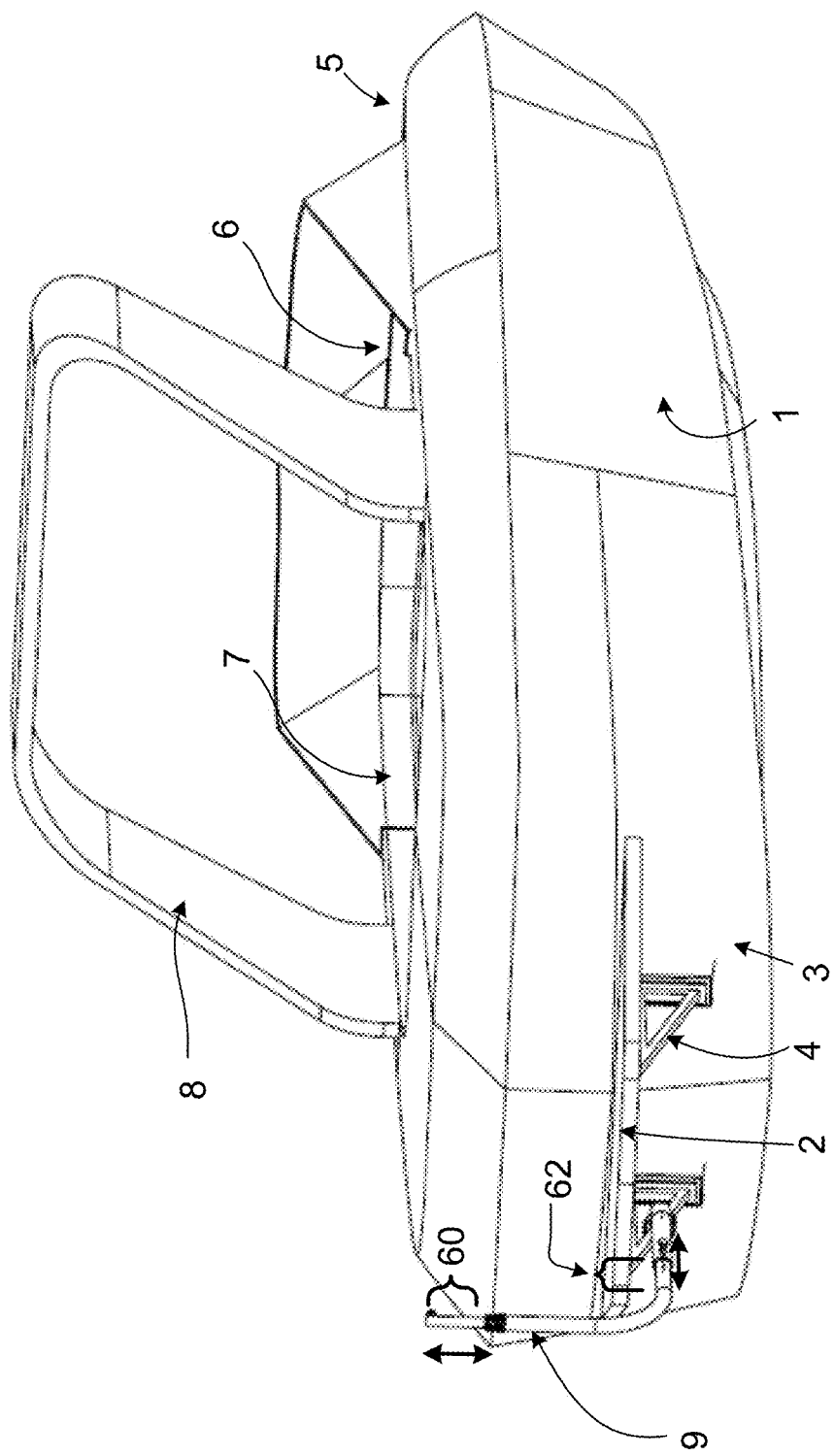

FIGS. 2A-C depict views of the boat 1 with an example universal mounting system 9 mounted to the swim platform 2. In the depicted example of FIGS. 2A-B, a grill 20 is coupled to the universal mounting system 9. In the depicted example of FIG. 2C, the grill 20 is removed. Further, in the examples, the universal mounting system is shown as a swim platform accessory mount 9 that attaches to one of the swim platform brackets 4. The swim platform accessory mount 9 provides an elevated location above the swim platform deck to which accessories can be mounted. The swim platform accessory mount 9 is attached to the swim platform bracket 4 without impacting the wake shape while the boat 1 is used and/or while the swim platform accessory mount 9 is used. For example, the swim platform accessory mount 9 follows the contours of the bracket 4 from near its attachment to the transom 3 and to the far edge of the swim platform 2. The swim platform accessory mount 9 extends beyond and around the far end of the swim platform 2 to an accessory mount that is positioned above the deck of the swim platform 2.

Furthermore, a location of the swim platform accessory mount 9 does not impede on any use of the swim platform 2 by one or more passengers. For example, given that the swim platform 2 in this example includes two brackets on either side of the swim platform 2, mounting to one of the brackets 4 causes the mount to be positioned on a side of the platform 2, which provides for ample space in the middle and on the other side (non-universal accessory mount side) for passengers to enter/exit the boat 1. For instance, the swim platform 2 remains fully functional as a means to enter and exit the boat 1 and/or a means to lounge, stand, sit, or engage in other activities while on the boat 1. The swim platform 2 as well as any other space on the boat remains fully functional and useable by the passengers while the swim platform accessory mount 9 is installed, in use, and/or not in use.

The universal mounting system 9 can be provided in any of a variety of configurations, including configurations that fixed along one or more dimensions (e.g., FIG. 2A) and configurations that are adjustable/extendible along one or more dimensions (FIG. 2B). For example, referring to FIG. 2A, an example configuration of the universal mounting system 9 is shown as being fixed (non-adjustable) along its various dimensions, including its height (vertical dimension) and its length (forward to aft dimension). In another example, referring to FIG. 2B, an example configuration of the universal mounting system 9 is shown with two example portions 60 and 62 that are adjustable/extendible along different dimensions. For example, a vertical portion 60 extending around and above a top surface of the swim platform 2 can be lengthened and/or shortened along a substantially vertical dimension—permitting the height of the universal mounting system to be adjusted as needed by a user. For instance, different heights for the universal mounting system can be used with different boats and swim platforms (e.g., some swim platform may be thicker than others), and different heights may be appropriate for different uses (e.g., different height used with grilling accessory versus storage accessories). In another example, a portion 62 extending laterally underneath the swim platform 2 can be lengthened and/or shortened along a substantially horizontal dimension—permitting a length of the universal mounting system underneath the swim platform 2 to be adjusted as needed by a user. For instance, different boats may have differently dimensioned swim platforms 2 (e.g., swim platforms with different forward to aft dimension), so adjusting the length of the portion 62 may permit a more accurate fit for the universal mounting system 9 to each boat. While FIG. 2B shows both the portion 60 and the portion 62 being included in the universal mounting system 9, some implementations can include the adjustable portion 60 and not the adjustable portion 62, and some implementation can include the adjustable portion 62 and not the adjustable portion 60. Additionally and/or alternatively, the universal mounting system 9 depicted in FIG. 2A (without adjustable portions 60 and 62) and/or FIG. 2B (with one or more adjustable portions 60 and 62) can include other adjustable portions that are adjustable along the same or different dimensions, and/or adjustable at different angles of attachment/connection between the components.

FIGS. 3A-G depict example components that can be combined to provide a swim platform accessory mount 9. Elements 10-12 are example components that make up the swim platform accessory mount 9. Elements 13-18 and 72 each provide a different method and/or configuration that can be used to attach/mount elements 10-12 (e.g., the swim platform accessory mount 9) to the boat 1. Mounting gear 50 is part of a lower portion of an accessory arm 10 and is used to mount the swim platform accessory mount 9 to the boat 1 by one of the various mounts described herein (e.g., mount 13, 14, 15, 16A-B, 18, and 71-72).

The swim platform accessory mount 9 can be installed in various locations of the boat 1, depending on the boat's make and/or model. The mount 9 can be installed on one or more swim platform brackets 4 via a universal platform bracket mount 13 or a universal platform solid side bracket mount 14. For example, if the one or more swim platform brackets 4 has cutouts or openings between the bracket 4, the swim platform 2, and the transom 3, then the preferred mount is the universal platform bracket mount 13. If, for example, the one or more swim platform brackets 4 is solid and does not have any cutouts or openings between the bracket 4, the swim platform 2, and the transom 3, then the preferred mount is the universal platform solid side bracket mount 14. In other embodiments, the swim platform accessory mount 9 can be installed using a universal under platform mount 15. The universal platform mount 15 attaches the swim platform accessory mount 9 to an underside of the swim platform 2. The swim platform accessory mount 9 can also be installed using a universal transom mount 16A and/or 16B, wherein the mount 16A is a bottom transom mount and the mount 16B is a side or aft transom mount, which appends the swim platform accessory mount 9 to the transom 3 of the boat, or a universal swim platform clamp mount 18, which clamps the swim platform accessory mount 9 around one side of the swim platform 2. The swim platform accessory mount 9 can also be installed using universal bracket mounts 71 and/or 72.

The swim platform accessory mount 9 comprises the mounting gear 50, the accessory arm 10, an upper accessory arm 11, and an accessory adapter 12. Alignment pins and fastener provisions can be included to easily locate and mate the swim platform accessory mount 9 with the accessory arm 10. The accessory arm 10 can be secured to the mount 9 using a threaded hand knob. The accessory arm 10 further provides for a structural connection between a mounting location on the boat 1 and a useful positon for attaching accessories (e.g., a grill) above and slightly aft of the swim platform 2. The upper accessory arm 11 can slide into the accessory arm 10. The upper accessory arm 11 includes height adjustment features that permit the upper accessory arm 11 to be adjusted to one or more heights according to a user's needs. For example, if the user is using the swim platform accessory mount 9 to attach a grill and grill food while standing, the user can adjust the height of the upper accessory arm 11 such that the grill is positioned at a comfortable standing height of the user. In another example, if the user is attaching a table platform to the swim platform accessory mount 9 and the user intends to be sitting on the swim platform 2 while using the table, the user can adjust the height of the upper accessory arm 11 to be lower and/or closer to the swim platform 2. One or more pins and fasteners can be used to easily modify the height of the upper accessory arm 11 and keep the upper accessory arm 11 stabilized and in place at the desired height of the user. In another example, a twisting mechanism can tighten around the upper accessory arm 11 once it slides into the accessory arm 10 and is adjusted to the user's desired height.

The upper accessory arm 11 can further include a slide lock that provides for a robust and simple connection between the upper accessory arm 11 and the accessory adapter 12. The accessory adapter 12 can be used to effectively mount any type of accessory. Example accessories include but are not limited to a grill, a chair or other seating arrangement, a table, a hammock, a drone landing pad, and/or other accessories that a user might enjoy while spending time on the boat. In some embodiments, the user can install an accessory directly on the upper accessory arm 11 without having to use the accessory adapter 12. In other examples, the accessory adapter 12 can attach to an accessory and remain attached to the accessory if and/or when the accessory is removed from the mounting configuration and/or stowed. Additionally, an accessory adapter extension 17 can be added and attached to the accessory adapter 12 if the user intends to attach an accessory that requires a higher mounting point. Example accessories that require a higher mounting point include but are not limited to hammocks, canopies, and/or umbrellas.

Figure 3A:
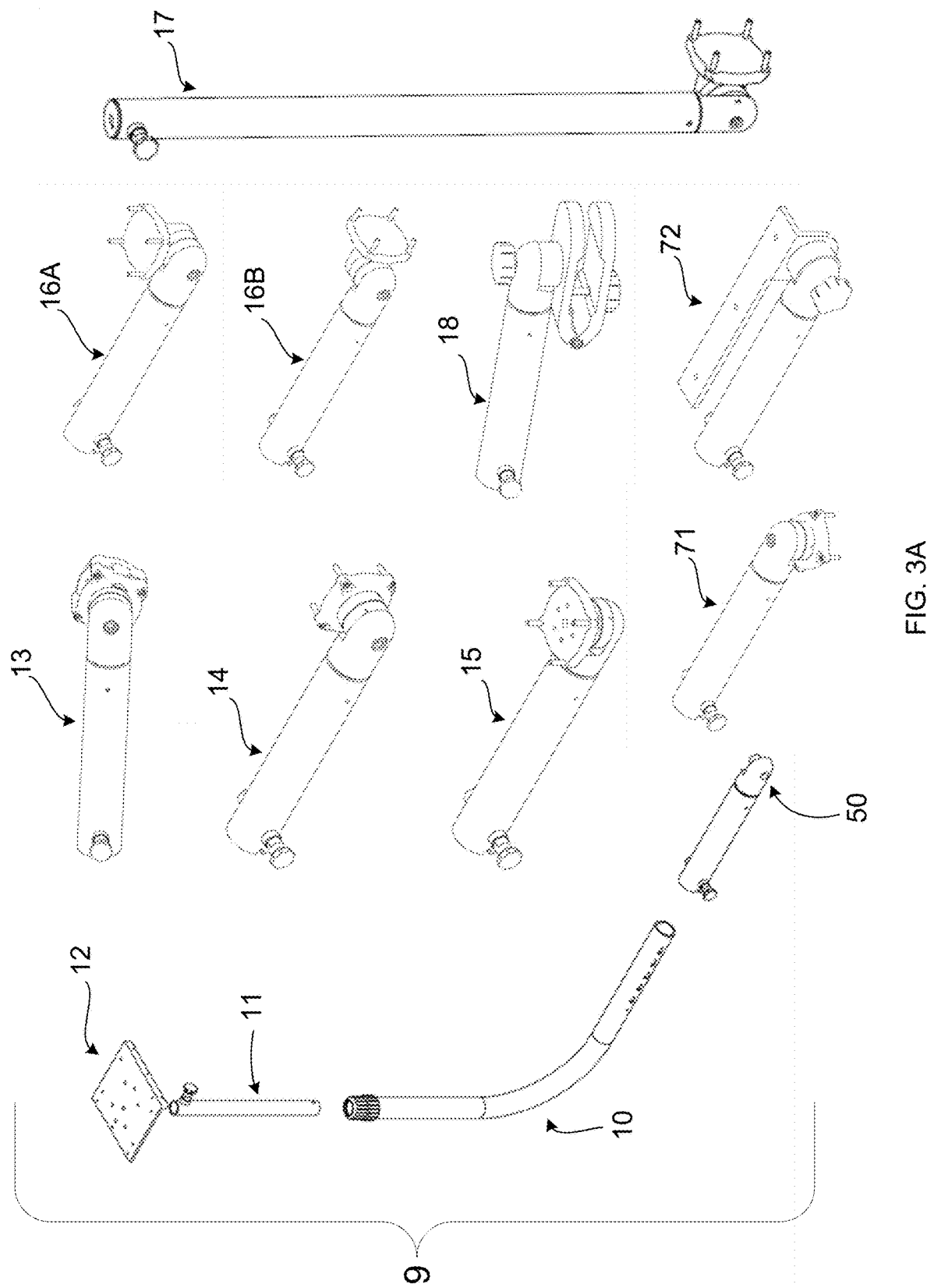
Figure 3B:
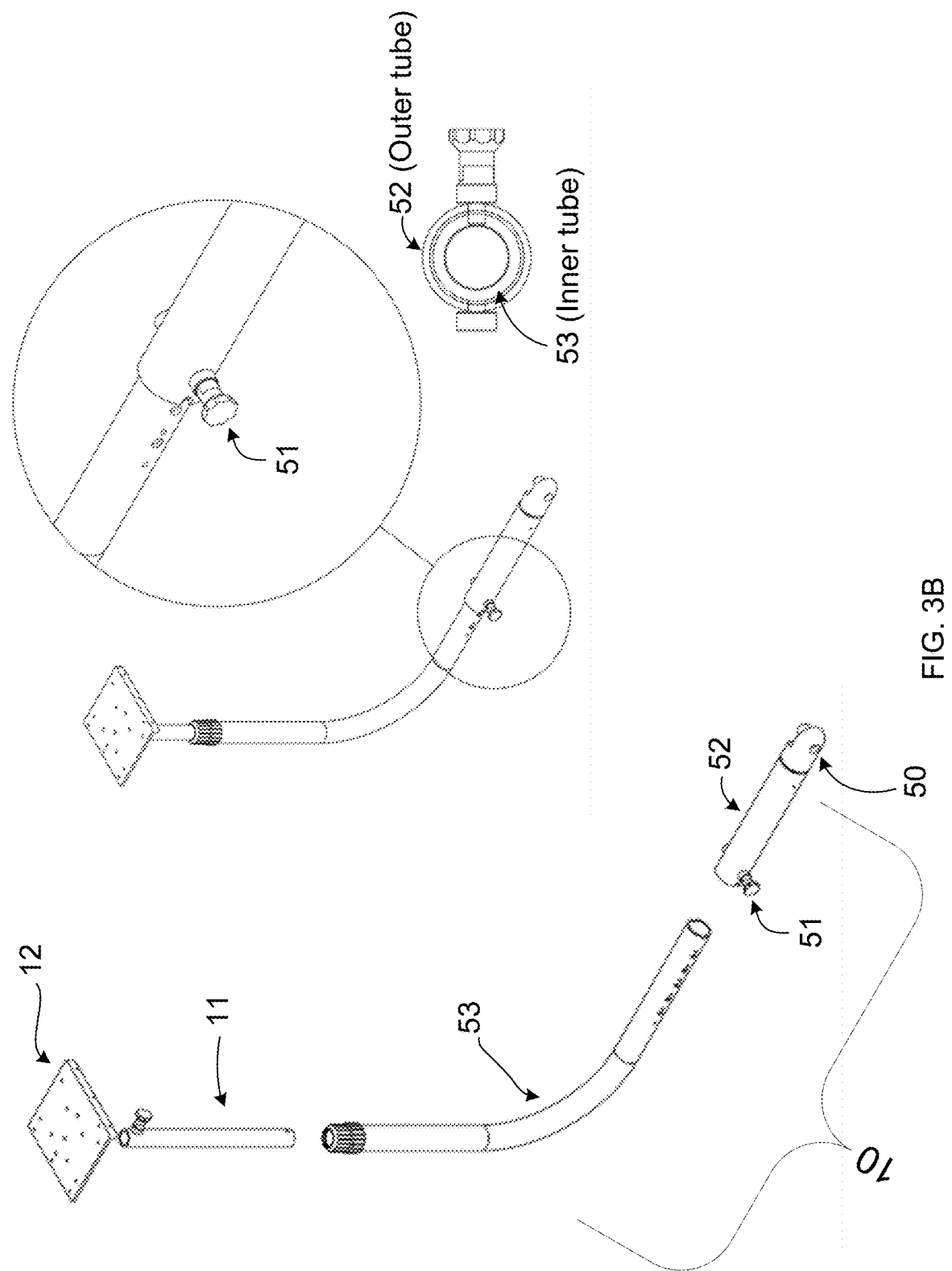

FIG. 3B depicts the accessory arm 10 in an embodiment where the accessory arm 10 is length adjustable in addition to being height adjustable. In this example, the accessory arm 10 includes a first component 52 that is attached to the boat and a second component 53 that is attached to the first component 52. The attachment between the components 52 and 53 is adjustable, permitting for the length of the resulting accessory arm 10—meaning that length from fore to aft along a horizontal plane—to be adjusted. As described above, the length adjustment of the accessory arm 10 can allow for the accessory arm 10 to fit any of a variety of differently sized boats and swim platforms. This configuration is advantageous because a user would not have to go under the boat to attach the accessory arm 10. The first component 52 can remain attached to the boat for as long as desired and remain as an open tube that awaits coupling with the second component 53.

In the depicted example, the components 52 and 53 are tubes with different diameters so that one can fit within the other. In this example, the component 53 is an inner tube 53 that fits within an outer tube 52 and can be locked into a fixed alignment with the outer tube 52 by a locking mechanism 51, which in this example is a plunger lock. Alternatively, at least one pin can fit through openings in both tubes 52 and 53, thereby holding the inner tube 53 locked securely within the outer tube 52 at the user's desired length (e.g., adjustment). Other configurations are also possible, such as the component 53 being a larger diameter tube that receives a smaller diameter tube 52, and/or the inner tube 53 and the outer tube 52 can also be adjacent pieces next to each other and/or fitted around each other without being fully enclosed in each other. The inner tube 53 and the outer tube 52 can be secured together with a plunger lock 51, which secures the tubes in place once the length is adjusted to the desired length. The plunger lock 51 can be positioned on the outer tube 52 in a variety of locations, including on a top portion, side, or bottom of the outer tube 52. The inner tube 53 and the outer tube 52 can be secured together using other attachment mechanisms, as well, such as with telescoping twist lock clamps, telescoping clamps, button clips, quick release ball lock pins, and/or other appropriate locking mechanisms. The height adjustment and attachment mechanism between the accessory arms 10 and 11 can similarly be any of a variety of appropriate locking mechanisms, such as plunger locks, telescoping twist lock clamps, telescoping clamps, button clips, quick release ball lock pins, and/or other appropriate locking mechanisms. The length adjustment features depicted in FIG. 3B can be used alone or in combination with any of the other features described throughout this document, and can be used in other embodiments described throughout this document. For example, embodiments described throughout this document can be both height and length adjustable, only height adjustable and not length adjustable, only length adjustable and not height adjustable, not adjustable along the height or length, and/or other adjustment configurations. FIG. 3C depicts an exploded view of the universal arm 17 with the transom mount 16B. The universal arm 17 includes a receiver (e.g., plug) 73 configured for receiving the accessory adapter 12. In this embodiment, the universal arm 17 is coupled directly to the mounting gear 50. FIG. 3D depicts an exploded view of the swim platform accessory mount 9. FIG. 3E depicts another view of the swim platform accessory mount 9. In these examples, the mounting gear 50 includes a twist hand knob 75 for tightening the accessory arm 10 to the mounting gear 50. The accessory arm 10 is a single bend accessory arm. FIG. 3G further depicts an example of the single bend accessory arm in use on the boat. As a result of the single bend accessory arm configuration, instead of having extensions extendable in at least a horizontal or vertical direction, the accessory arm 10 has a fixed length/height. This application is preferable for fixed installations that do not require adjustability and where the accessory arm will remain in place semi-permanently. Therefore, if a user prefers the accessory arm to remain attached to the boat for a period of time and the user does not seek to adjust a length and/or height of the accessory arm, the single bend accessory arm, as depicted in FIG. 3G, can be preferred. Still referring to FIG. 3E and FIG. 3G, the swim platform accessory mount 9 further includes a coupler 74 that is configured to screw/tighten around the accessory arms 10 and 11, thereby coupling (e.g., securing) them together. A user can tighten and/or loosen the coupler 74 to adjust the accessory arm 11 to a desired height. Moreover, in this embodiment, the receiver 73 is coupled to a bottom side of the accessory adapter 12 to then be fitted into an opening at the top of the accessory arm 11. A knob/pin can be configured to the top of the accessory arm 11 (as depicted) to tighten and/or lock in place the receiver 73.

Figure 3F:
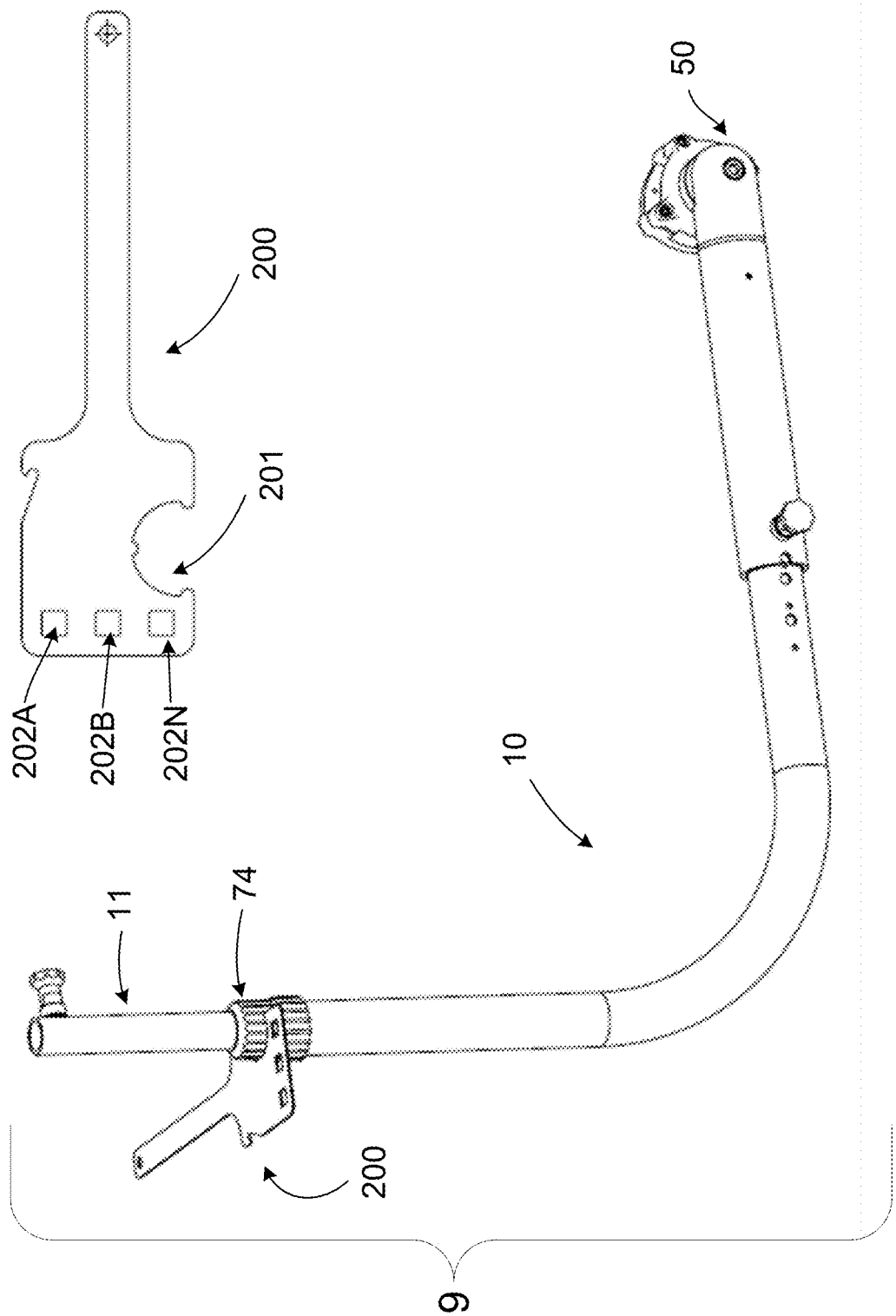
Figure 3G:
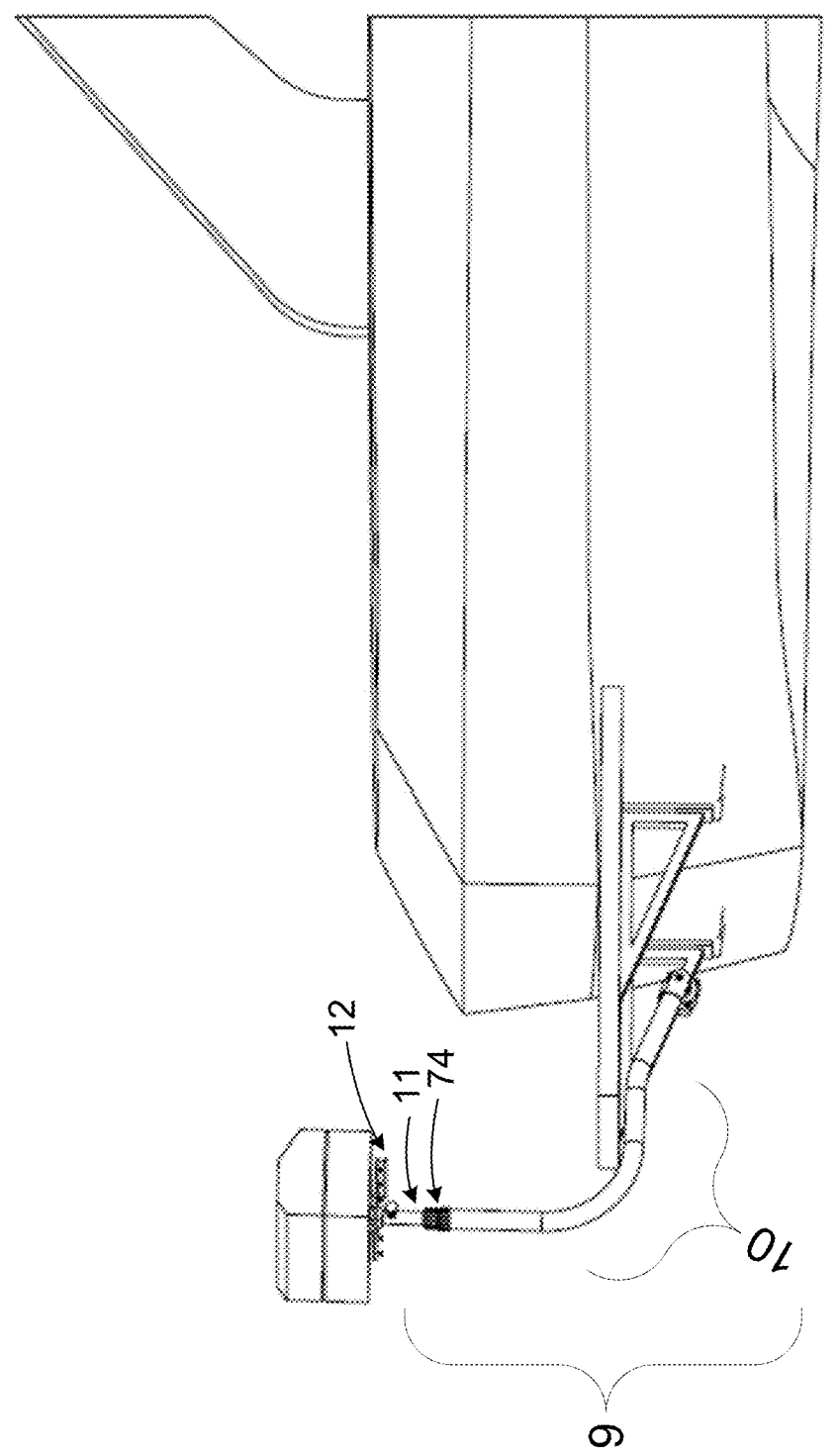

FIG. 3F depicts the swim platform accessory mount 9 with a multi-use spatula wrench 200. As mentioned throughout this disclosure (e.g., refer to FIG. 3B), the accessory arm 10 can include an extendible portion between a first end and a second end. The extendible portion can have an extendible height along a substantially vertical dimension. In some embodiments, as depicted, the extendible portion of the accessory arm 10 can be configured with the coupler 74 (e.g., a twist lock mechanism) that allows the inner tube (refer to the inner tube 53 in FIG. 3B) and the outer tube (refer to the outer tube 52 in FIG. 3B) to be locked together in any position, vertically and/or rotationally. In FIG. 3F, the spatula wrench 200 provides a spanner wrench portion 201 capable of loosening and tightening the coupler 74 (e.g., twist lock mechanism). While still functioning as a usable BBQ spatula, the spatula wrench 200 can be used to lock or unlock the coupler 74 (e.g., twist lock mechanism), allowing vertical and/or rotational adjustment of the accessory arm 10. The spatula wrench 200 further includes at least one specifically sized square 202A-N. The at least one square 202A-N is used to tighten and/or loosen a standard 9/16" inch square drain plug that can be commonly installed in watersport boats. In some embodiments, the at least one square 202A-N can have sides measuring between 0.566 inches and 0.573 inches. The at least one square 202A-N is advantageous because it becomes a common tool that a user might need on a boat. By incorporating common tools such as the spanner wrench portion 201 and the at least one square 202A-N into a tool, such as a spatula that is used for grilling food, the spatula wrench 200 can remain on the boat and serve multiple functions, no matter what the user needs it for.

Figure 4C:
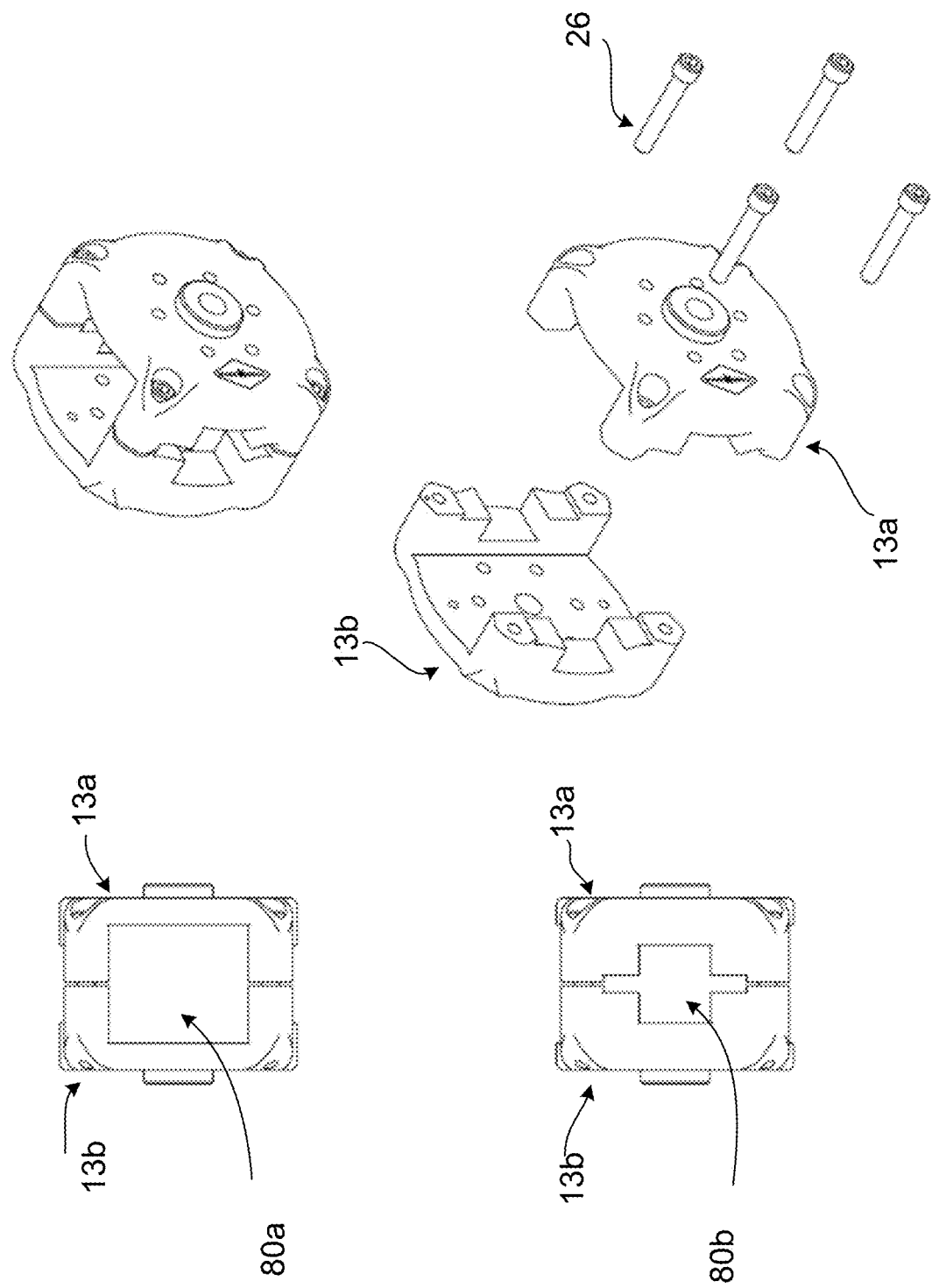
Figure 4D:
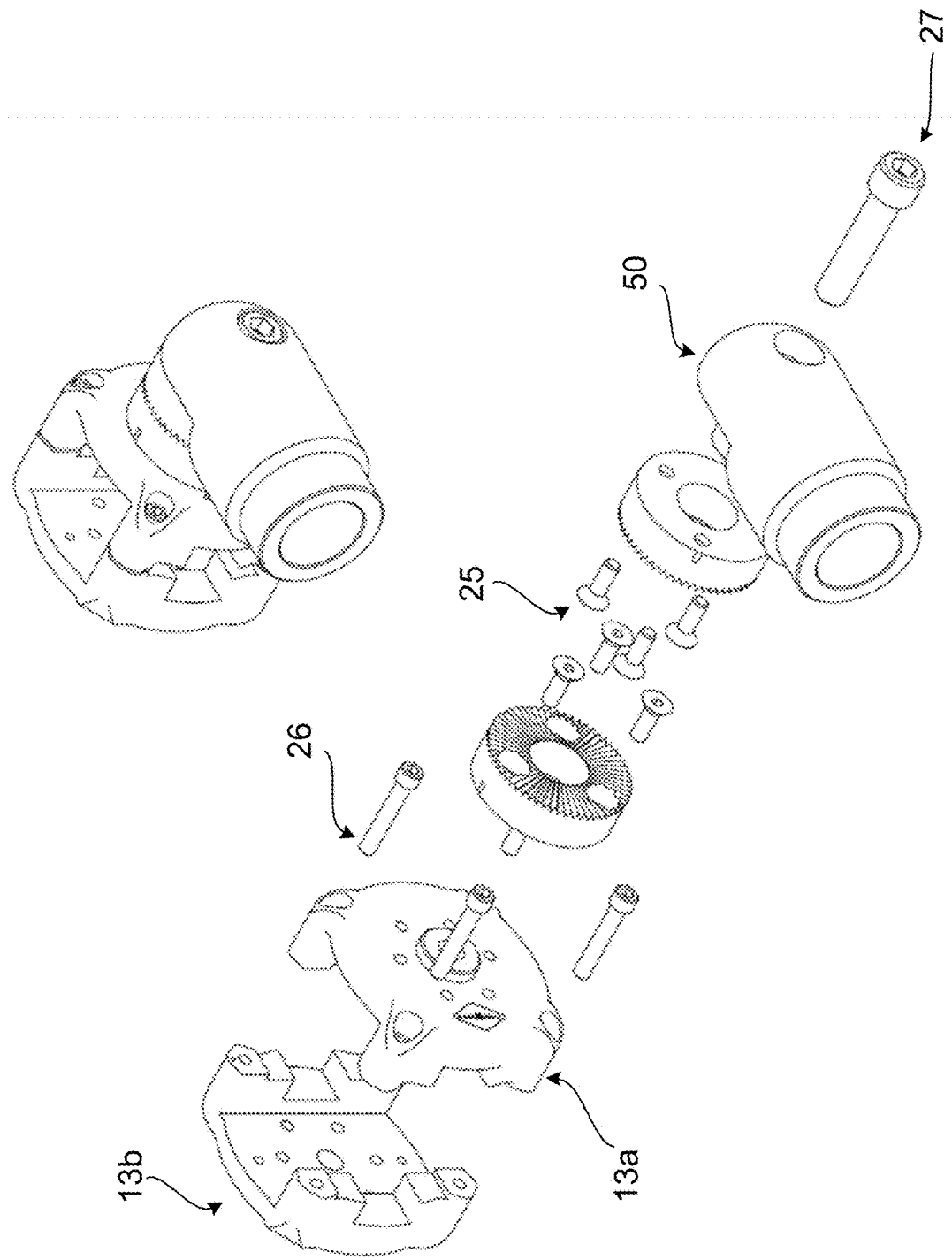
Figure 4E:
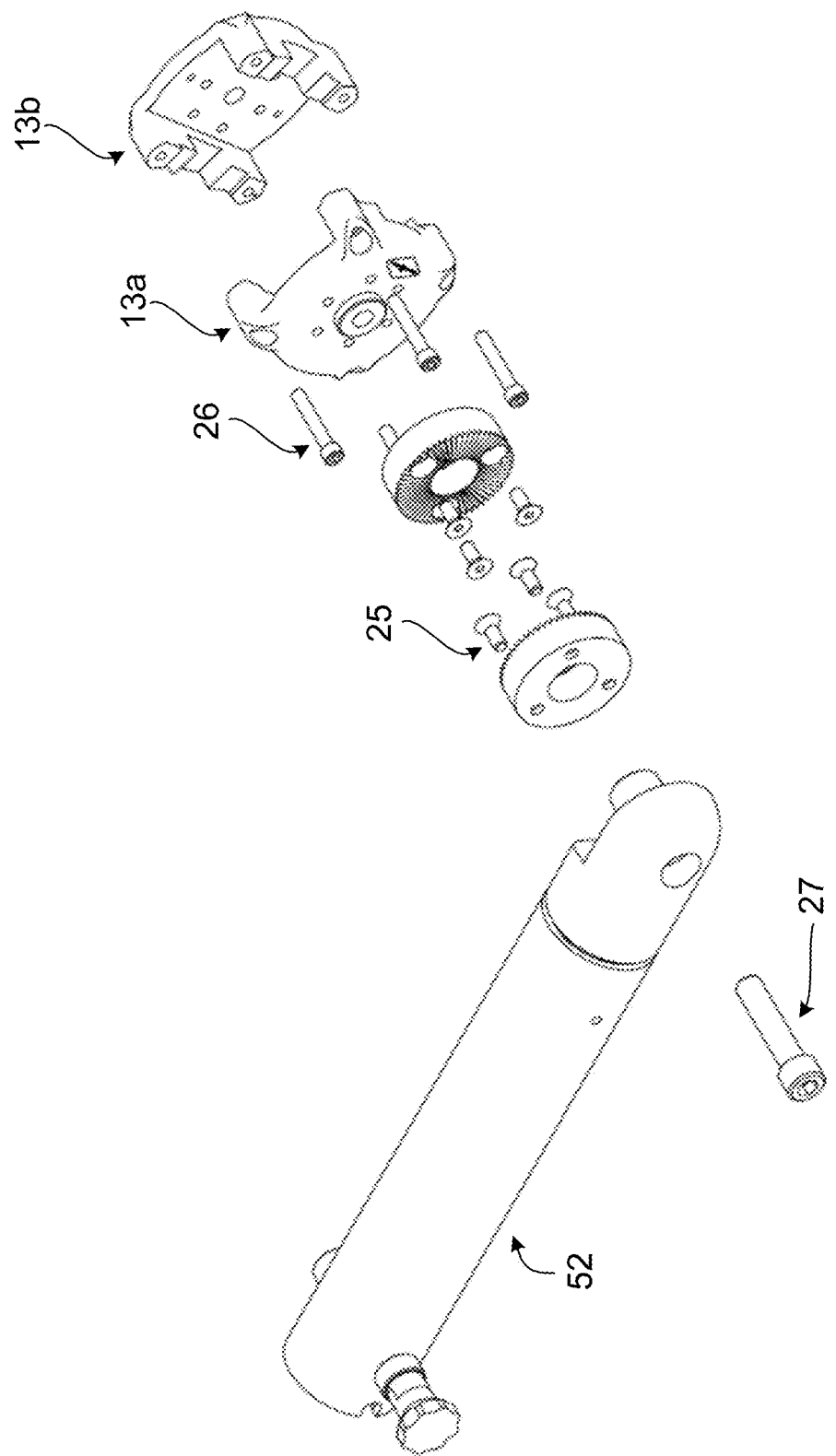

FIGS. 4A-E depict the universal platform bracket mount 13. FIG. 4A depicts a profile aft looking forward view of the universal platform bracket mount 13, FIG. 4B depicts a top view of the universal platform bracket mount 13, FIG. 4C depicts exploded views of the mount 13, as shown in FIG. 4A. FIG. 4D depicts exploded views of the mount 13, as shown in FIG. 4B. FIG. 4E depicts an exploded view of the universal platform bracket mount 13. In these views, the universal platform bracket mount 13 can be attached to the left and/or right swim platform bracket 4. The purpose of the universal platform bracket mount 13 is to allow installation of the swim platform accessory mount 9 without making any modification to the original equipment manufacturer (OEM) parts of the boat 1 that it is being installed on. The universal platform bracket mount 13 is designed to accommodate up to 6 major boat manufacturers that make swim platform brackets 4. The universal platform bracket mount 13 is a stepped configuration that secures around the existing swim platform cutout bracket 4, wherein two halves of the mount 13 are secured around the swim platform bracket 4 using one or more threaded fasteners 26 (e.g., bolts). The mount 13 can be secured in a desired position by the user. The specifically-sized steps allow for the mount 13 to restrain the swim platform bracket 4, depending on the manufactured size of the swim platform bracket 4.

The table in FIG. 4A depicts one or more widths and heights of the longest (e.g., tallest, narrowest) rectangles (e.g., steps) comprising the aperture (e.g., opening) shown in a center portion of the mount 13, wherein a first side 13a and a second side 13b are coupled together by bolts 26. The swim platform bracket 4 goes through this aperture, and fits into one of the steps created by the aperture in the mount 13. In this embodiment, each one of the tallest rectangles depicted by the aperture corresponds to one swim platform bracket 4 manufacturer. For example, in this embodiment, 4 long rectangles (e.g., steps) comprise the aperture and correspond to numerous swim platform bracket 4 manufacturers. Each pair of one width and one height corresponds to a rectangle that represents a width and a height of each of the swim platform brackets 4 that are supported by the universal platform bracket mount 13. For example, one rectangle with a width of 1.12" and a height of 0.96" corresponds to a swim platform bracket 4 that has a width of 1.12" and a height of 0.96". It follows that in this particular embodiment, the other swim platform brackets 4 that are supported by the universal platform bracket mount 13 include one with a width of 1.72" and a height of 1.98", another with a width of 0.25" and a height of 2.00", and another with a width of 1.40" and a height of 1.00." In some instances different swim platform bracket 4 manufactures us the same heights listed (within 0.1" tolerance) and varying widths that aren't listed. The varying widths are universally covered by adjustment of threaded fasteners 26 (e.g. bolts) to match the width sizing. Referring to FIG. 4C, 80a and 80b are first and second exemplary openings that are depicted in the table in FIG. 4A.

Once the universal platform bracket mount 13 is installed, the accessory arm 10 can be easily installed, as depicted in FIG. 4B's top view, FIG. 4D and FIG. 4E's exploded side views. The accessory arm 10 can be installed by reaching under the swim platform 2, sliding the accessory arm 10 over one or more alignment pins 25, and securing in place the accessory arm 10 by using/turning a hand knob 27. In some embodiments, instead of the hand knob 27, a screw, pin, and/or bolt 27 can be used. The alignment pins 25 and the hand knob 27 extend out from a supportive part of the swim platform 2 into a conveniently located position at one end of the accessory arm 10. The alignment pins 25 create longitudinal stability so that the accessory arm 10 does not move and can support a weight of any type of accessory mounted onto the swim platform accessory mount 9. In one embodiment, the universal platform bracket mount 13 may only require one alignment pin 25 (e.g., where an accessory that will be installed on the accessory mount 9 is lightweight, such as a flag). In other embodiments, the mount 13 may require two or more alignment pins 25 to increase the longitudinal stability of the swim platform accessory mount 9 (e.g., where an accessory that will be installed on the accessory mount 9 is heavy, such as a TV screen, a grill, and/or a hammock).

The upper accessory arm 11 can then be installed following the installation of the accessory arm 10. In another embodiment, the upper accessory arm 11 can be installed on the accessory arm 10 before the accessory arm 10 is installed and secured using the universal platform bracket mount 13. In the latter embodiment, the accessory arm 10 and the upper accessory arm 11 can be installed simultaneously onto the universal platform bracket mount 13 as an assembly. Once the universal platform bracket mount 13, the accessory arm 10, and the upper accessory arm 11 are installed on the boat 1, any accessory can be mounted and utilized via the accessory adapter 12 and/or the accessory adapter extension 17.

In some embodiments, the accessory arm 10, the upper accessory arm 11, and/or the assembly of both the accessory arm 10 and the upper accessory arm 11 can be easily installed and/or detached while the boat 1 is in the water, in use, or not in use. The accessory adapter 12 as well as the accessory adapter extension 17 can also be easily installed and/or detached while the boat 1 is in the water, in use, or not in use. The accessory adapter 12 and the accessory adapter extension 17 can further be stored onboard the boat 1. Although it is feasible, the accessory arm 10 should not be removed from the swim platform accessory mount 9 while the boat is being used (e.g., is driven and/or is towing a person, a watersport accessory, and/or any other type of accessory).

Figure 5C:
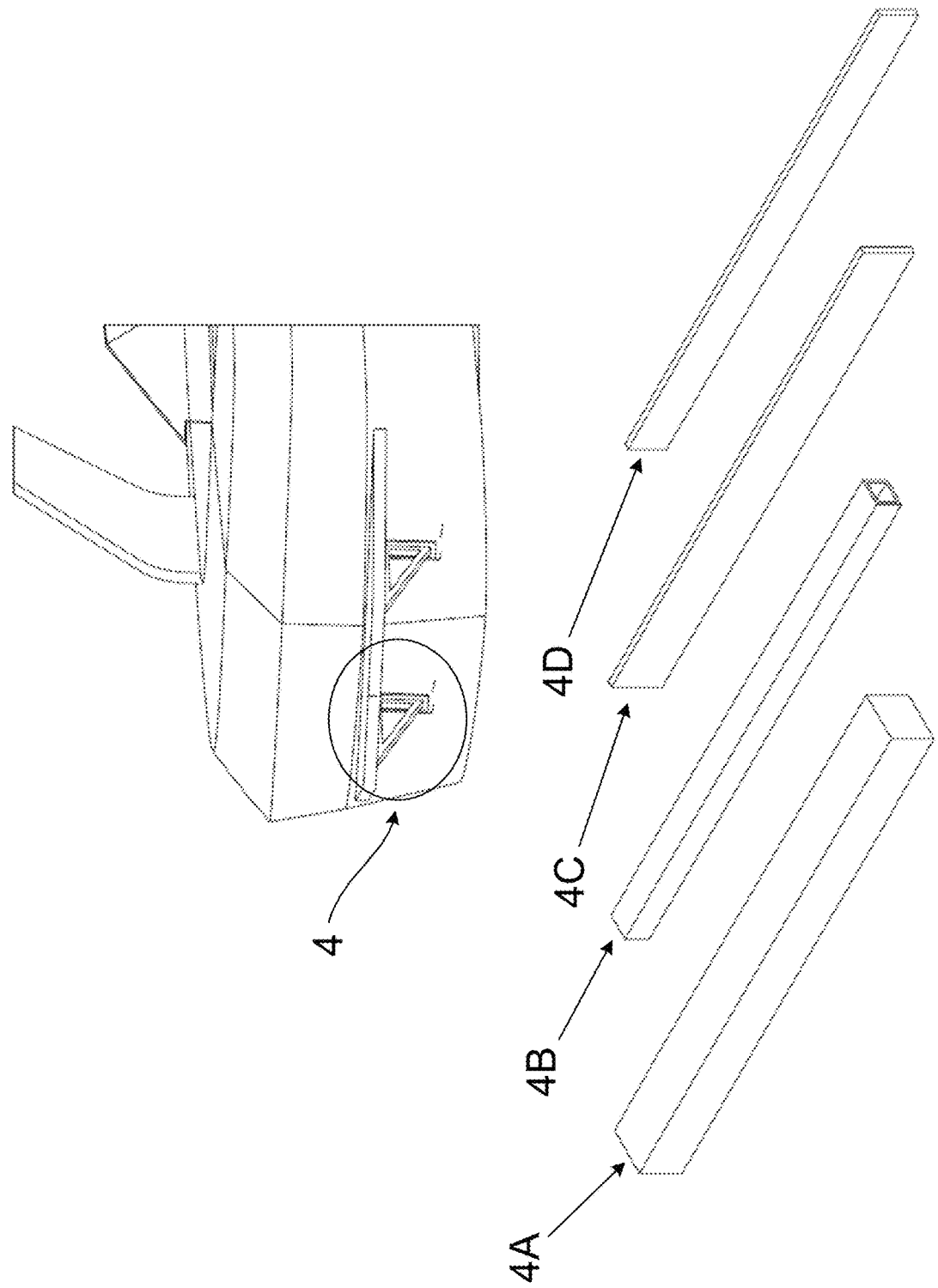

FIGS. 5A-D depict exemplary mounting configurations using the universal platform bracket mount 13. FIGS. 5A and 5C demonstrate one or more various sizes of standard swim platform brackets 4. These sizes (referring to brackets 4A-D in FIG. 5C) are according to one or more swim platform bracket 4 manufacturers. To accommodate for the differently sized swim platform brackets 4, the universal platform bracket mount 13, as depicted in FIG. 4A, can accordingly attach to the various sizes of standard platform brackets 4. For example, depending on the size of the swim platform bracket 4, one or more threaded fasteners 26 (e.g., bolts) can secure the mount 13 to the swim platform bracket 4.

Figure 5D:
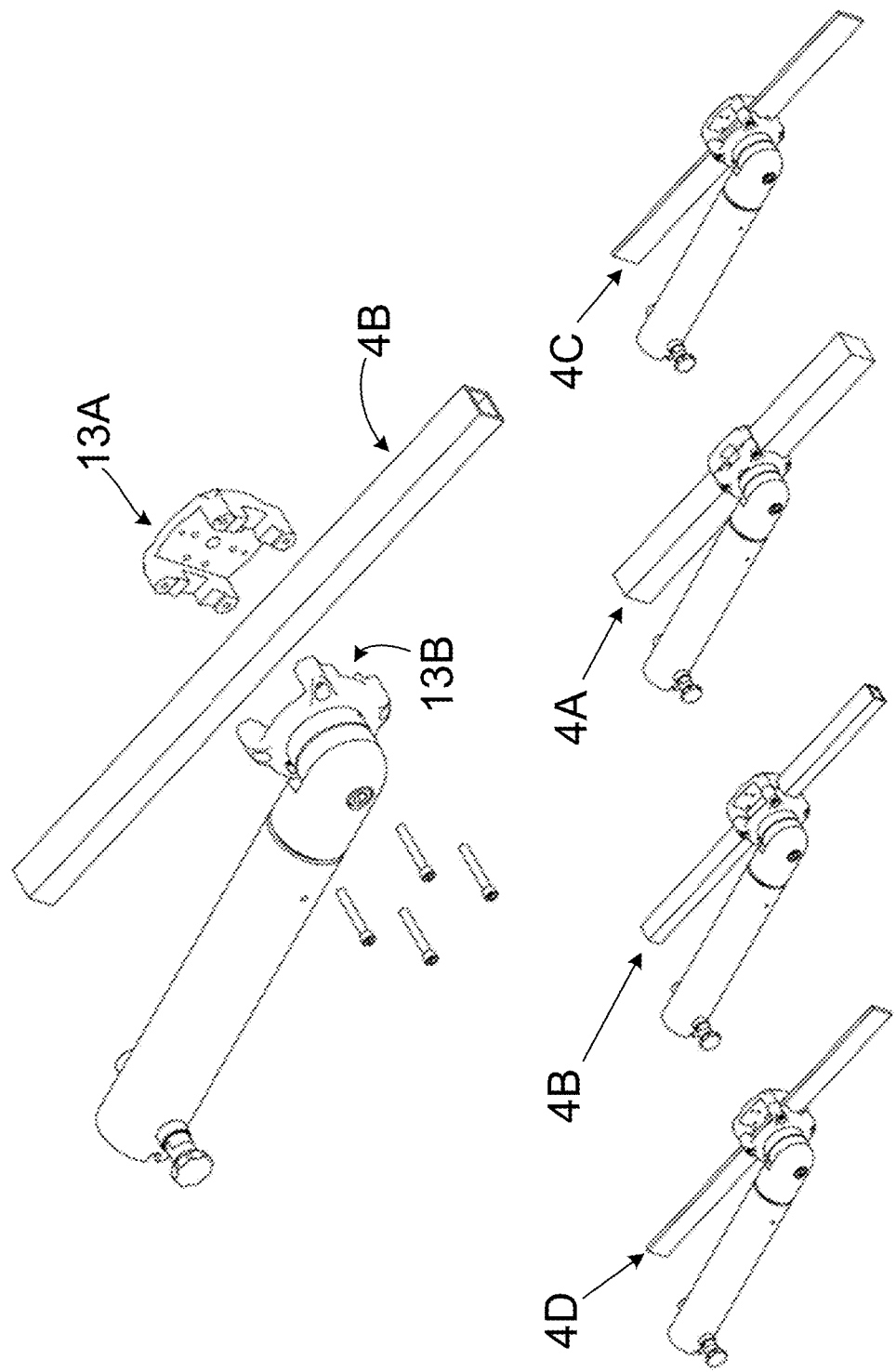

In one embodiment, as shown in FIGS. 5B and 5D, an upper portion 13A of the universal platform bracket mount 13 can be installed above the bracket 4 and secured in place to a lower portion 13B of the universal platform bracket mount 13, where the lower portion 13B is placed below the swim platform bracket 4 (referring to the upper portion 13A being installed above one of the brackets 4A-D and secured in place/coupled to the lower portion 13B in FIG. 5D). The upper portion 13A and the lower portion 13B are secured together around the swim platform bracket 4 with one or more bolts 26. Additionally, the one or more alignment pins 25 as well as the hand knob attachment post 27 can attach the accessory arm 10 to an outside side portion of the universal platform bracket mount 13 so that the knob 27 is easy to reach and maneuver by the user on the swim platform 2, in the water, and/or on the ground below the boat (e.g., when the boat is on lifts or on a trailer on land). Additionally, the alignment pins 25 and the knob 27 can be placed so as not to interfere with the swim platform bracket 4. As a result, the wake shape is not affected and/or passengers can be in the water and grab onto the swim platform bracket 4 without any obstruction. Thus, traditional uses of the swim platform 2 and/or the swim platform brackets 4 will not be impacted by the addition of the universal platform bracket mount 13 and/or the swim platform accessory mount 9.

Figure 6E:
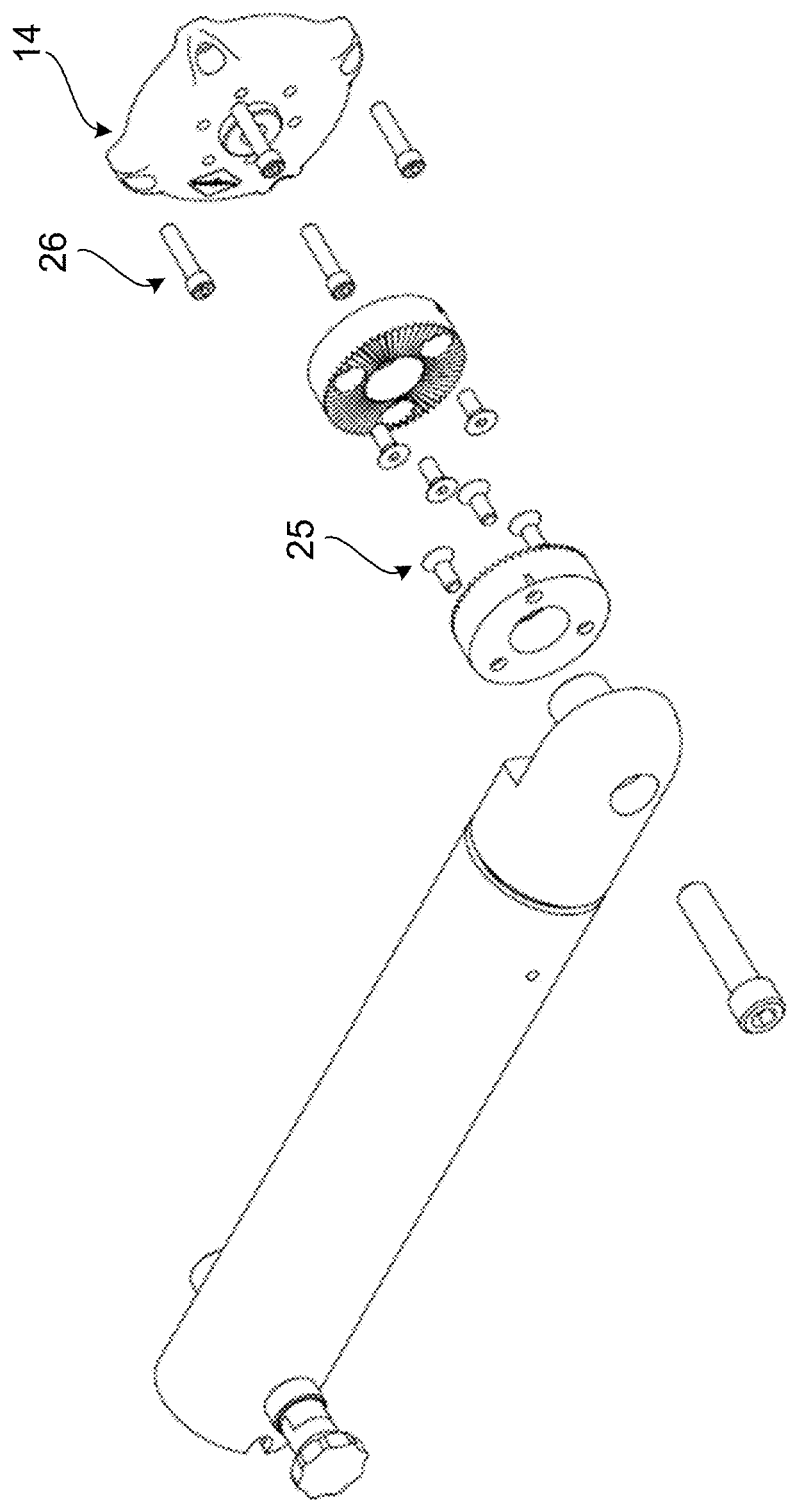

FIGS. 6A-F depict exemplary uses of a universal platform solid side bracket mount 14. FIG. 6A depicts a profile top view looking down on the universal platform solid bracket mount 14 secured/fastened to the solid swim platform bracket 4 (represented by dashed lines 65). FIGS. 6C-D further depict exploded top views looking down on the universal platform solid bracket mount 14 as it is secured/fastened to the solid swim platform bracket 4. The universal platform solid bracket mount 14 can be installed on either the left and/or the right solid swim platform bracket 4. FIG. 6B depicts a top view of the universal platform solid bracket mount 14 as it is secured to the solid swim platform bracket 4 and the accessory arm 10 is secured to the universal platform solid bracket mount 14. FIG. 6E depicts an exploded view of the universal platform solid side bracket mount 14 and FIG. 6F depicts an exploded top view of the universal platform solid bracket mount 14.

The purpose of the universal platform solid side bracket mount 14 is to allow installation of the swim platform accessory mount 9 to the boat 1 by only making minor modifications to the OEM swim platform bracket 4 that it is being appended to. The embodiments of FIGS. 6A-F are best used where the swim platform bracket 4 is solid and does not have any openings (e.g., cutouts between the swim platform bracket 4, the swim platform 2, and the transom 3) that a mount can be secured around. As a result, some drilling into the solid swim platform bracket 4 will be necessary in this embodiment.

The universal platform solid bracket mount 14 is a variation of the universal platform bracket mount 13. Whereas the universal bracket mount 13 comprised the upper portion 13A and the lower portion 13B, the universal platform solid bracket mount 14 only comprises one portion. This configuration secures to an existing solid swim platform bracket 4 (e.g., where there are no cutouts in the swim platform bracket 4 for a user to grab onto when he or she is in the water) where it is not feasible to clamp a mount around the swim platform bracket 4. In this embodiment, the universal platform solid bracket mount 14 is drilled (e.g., secured) into the solid swim platform bracket 4 by using at least 4 bolts 26 (e.g., threaded fasteners). The bolts 26 can be placed in a desired location by the user. The solid part of the swim platform bracket 4, where the bolts 26 are drilled through to connect and secure the universal platform solid bracket mount 14 to the swim platform bracket 4, is demonstrated by dashed lines. The rest of the embodied mounting configuration is the same as described herein for the universal platform bracket mount 13.

Figure 7A:
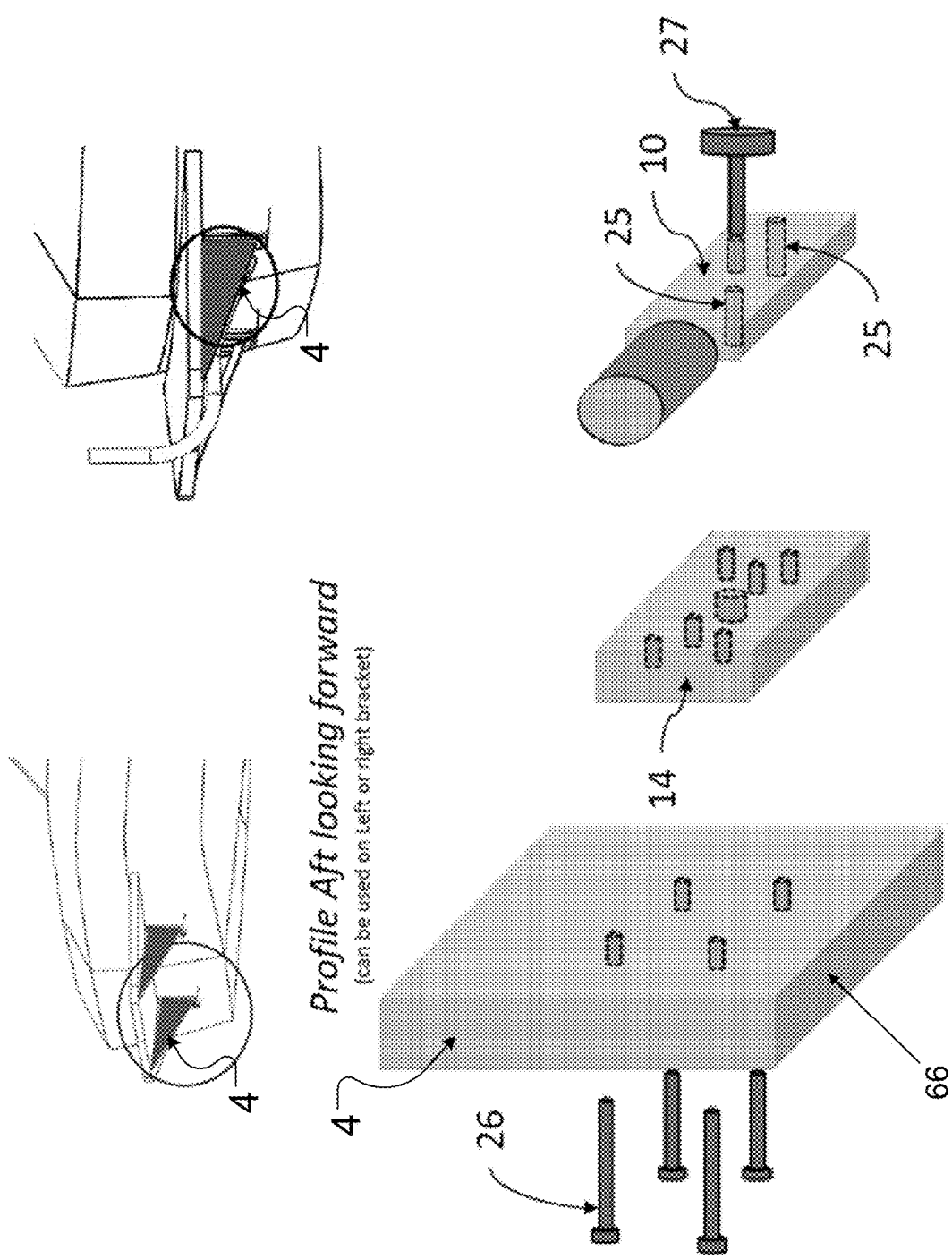
FIGS. 7A-B depict a mounting configuration using the universal platform solid bracket mount.
Figure 7B:
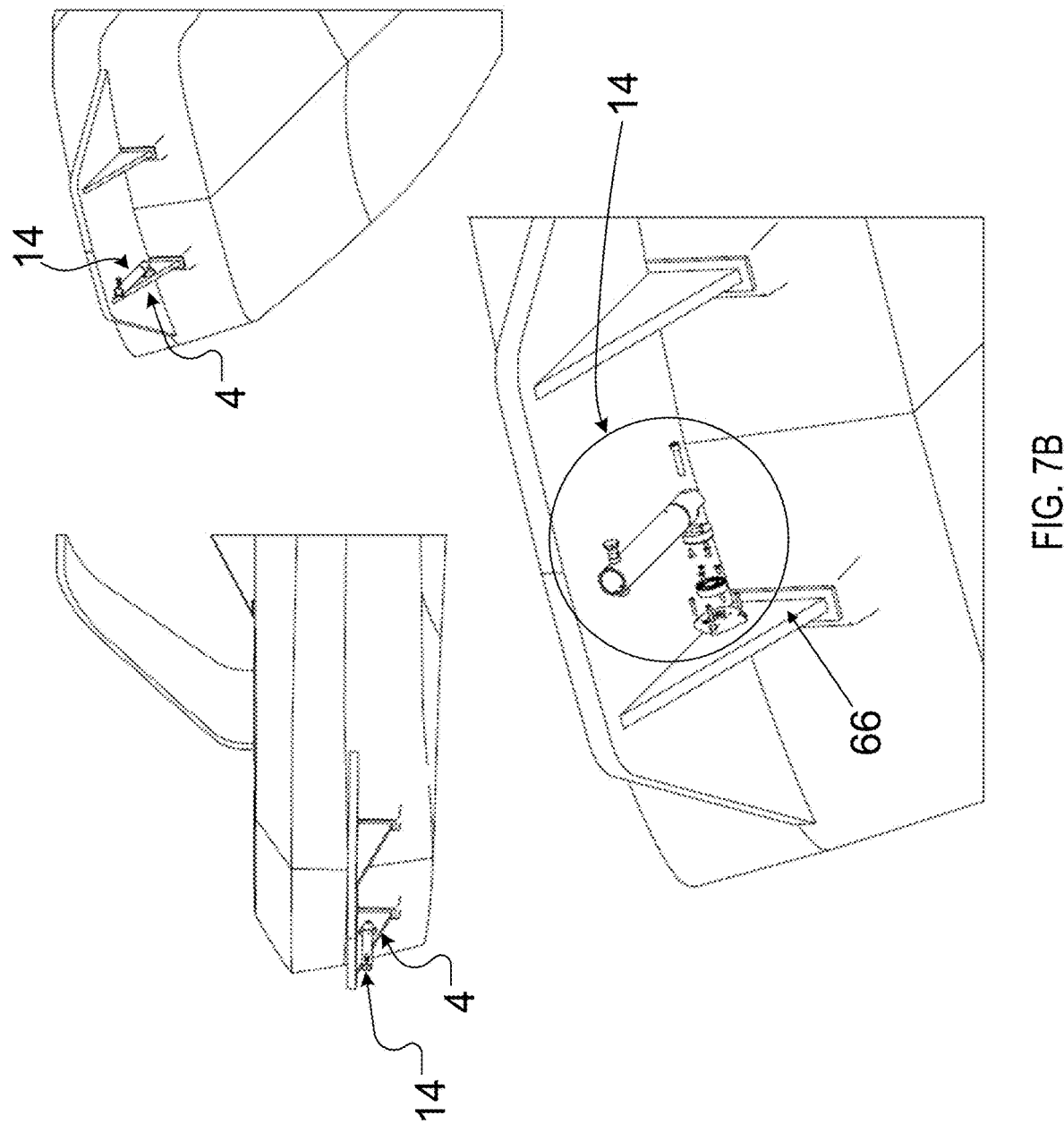

FIGS. 7A-B depict a mounting configuration using the universal platform solid side bracket mount 14. In the embodiments depicted in FIGS. 7A-B, the universal platform solid bracket mount 14 is attached to the solid part 66 of the swim platform bracket 4, and can be placed either on a right side (e.g., inner portion, refer to FIG. 4B) or a left side (e.g. outer portion, refer to FIG. 4A) of the swim platform bracket 4. The universal platform solid bracket mount 14 can be attached to either a left or a right swim platform bracket 4. The one or more bolts 26 go through the solid part 66 of the swim platform bracket 4 and through the universal platform solid bracket mount 14 to secure it in place. Additionally, the one or more alignment pins 25 as well as the hand knob attachment post 27 can be attached to an outer side of the universal platform solid bracket mount 14 such that the knob 27 is easy to reach and maneuver by the user on the swim platform 2, in the water, and/or on the ground below the boat (e.g., when the boat is on lifts or on a trailer on land). Additionally, the alignment pins 25 and the knob 27 can be placed so as not to interfere with the swim platform bracket 4 so that the wake shape is not affected. Therefore, traditional uses of the swim platform 2 and/or the swim platform brackets 4 are not negatively impacted by adding the universal platform solid bracket mount 14 and the swim platform accessory mount 9. Once the universal platform solid bracket mount 14 is secured to the solid part 66 of the swim platform bracket 4, the accessory arm 10 can be attached to the universal platform solid bracket mount 14 and further stabilized by the one or more alignment pins 25.

Figure 8B:
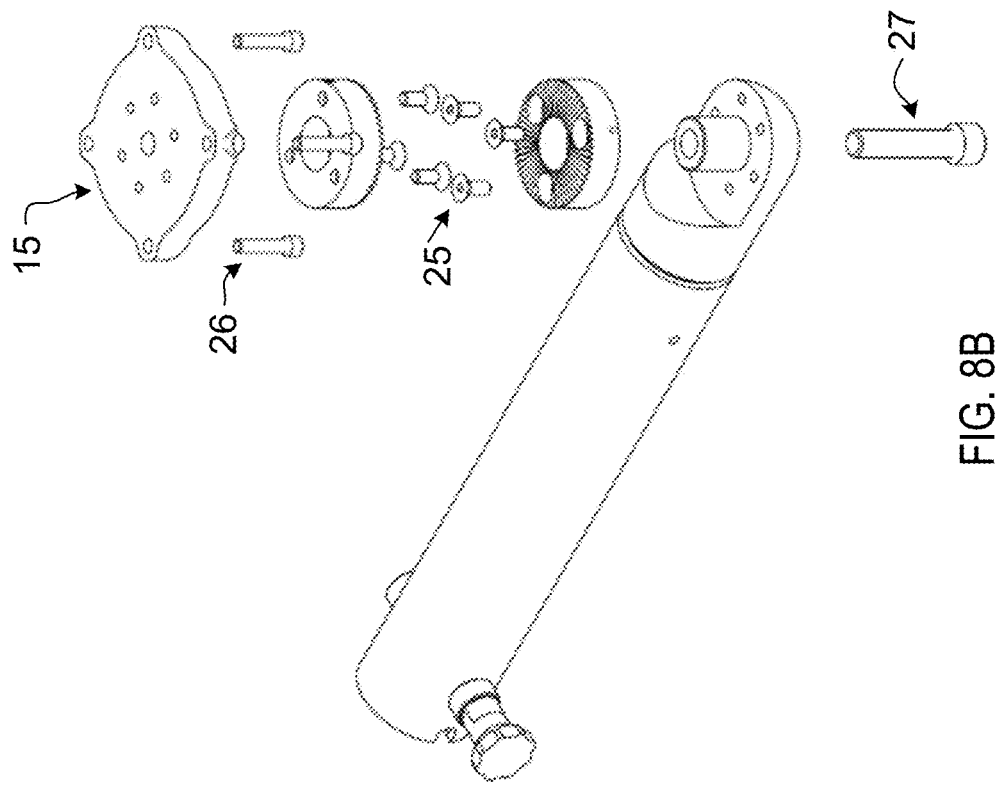
FIGS. 8A-C depict a universal under platform mount.
Figure 8A:
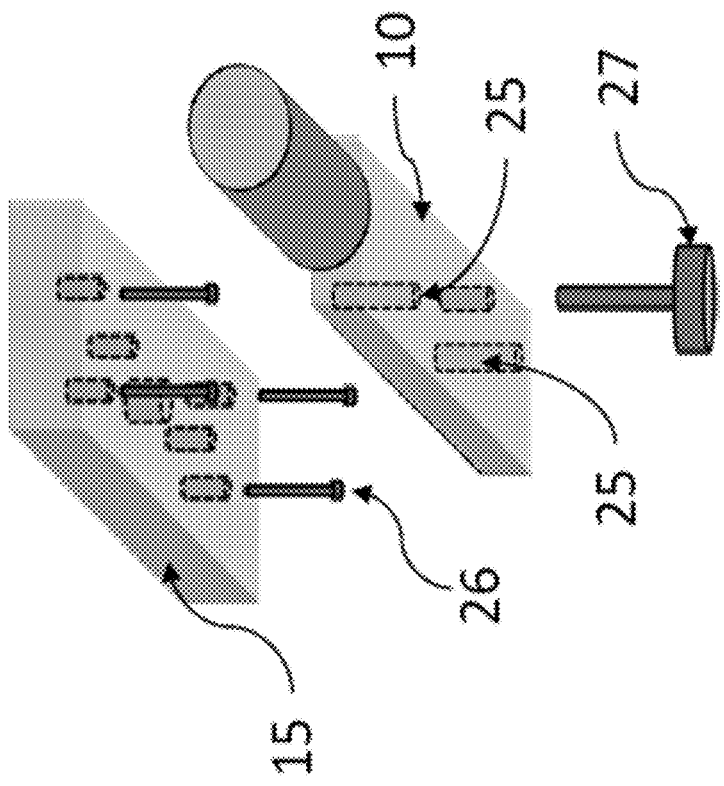
Figure 8C:
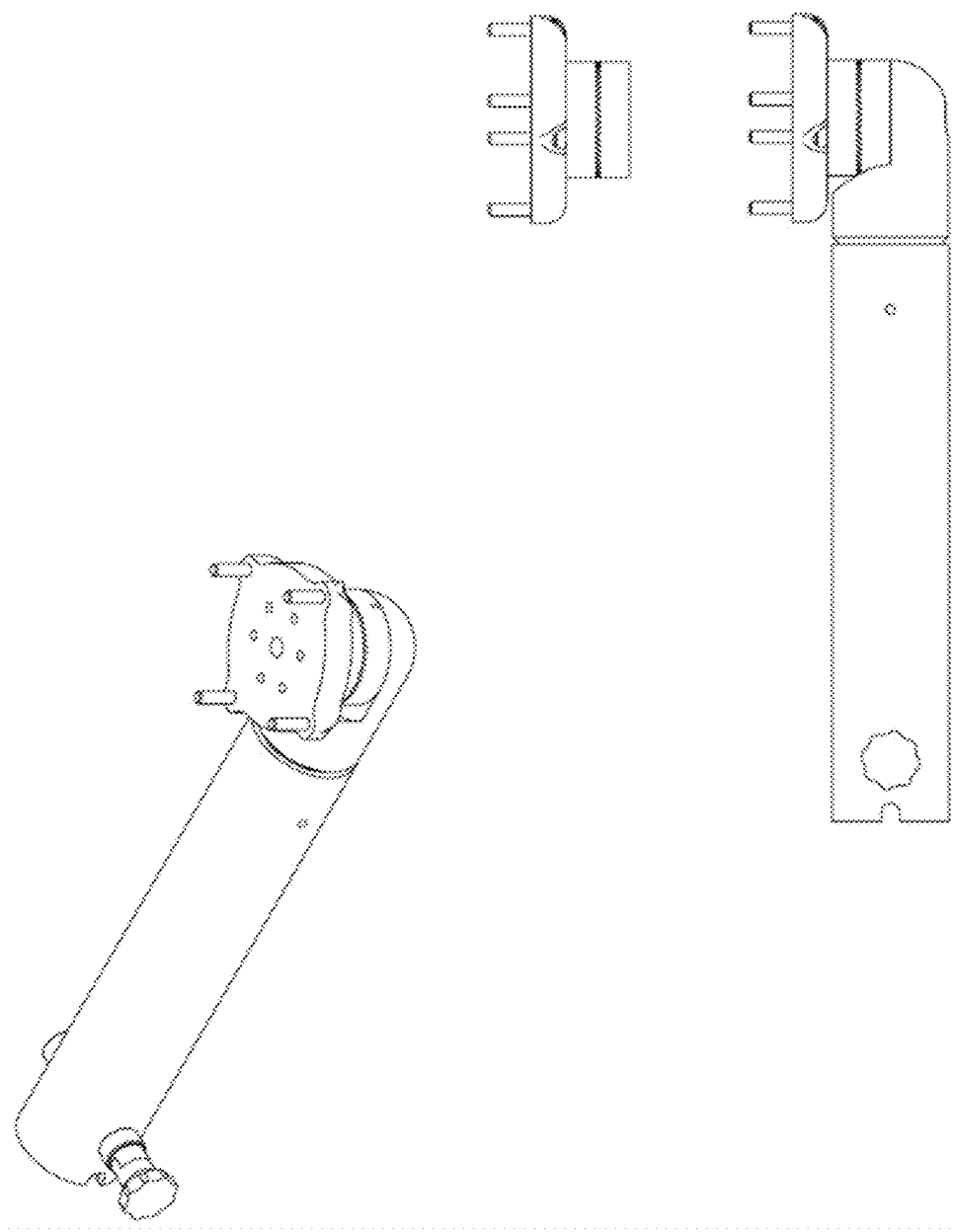

FIGS. 8A-C depict a universal under platform mount 15. FIG. 8A depicts the universal under platform mount 15 from a profile aft view, looking forward. FIG. 8B depicts an exploded upper view of the universal under platform mount 15. FIG. 8C depicts additional exemplary views of the universal under platform mount 15. The universal under platform mount 15 can be used in any desired location on the swim platform 2. For example, if the user desires to install a grill on the swim platform accessory mount 9 but wants the grill to be in a corner that is farthest away from the rest of the boat 1, the user can install the universal under platform mount 15 in the corner that is farthest away from the rest of the boat 1. Regardless of the location and/or placement of the universal under platform mount 15, the stability of the swim platform accessory mount 9 and the wake shape of the boat 1 will not be impacted. The purpose of the universal under platform mount 15 is to allow installation by only making minor modifications to the OEM swim platform 2 that it is being installed on. The embodiment of FIG. 8 is best used where the swim platform 2 does not have one or more swim platform brackets 4 and/or where the user does not want to secure the swim platform accessory mount 9 on or around one or more swim platform brackets 4 or directly on the transom 3. As a result, the universal under platform mount 15 is placed directly under the swim platform 2 and secured into the swim platform 2 by drilling into the swim platform 2.

The universal under platform bracket mount 15 is a variation of the universal platform bracket mount 13. Whereas the universal bracket mount 13 comprised the upper portion 13A and the lower portion 13B, the universal under platform mount 15 only comprises one portion. This configuration secures to an existing swim platform 2. Similar to the universal platform bracket mount 13, the universal under platform mount 15 is drilled (e.g., tethered) onto an underside of the swim platform 2 by using at least 4 bolts 26. The bolts 26 can be placed in a desired location by the user. The rest of the embodied mounting configuration is the same as described herein.

FIGS. 9A-B depict a mounting configuration using the universal under platform mount 15. In these exemplary embodiments, the mount 15 is placed and secured on the underside (e.g., bottom) of the swim platform 2 and secured in place by drilling at least one or more bolts 26 through the universal under platform mount 15 and into the swim platform 2. As described throughout, the one or more alignment pins 25 and the hand knob 27 are positioned such that the user can easily reach and use them whether the user is in the water, on the boat 1, on the swim platform 2, or on land. As a result of this configuration, the accessory arm 10 extends out from under the swim platform 2 and reaches around the swim platform 2 so that an accessory can be added and utilized.

Figure 10B:
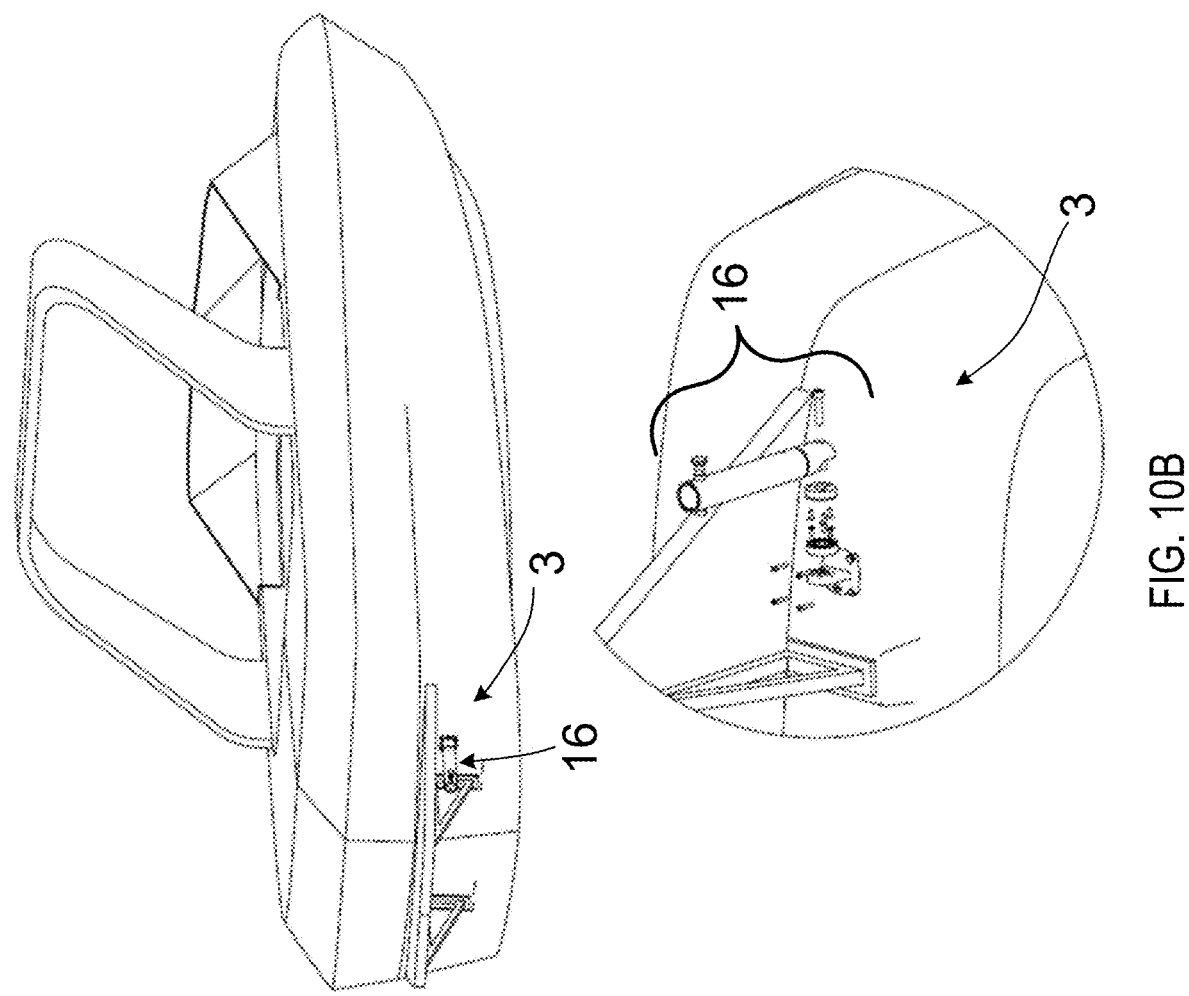
Figure 10D:
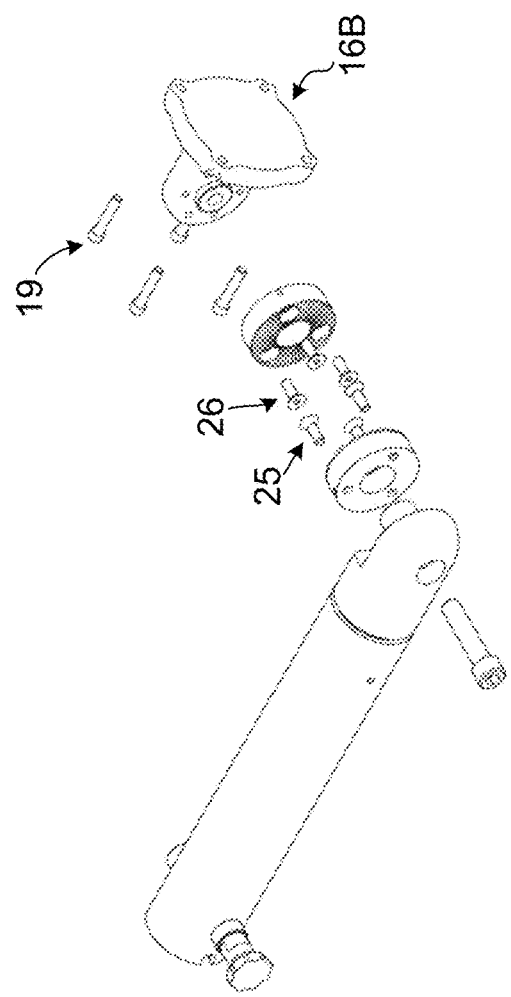
Figure 10C:
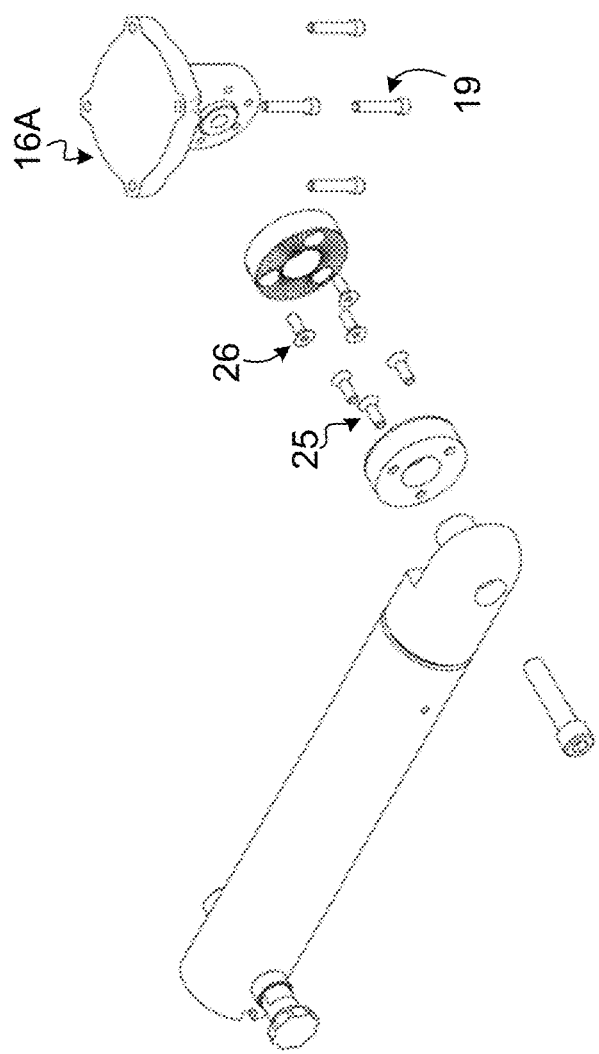

FIGS. 10A-D depict a mounting configuration using a universal transom mount 16. FIGS. 10A and 10B depict a profile aft, looking forward view of the universal transom mount 16. FIG. 10C depicts an exploded view of the top transom mount 16A (refer to FIG. 3A). FIG. 10D depicts an exploded view of the side transom mount 16B (refer to FIG. 3A). As depicted in FIGS. 10A-D, the universal transom mount 16 (e.g., 16A, 16B) can be installed in any desired location on the transom 3. For example, if the user desires to install a grill that has a distance from the swim platform 2 but is close enough to one side of the boat 1 so that a passenger standing in the seating area 7 can easily grill food from that location, the user can install the universal transom mount 16 closer to the side of the boat 1. Regardless of the location and/or placement of the universal transom mount 16, the stability of the swim platform accessory mount 9 and the wake shape of the boat 1 will not be impacted. The purpose of the universal transom mount 16 is to allow installation by only making minor modifications to the OEM transom 3 that it is being installed on. The universal transom mount 16 is designed to accommodate installation by bolting to the OEM transom 3 by using one or more (e.g., 4) through transom mount bolts 19.

In the examples depicted in FIGS. 10A-D, the universal transom mount 16 is bolted to the OEM transom 3 with one or more through transom mount bolts 19. The accessory arm 10 can be attached to a side of the universal transom mount 16 and secured in place by one or more tapered alignment pins 25 and one or more threaded fasteners 26. The hand knob attachment post 27 can also be attached to the accessory arm 10 in this embodiment.

The embodiments of FIGS. 10A-D are best used where the user does not want to attach the swim platform accessory mount 9 to the swim platform 2 and/or the swim bracket 4. These embodiments are also preferred where the user does not have a swim platform 2 or the swim platform 2 is not stable or sturdy enough to support either the swim platform accessory mount 9 or the accessory the user would like to put on the swim platform accessory mount 9. Other embodiments where the universal transom mount 16 preferred is where the swim platform 2 does not have underside swim platform brackets 4 or where the swim platform brackets 4 are solid and the user does not want to drill into the swim platform brackets 4.

As a result, the universal transom mount 16 is placed (e.g., tethered, secured, fastened, attached) directly on the transom 3 in a desired location/position by the user. The universal transom mount 16 is therefore secured in place with the through transom mount bolts 19. The universal transom mount 16 is a variation of the universal platform bracket mount 13. Whereas the universal bracket mount 13 comprised the upper portion 13A and the lower portion 13B, the universal transom mount 16 comprises one portion. The rest of the embodied mounting configuration is the same as described herein.

FIGS. 11A-C depict a mounting configuration using a universal platform clamp mount 18. FIG. 11A depicts a profile aft looking forward view of the universal platform clamp mount 18. FIG. 11B depicts additional views of the mounting configuration described herein. FIG. 11C depicts an exploded view of the universal platform clamp mount 18. The purpose of the mount 18 is to allow installation on any swim platform 2 without making any modifications to the OEM swim platform 2 that it is installed on. The embodiment of FIG. 11 is best used where the user desires to attach the swim platform accessory mount 9 to the boat 1 without having to make any modifications to the boat 1 (e.g., drilling). For example, a user might prefer this embodiment if he or she is renting a watersport tow boat and cannot drill into any part of the boat 1 or make any other types of modifications to the boat 1. This embodiment would make it easy to add the swim platform accessory mount 9 to any type of watersport tow boat (e.g., where the user has more than one boat and wishes to use the swim platform accessory mount 9 on one boat one day and then use it on a different boat on another day). The embodiment of FIG. 11 is also preferred where the swim platform 2 does not have one or more swim platform brackets 4 and/or where the user does not want to secure the swim platform accessory mount 9 on or around one or more swim platform brackets 4. This embodiment is also preferred where the user does not want to drill into the transom 3 of the boat 1, where the swim platform brackets 4 are solid, and/or where the user does not want to drill into the underside (e.g., bottom) of the swim platform 2.

The universal platform clamp mount 18 can be placed directly around an edge (e.g., side) of the swim platform 2. The user can place the universal platform clamp mount 18 at any desired location/position on one of the edges/sides of the swim platform 2. For example, if the user would like full access to a longest edge/portion/side of the swim platform 2, the user may choose to secure the universal platform clamp mount 18 along a shorter right and/or left side/portion/edge of the swim platform 2. The universal platform clamp mount 18 cannot be placed/secured directly on a corner of the swim platform 2. Additionally, the universal platform clamp mount 18 cannot be placed/secured on any portion of the swim platform 2 that does not include some type of side/edge. Regardless of the location and/or placement of the universal platform clamp mount 18, the stability of the swim platform accessory mount 9 and the wake shape of the boat 1 will not be impacted.

No drilling is required to secure the universal platform clamp mount 18 in place. Rather, the universal platform clamp mount 18 has an adjustable hinge clamp 28, which can be adjusted to fit around any thickness of the swim platform 2. As a result, the universal platform clamp mount 18 can accommodate many swim platform 2 manufacturers. A force to keep the universal platform clamp mount 18 in place is generated by a fulcrum using a hand knob clamping screw 29 placed between the adjustable hinge clamp 28 and an upper portion (e.g., mount leg) 18A. This force also provides stability for the swim platform accessory mount 9 and any accessories that are then mounted on the swim platform accessory mount 9.

The universal swim platform clamp mount 18 is a variation of the universal platform bracket mount 13. Like the universal bracket mount 13, the universal swim platform clamp mount 18 comprises the upper portion 18A (e.g., mount leg) and a lower portion 18B. This configuration secures to an outer portion of the existing swim platform 2 (e.g., a side and/or edge). Instead of using one or more bolts 26, in this embodiment, the user turns the hand knob clamping screw 29 to close the distance of the adjustable hinge clamp 28, thereby securing the universal swim platform clamp mount 18 into place and around the side of the swim platform 2 at the desired location. Therefore, the accessory arm 10 can be attached to the lower portion 18B of the universal swim platform clamp mount 18. In this embodiment, the accessory arm 10 can be attached to the mount 18 by one or more tapered alignment pins 25 and the hand knob attachment post 27 can also be secured to a bottom of the accessory arm 10 for use by a user. The rest of the embodied mounting configuration is the same as described herein.

Figure 12B:
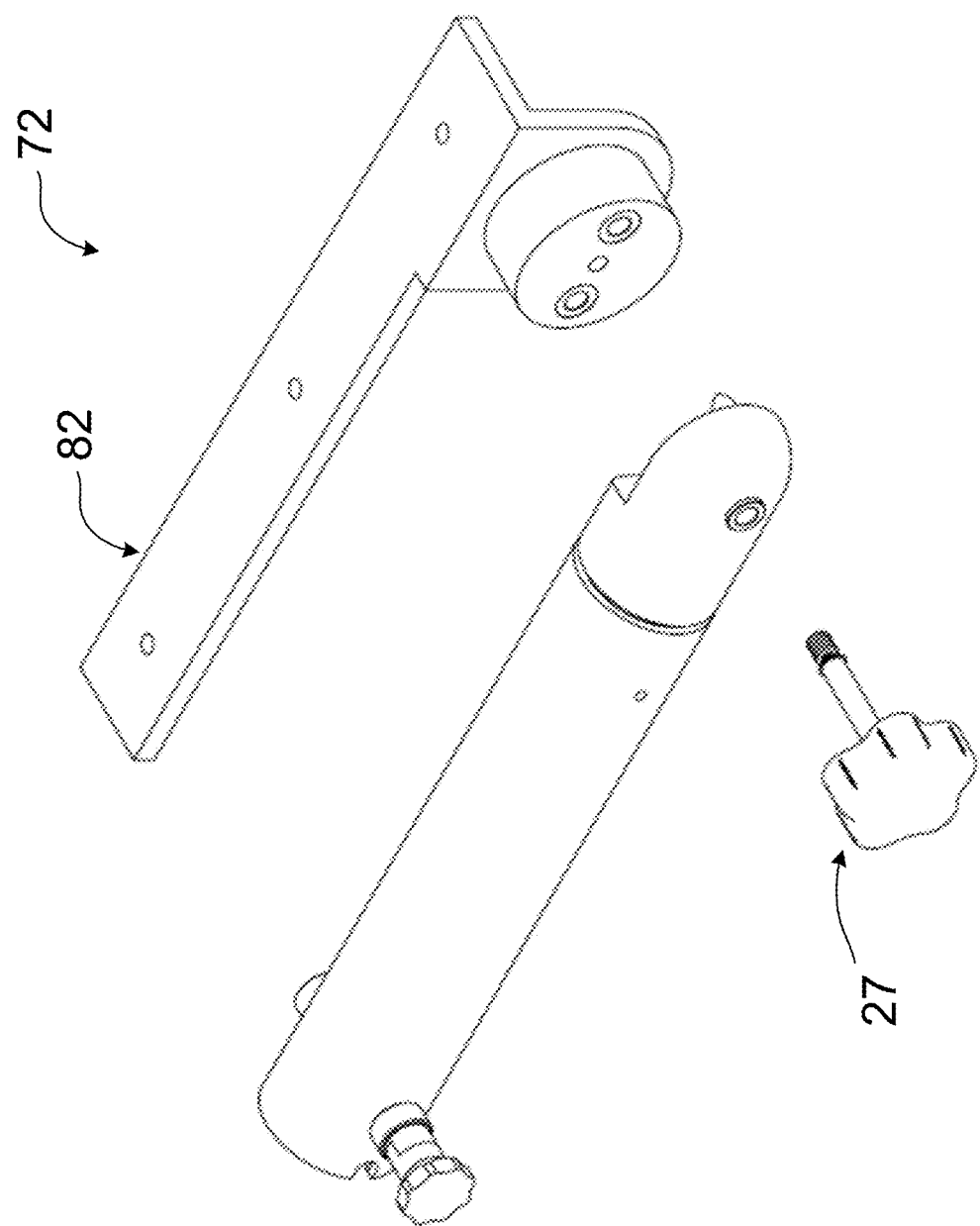

FIGS. 12A-B depict a mounting configuration using a universal bracket mount 72. FIG. 12A depicts exemplary views of the universal bracket mount 72 with a spacer 82. FIG. 12B depicts an exploded side view of the universal bracket mount 72 with the spacer 82 (refer to FIG. 3A). The purpose of the mount 72 is to allow universal installation using one or more existing swim platform 2 fasteners and strength from the swim platform bracket 4. In this embodiment, the spacer 82 can be mounted flush with the bottom of the swim platform 2 and can be a simple additional accessory that is installed by removing the swim platform 2 and adding the bracket mount 72. This configuration provides a high strength, unobstructed installation in a position that is flush with the bottom of the swim platform 2. The embodiment of FIGS. 12A-B is best used on boats that have factory or aftermarket wake enhancing devices that occupy or otherwise obstruct installation of one of the universal mount systems described herein. This configuration can also be added as a factory option that requires no modifications, drilling, or manufacturing process changes. The flush mounting configuration provides optimal positioning for visual appearance and keeps the bracket mount 72 above the water level, thereby preventing any undesired effect on the wake no matter a speed at which the boat is traveling. As depicted in FIG. 12A, the bracket mount 72 can be placed on a side of the swim platform bracket 4 and the swim platform 2. The spacer 82 can be placed in between a top of the swim platform bracket 4 and a bottom side of the swim platform 2, such that the spacer 82 fills in a space/opening between the swim platform bracket 4 and the swim platform 2. As a result, the mount 72 can also receive additional stability and support and the mount 72 does not need to be drilled into any part of the boat 1, the swim platform 2, or the swim platform bracket 4.

The universal bracket mount 72 can be placed on either the inboard or outboard side of the right or left swim platform bracket 4. Regardless of the location and/or placement of the universal platform clamp mount 72, the stability of the swim platform accessory mount 9 and the wake shape of the boat 1 will not be impacted. Further, no drilling is required to secure the universal platform clamp mount 72 in place. The existing mounting hardware of the swim platform bracket 4 is used to secure it in place.

The universal bracket mount 72 is a variation of the universal platform bracket mount 13. Unlike the universal bracket mount 13, the universal bracket mount 72 comprises a single portion, as described herein.

Figures 13A, 13B:
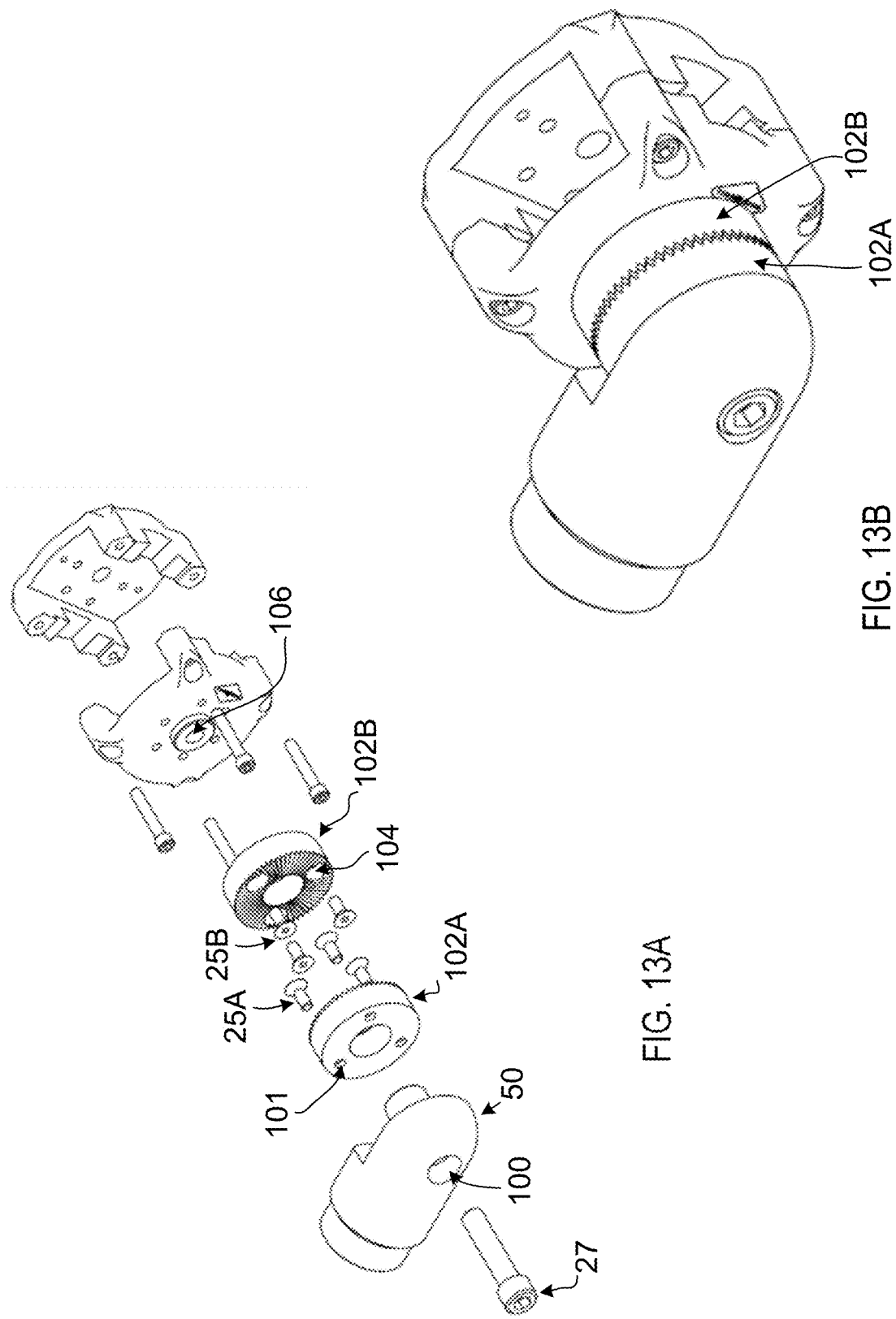
FIGS. 13A-B depict a mounting gear.

FIGS. 13A-B depict an exploded view of the mounting gear 50. As depicted in FIG. 13A, the mounting gear 50 includes an opening 100 for receiving the hand knob 27 and/or any other type of bolt, screw, or pin 27 that is configured to secure the mounting gear 50 to a mounting bracket. The opening 100 can further extend beyond a depression of the mounting gear 50, wherein the depression of the mounting gear receives a first hirth joint 102A (e.g., coupling, hirth coupling, hirth). The opening 100 that extends beyond the depression ensures ease of mating the first hirth joint 102A with a second hirth joint 102B. The configuration of the opening 100 is advantageous because it aligns the first and second hirth joints 102A-B and solidifies their mating. The first hirth joint 102A can be flush against the depression of the mounting gear 50 such that the user has more ease in rotating, securing, and/or adjusting parts of the mounting gear 50 as well as a mounting bracket.

The first hirth joint 102A includes an opening 103 for receiving the bolt 27 as well as an exterior of the opening 100 that extends beyond the depression of the mounting gear 50. The first hirth joint 102A further includes at least one alignment opening 101 for receiving at least one alignment pin 25A, as described herein. Likewise, the second hirth joint 102B includes an opening 105 for receiving the bolt 27 as well as an exterior of the opening 100 that extends beyond the depression of the mounting gear 50. The second hirth joint 102B further includes at least one alignment opening 104 for receiving at least one alignment pin/or fastener 25B. The first hirth joint 102A includes teeth (e.g., ridges) along an outer surface that mate with the second hirth joint 102B and the second hirth joint 102B includes teeth (e.g., ridges) along an inner surface that mate with the first hirth joint 102A. In one embodiment, the first and second hirth joints 102A-B can each have 60 teeth that allow for 3 degrees of adjustment. In other embodiments, the first and second hirth joints 102A-B can each have various numbers of teeth that allow for 0 to 360 degrees of adjustment.

Mating of the first and second hirth joints 102A-B can allow the user to adjust an angle (e.g., between 9 and 20 degrees or any practical angle) of the accessory arm 10 more easily. Tightening the bolt 27 can further secure the first and second hirth joints 102A-B together and ensure the teeth are kept in alignment such that the accessory arm 10 securely remains attached to the boat in the desired position. The configuration of hirth joints with teeth is advantageous because it prevents slippage and ensures the accessory arm 10 remains at a sturdy, desired angle, no matter how much weight is added to the mounting system 9 described herein. FIG. 13B depicts an example of the first and second hirth joints 102A-B when they are mated together.

As depicted in FIGS. 13A-B, the mounting gear 50 is rounded so that it is more ergonomic. This configuration also ensures that when the user reaches under the boat to adjust the mounting gear 50 and/or the mounting bracket, the user does not injure himself on any sharp/abrasive portions of the system described herein. In some embodiments, the first hirth joint 102A, and/or the second hirth joint 102B, can have a diameter of 2⅜ inches, which is marine industry standard size, and mounts to the depression of the mounting gear 50. The diameter of the first hirth joint 102 can be adjusted accordingly, based on a change in tube diameter of the accessory arm 10. The second hirth joint 102B can mount to an underside of the mounting bracket. The underside of the mounting bracket can have at least one opening for receiving at least one alignment pin/or fastener 25B. As a result, the second hirth joint 102B can be securely mated to the underside of the mounting bracket by the at least one alignment pin/or fastener 25B. Each of the mounting brackets described herein can include the same configuration of openings for receiving the at least one alignment pin/or fastener 25B. Therefore, the user can easily swap out/change mounting brackets. Since the first hirth joint 102A abuts the mounting gear 50 and the second hirth joint 102B abuts the underside of the chosen mounting bracket, the first and second hirth joints 102A-B can be separate and individual from each other. This configuration makes it easier for the user to customize the accessory arm 10 and/or mounting system 9 as well as the mounting bracket used to attach the mounting system 9 to the boat at the desired location. The user would not need to get under the boat/in the water to make adjustments.

Still referring to FIGS. 13A-B, to couple the mounting gear 50 to the chosen mounting bracket, the user can attach the second hirth joint 102B to the chosen mounting bracket by screwing/rotating the at least one alignment pin 25B through the at least one opening 104 and into the at least one respective opening in the mounting bracket. Likewise, the user can attach the first hirth joint 102A to the depression of the mounting gear 50 by screwing/rotating the at least one alignment pin 25A through the at least one opening 101 and into the at least one respective opening in the mounting gear 50. The user can then align the first hirth joint 102A with the second hirth joint 102B, such that the teeth on both hirth joints 102A-B mate. Once the teeth mate, the user can rotate at least one of the first and second hirth joints 102A-B to a desired angle. Once satisfied with the angle, the user can thread the bolt 27 in through the opening 100 of the mounting gear 50 such that the bolt 27 also goes through openings in both the first and second hirth joints 102A-B. In some embodiments, the bolt 27 can stop at a threaded opening 106 in the mounting bracket. The user can then screw in the bolt 27, thereby tightening the bolt 27 and securing the first and second hirth joints 102A-B to each other as well as to the mounting gear 50 and the chosen mounting bracket. When the user screws in the bolt 27, the bolt 27 can secure in the threaded opening 106 of the mounting bracket.

Figure 14:
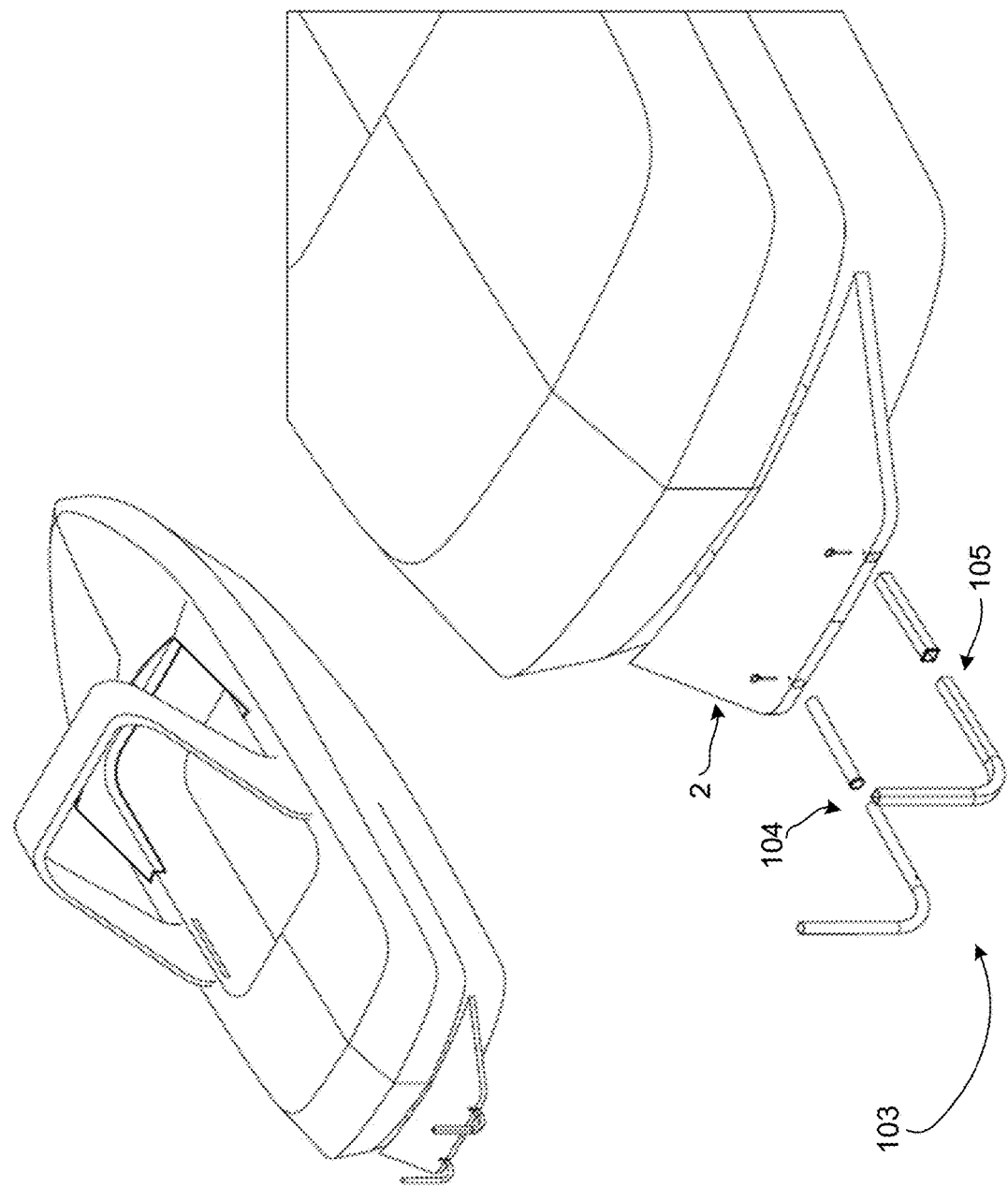
FIG. 14 depicts a mounting configuration using an integrated molded sleeve platform mount.

FIG. 14 depicts a mounting configuration using an integrated molded sleeve platform mount 103. The molded sleeve platform mount 103 is configured to receive the universal mounting system 9 into a core of the swim platform 2. The mount 103 can be integrated with the swim platform 2 as a molded sleeve within the platform material from the OEM. This type of design can be incorporated into common platform materials, including but not limited to fiberglass, composite, wood, aluminum, etc. This mount 103 can also be provided as an aftermarket replacement swim platform, allowing the mount 103 to be added to any boat. In the depicted example, the universal mounting system is shown as a square sleeve 105 and/or a round sleeve 104 that is molded into the OEM swim platform 2. This configuration allows the accessory mount 9 to be inserted and supported in an elevated location above the swim platform deck to which accessories can then be mounted. The location of the integrated sleeve 105 and/or 104 can be positioned in any accessible area of the outer swim platform edge. The location can be specified by a user, determined based on OEM, or use specific. The swim platform accessory mount 9 further can be attached to the integrated molded sleeve platform mount 103 without impacting a wake shape while the boat 1 is used and/or while the swim platform accessory mount 9 is used. As described throughout this disclosure, the swim platform accessory mount 9 can extend beyond and around the end and/or side of the swim platform 2 to an accessory mount that is positioned above the deck of the swim platform 2. The example depicted in FIG. 14 shows two molded shapes, 105 and 104, however there additional molded sleeve shapes are possible but not depicted. Moreover, the molded sleeve OEM mounting system described herein can be positioned in multiple sleeve locations around one swim platform 2 wherein each can be used solely and/or simultaneously with another sleeve OEM mounting system.

A location of the swim platform accessory mount 9 in the example of FIG. 14 does not impede on any use of the swim platform 2 by one or more passengers. For example, given that the swim platform 2 in this example includes a mounting position from the outer edge of the swim platform 2, which provides for ample space in a middle and on another side (non-universal accessory mount side) for passengers to enter/exit the boat. For instance, the swim platform 2 can remain fully functional as a means to enter and exit the boat and/or a means to lounge, stand, sit, or engage in other activities while on the boat. The swim platform 2 as well as any other space on the boat can remain fully functional and useable by the passengers whether or not the swim platform accessory mount 9 is installed, in use, and/or not in use.

Figure 15A:
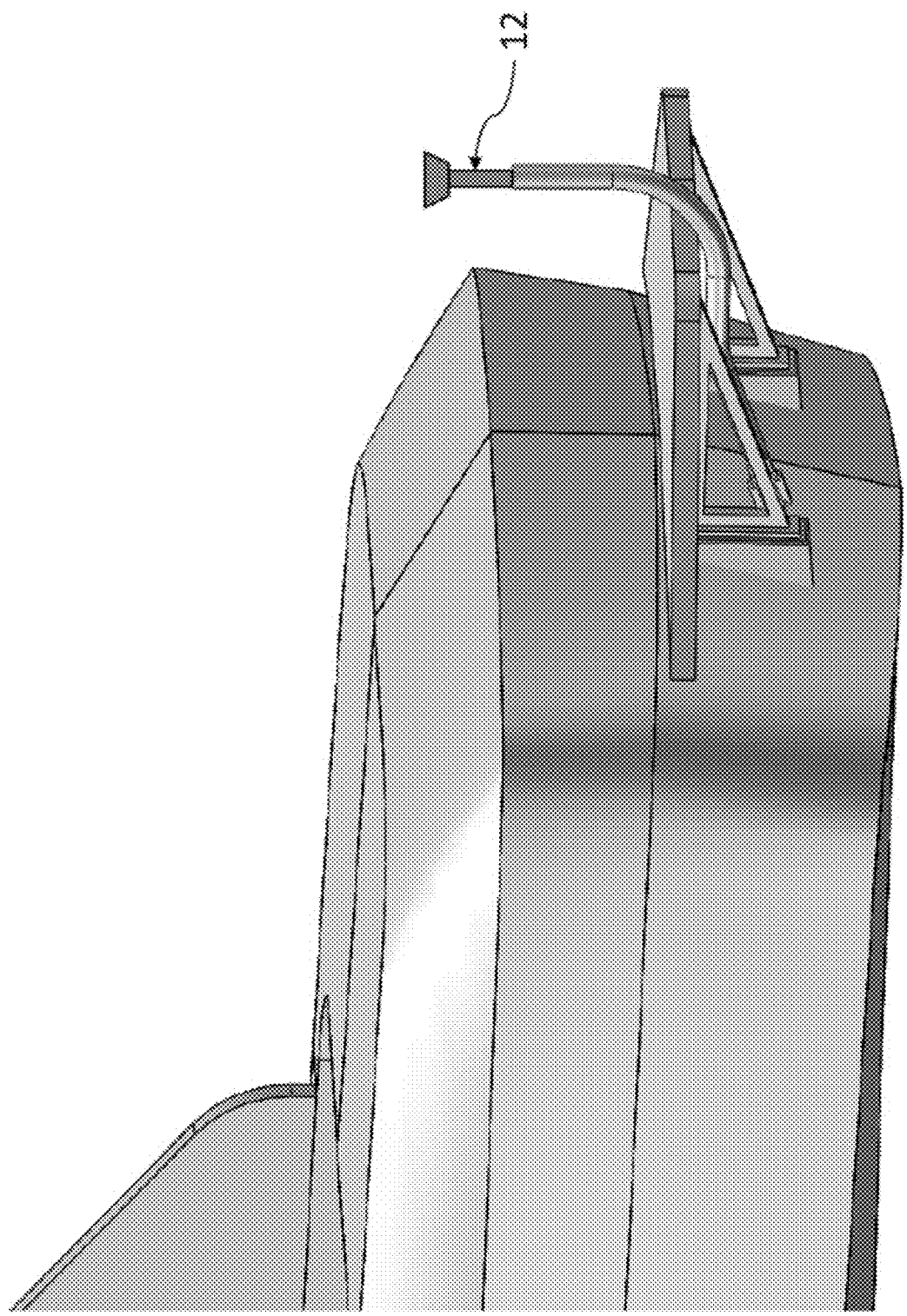

FIGS. 15A-B depict an accessory adapter 12. Referring to both figures, the accessory adapter 12 is a dovetail lock adapter that includes a female portion of a dovetail 106 and a mating surface and/or accessories (e.g., the receiver 74, refer to FIGS. 3C-D). A bottom portion of the accessory adapter 12 contains the dovetail 106 that provides a robust and simple connection between the upper accessory arm 11 and the accessory adapter 12. A top surface of the accessory adapter 12 has multiple bolt points to secure various types of accessories onto the swim platform accessory mount 9. As a result, the accessory adapter 12 can be used to effectively mount any type of accessory desired, including high stress applications. Exemplary accessories that can be mounted to the accessory adapter 12 are described in the following figures. These examples are only a representative sample and do not include all possible accessories that can be mounted to the accessory adapter 12.

The accessory adapter 12 is designed to be permanently mounted to the accessory. This configuration allows for the accessory to be easily slid into place on the dovetail mount and then locked into place. This configuration also makes it easier to remove the accessory from the swim platform accessory mount 9 and use the accessory on a different swim platform accessory mount 9, a different boat 1, or a different mounting configuration. For example, if the user has a grill that he or she chooses to use on one boat on one day, he or she can remove the grill, with the accessory adapter 12 still appended to it, and place the grill on a swim platform accessory mount 9 that is mounted to a different boat.

Figure 16A:
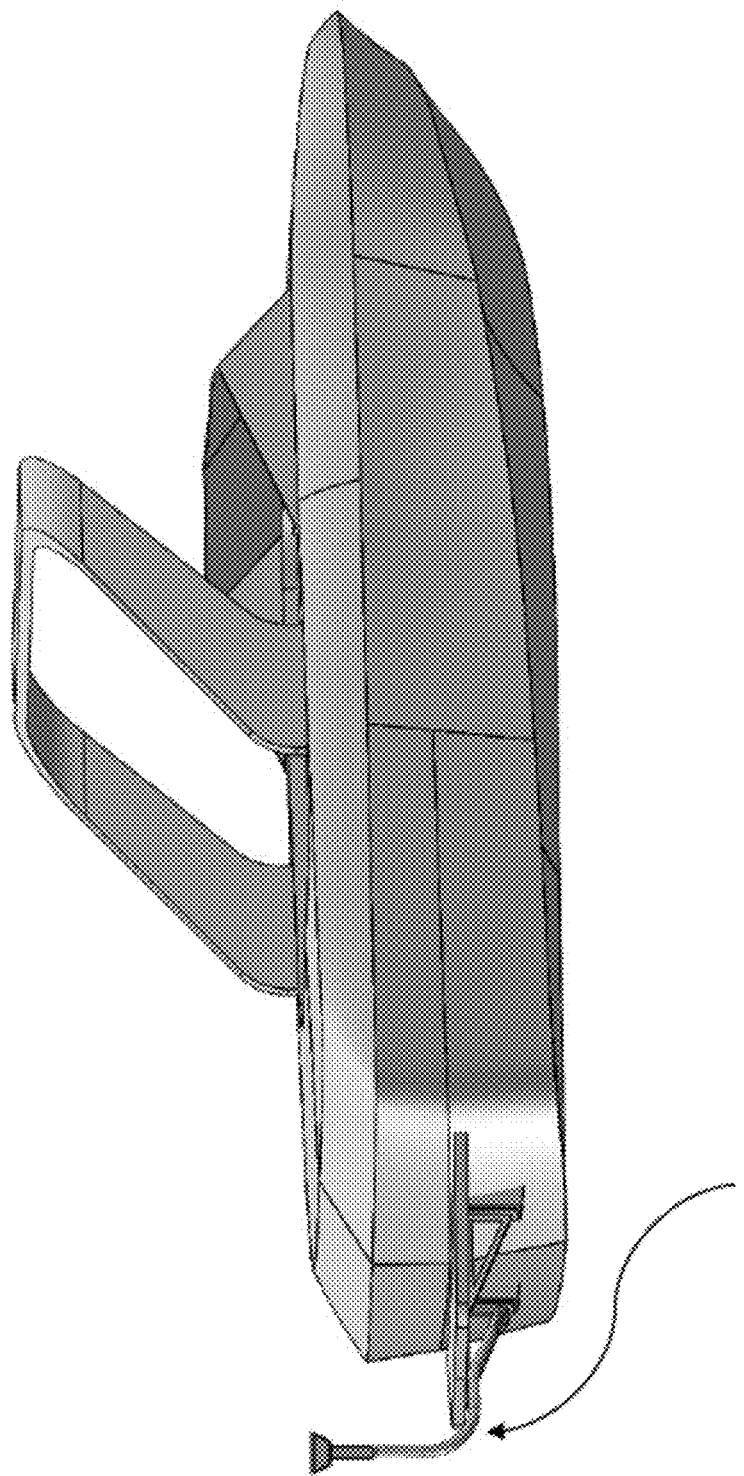
FIGS. 16A-B depict an angle of the accessory arm for a mounting configuration.
Figure 16B:
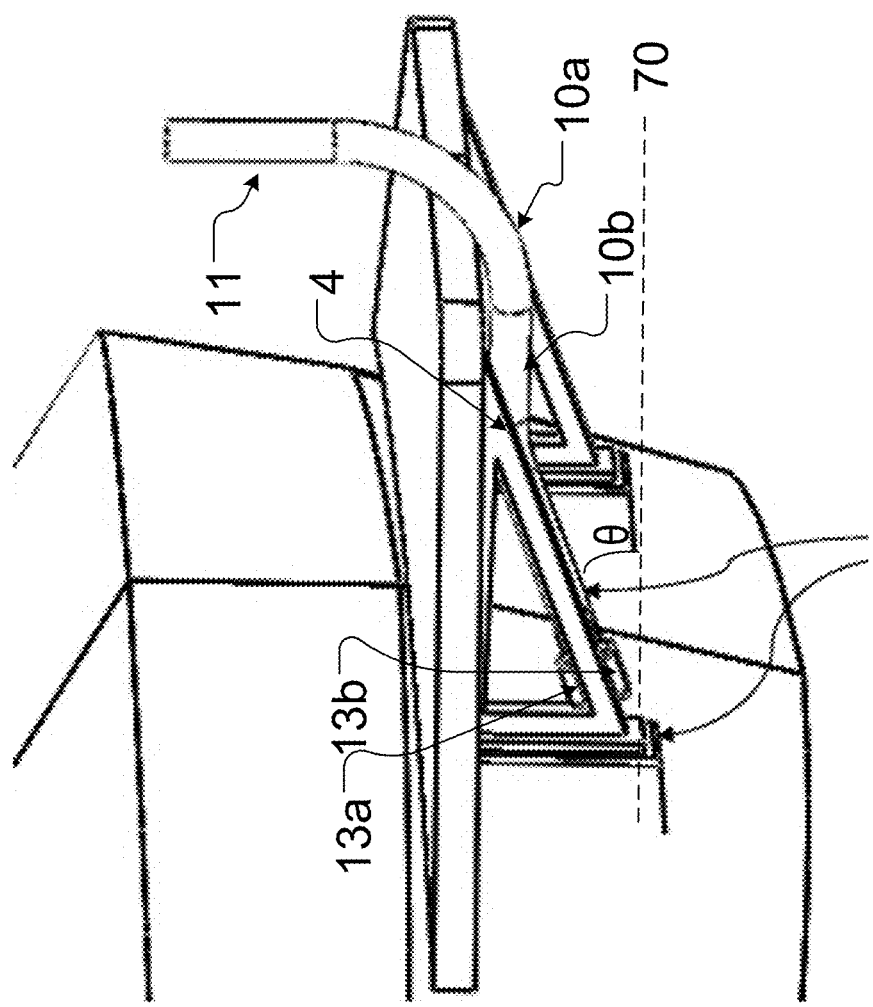

FIGS. 16A-B depict an angle of the accessory arm 10 for one mounting configuration. In the embodiment depicted in FIG. 16A, the angle of the accessory arm 10 is between 13 and 20 degrees. The accessory arm 10 is mounted inboard of the swim bracket 4 to match the angle of the swim platform bracket 4 and prevent any low and/or high speed wake disruption. The accessory arm 10 is bent so as to match the existing swim platform 2 profile, and as a result, the accessory arm 10 does not interfere with a wake's quality. In the example in FIG. 16A, angle of the accessory arm is 13-20 degrees and typically mounted inboard of bracket to match the platform bracket angle preventing any low/high speed wake disruption. Bends match existing platform profile as to not interfere with wake quality.

FIG. 16B further depicts the accessory arm 10 relative to one or more swim platform brackets 4. In this example, the universal platform bracket mount 13, which includes the upper portion 13A and the lower portion 13B, is mounted to the swim platform bracket 4. An angle θ of the accessory arm 10 ranges between 13 and 20 degrees, as previously mentioned. The angle θ is relative to a straight line 70 that is perpendicular to a vertical plane of the boat 1. The accessory arm 10 is typically mounted inboard of one swim platform bracket 4 to match the swim platform bracket 4 angle θ (which is between 13 and 20 degrees, depending on the make and/or model of the swim platform 2 and the swim platform bracket 4). This configuration prevents any low and/or high speed wake disruption from occurring while the accessory arm 10 is mounted to the swim platform 2 and/or while the boat 1 is in use or not in use. In the example in FIG. 16B, the accessory arm relative to platform brackets includes angle of accessory arm being 13-20 degrees and typically mounted inboard of bracket to match the platform bracket angle preventing any low/high speed wake disruption.

The accessory arm 10 is a tube specifically shaped to maintain the 13 to 20 degree range and match a contour of the swim platform bracket 4. An upper end 10A of the tube of the accessory arm 10 is pointed upwards vertically at a 90 degree relationship to the swim platform 2's horizontal plane. A lower portion 10B of the accessory arm 10 has a welded and/or machined end (e.g., the mounting gear 50 as described in FIG. 3A) that is used to attach directly to the various mount configurations described herein (e.g., mounts 13, 14, 15, 16, etc.). The lower portion 10B includes the mounting gear 50 and at least two captured alignment pins 25 (not shown) that are used for location and support stabilization. The lower portion 10B also comprises a retained hand knob 27 (not shown) that secures the accessory arm 10 to any of the mounts described herein (e.g., mounts 13, 14, 15, 16, etc.). The retained hand knob 27 prevents hardware from dropping in the water during installation of the accessory arm 10. In addition to structural support, the tapered alignment pins 25 make it simple and easy to seat (e.g., place, position) the accessory arm 10 properly onto the desired mount (e.g., mounts 13, 14, 15, 16, etc.). The upper end 10A of the accessory arm 10 has multiple holes spaced approximately 2 inches apart. This configuration allows for height adjustment when the accessory arm 10 is mated with the upper accessory arm 11, as described in FIG. 3A.

The upper accessory arm 11 is a tube which is sized to slide into an inside diameter of the accessory arm 10, specifically at the upper end 10A of the accessory arm 10. A lower end of the upper accessory arm 11 has a captured spring button (not shown) that allows the accessory arm 11 to lock into place at any of the various height adjustment points on the upper end 10A of the accessory arm 10. This configuration allows for easy setup and installation of the upper accessory arm 11 to the accessory arm 10.

In some embodiments, the user can adjust a height of the upper accessory arm 11 depending on an intended use the user has for the accessory that will be installed on the swim platform accessory mount 9. For example, if the user wants to install a grill onto the swim platform accessory mount 9, he or she may choose to raise the height of the upper accessory arm 11 to the highest adjustment point on the accessory arm 10.

A top portion of the accessory arm 11 contains a dovetail component that is welded in place and allows for the upper accessory arm 11 to interface (e.g., connect) with an accessory adapter 12 (not shown). This dovetail interface provides for a durable connection and support for the interface with the accessory adapter 12 in every direction. As a result, the swim platform accessory mount 9 can withstand high stress applications and/or heavy accessories that are installed (e.g., a hammock, a TV stand, a paddle board rack option, etc.).

Figure 17B:
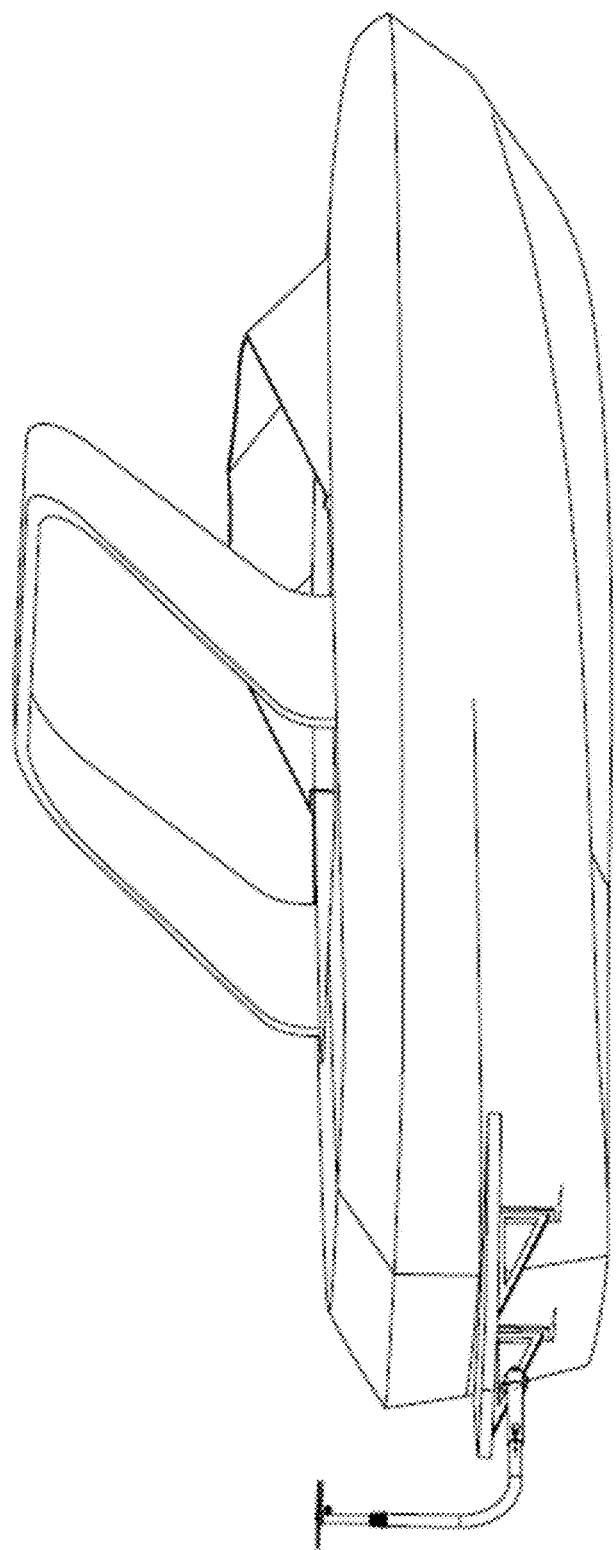

FIGS. 17A-B depict the universal platform bracket mount 13 with the accessory adapter 12. Referring to both figures, in these embodiments, the universal platform bracket mount 13 is secured around one of the swim platform brackets 4. The upper accessory arm 11 is connected and extended up from the accessory arm 10 and the accessory adapter 12 is secured (e.g., mounted) onto the top portion of the upper accessory arm 11. As a result, various types of accessories can be mounted and secured for use directly to the accessory adapter 12.

Figure 18A:
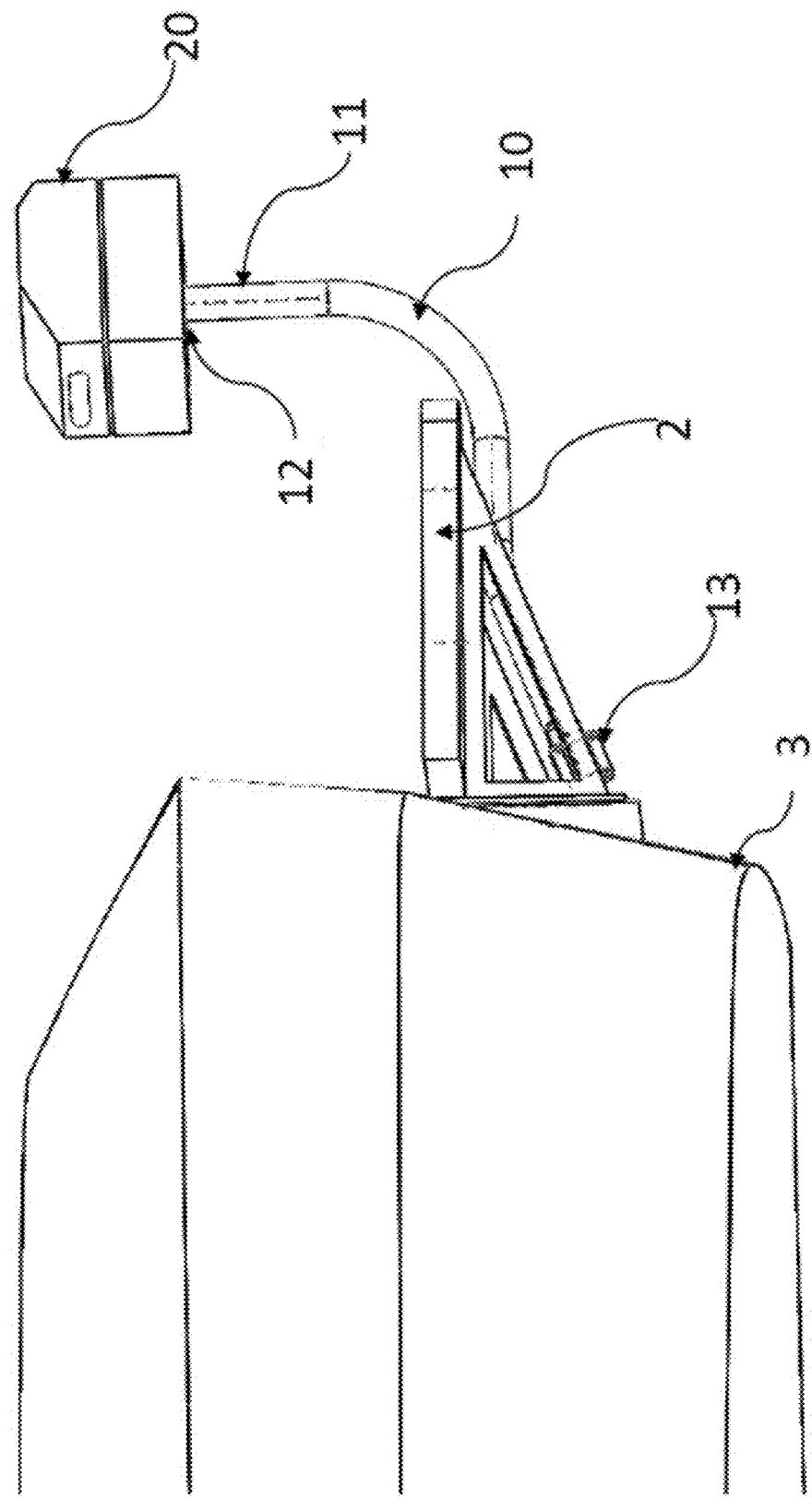
FIGS. 18A-B, depict exemplary embodiments of a swim platform accessory mount installed with one or more accessories.
Figure 18B:
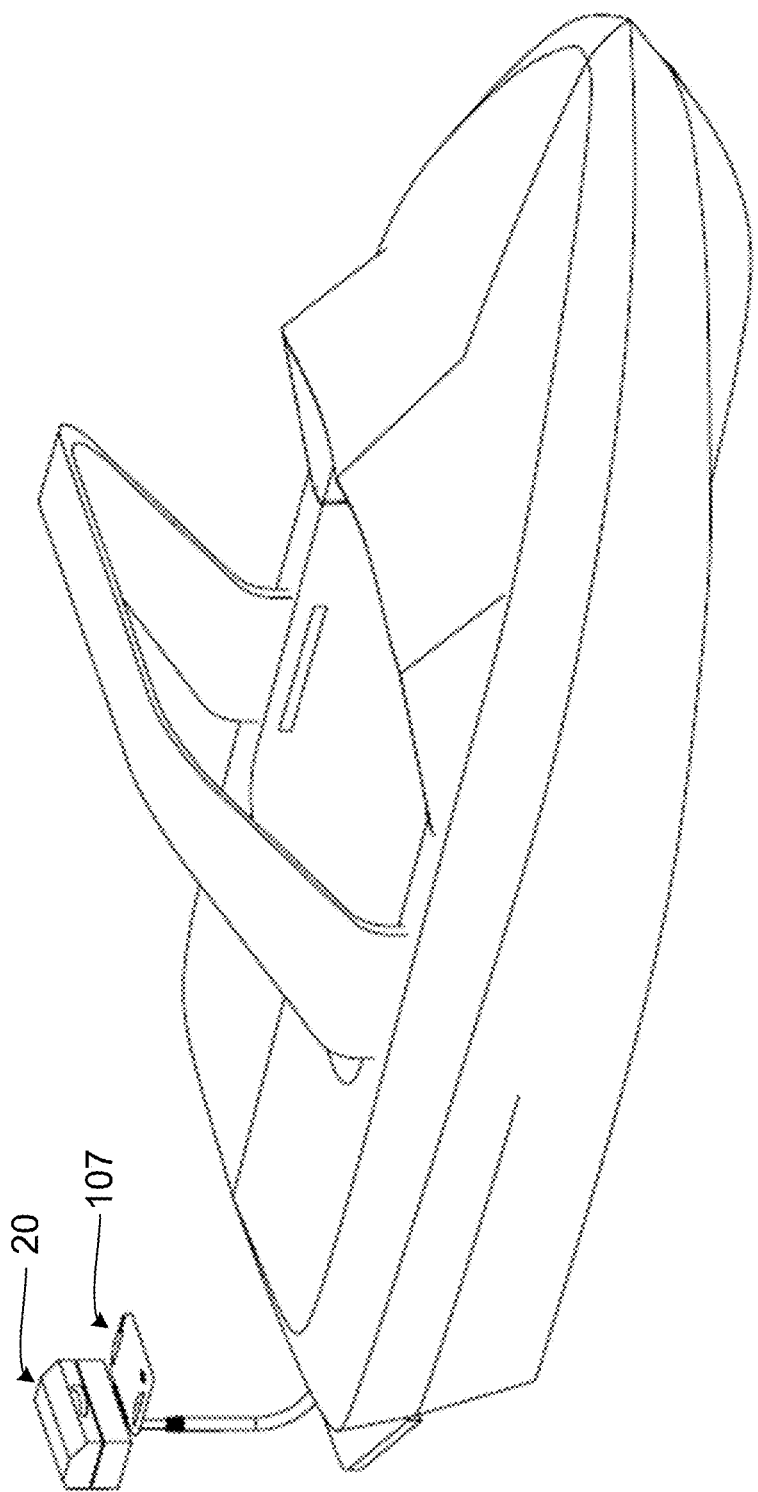

FIGS. 18-20 depict various exemplary embodiments of a swim platform accessory mount 9 installed with one or more accessories. In FIGS. 18A-B, the swim platform accessory mount 9, as described herein, is installed with the BBQ grill 20 (e.g., stovetop, gas or charcoal) and is attached to the swim platform bracket 4 with the platform bracket mount 13. Optionally, as depicted in FIG. 18B, the grill 20 can include a flat cooking/food preparation surface. The BBQ grill 20 (e.g., camping stove top) is one of the most desirable accessories applicable to watersport tow boats. This accessory is mounted by using the accessory adapter 12, as described herein. Multiple configurations are possible but are not shown in the figures. These configurations can include different cooking tops, smokers, grills, cooking accessories, or any other combination thereof. In the example of FIGS. 18A-B, the upper accessory arm 11 is extended to a desired height of the user to make cooking/grilling on the BBQ grill 20 easy, comfortable, and/or enjoyable.

Figure 19A:
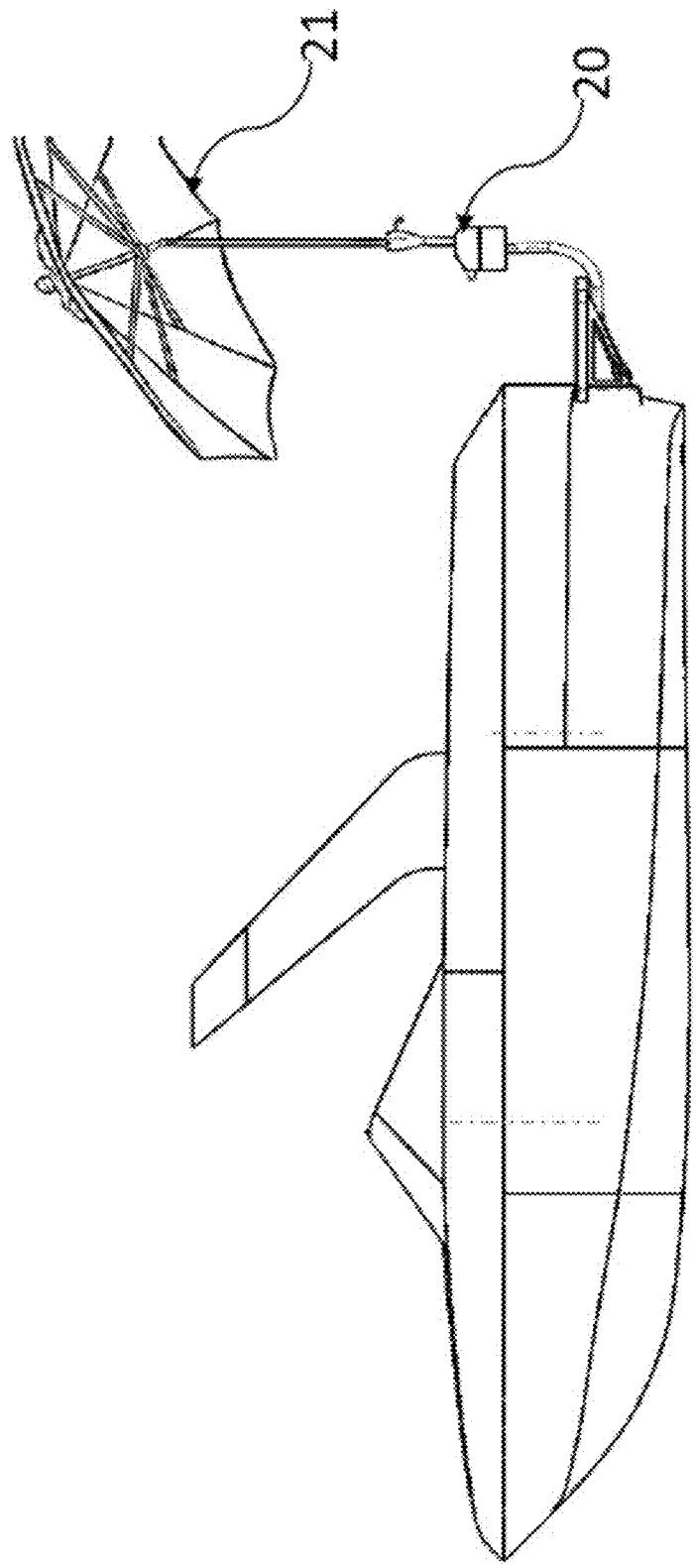
FIGS. 19A-B, depict exemplary embodiments of a swim platform accessory mount installed with one or more accessories.
Figure 19B:
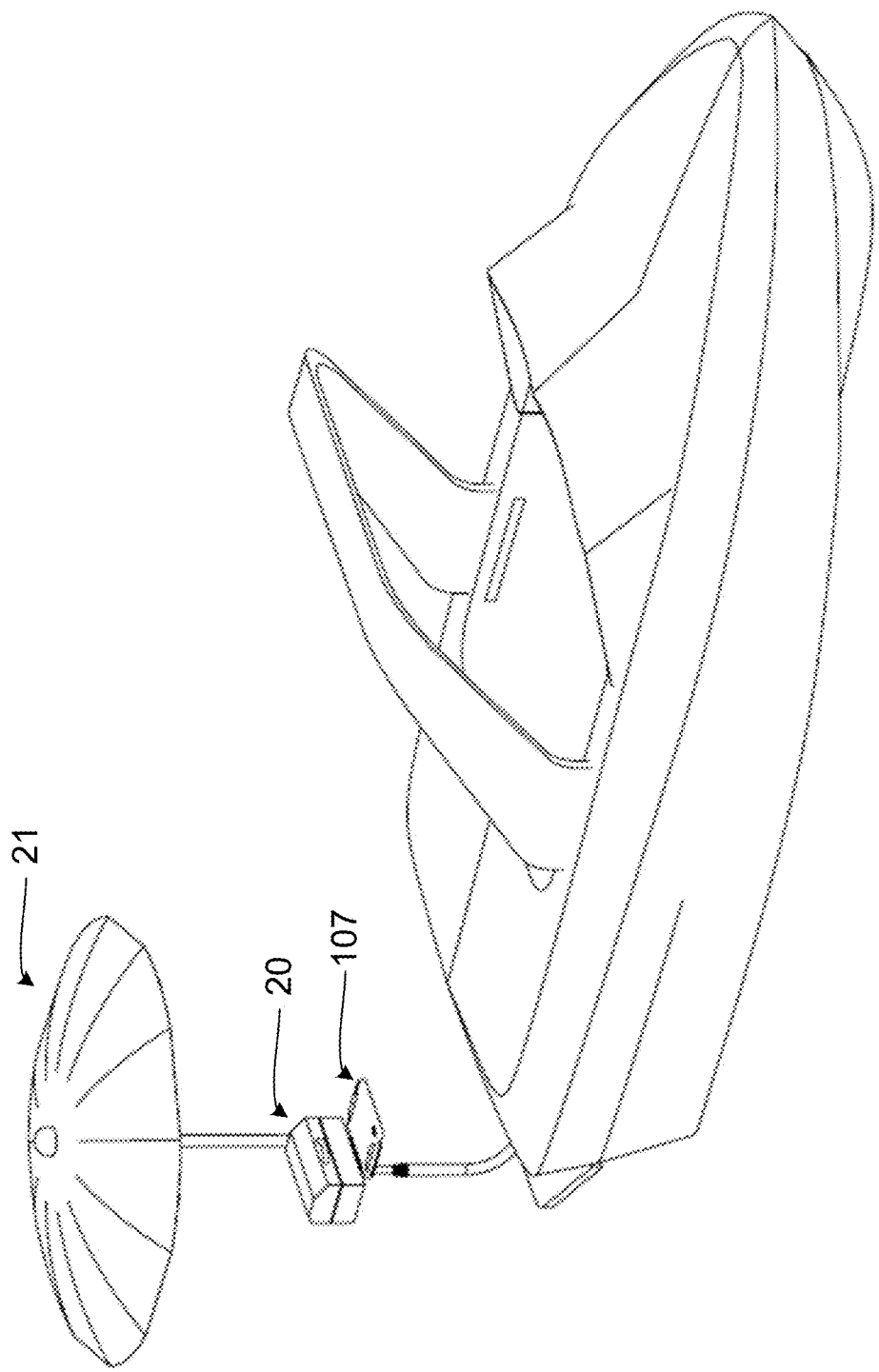

FIGS. 19A-B depict an umbrella option 21 used in conjunction with the BBQ grill 20, and optionally the cooking surface 107. These accessories are mounted by using the accessory adapter 12, as described herein. The combination of the umbrella 21 and the BBQ grill 20 provides for shade from the sun and/or protection around that area while the boat is in use and/or while the user is grilling or otherwise using the BBQ grill 20 or the swim platform 2.

Figure 20A:
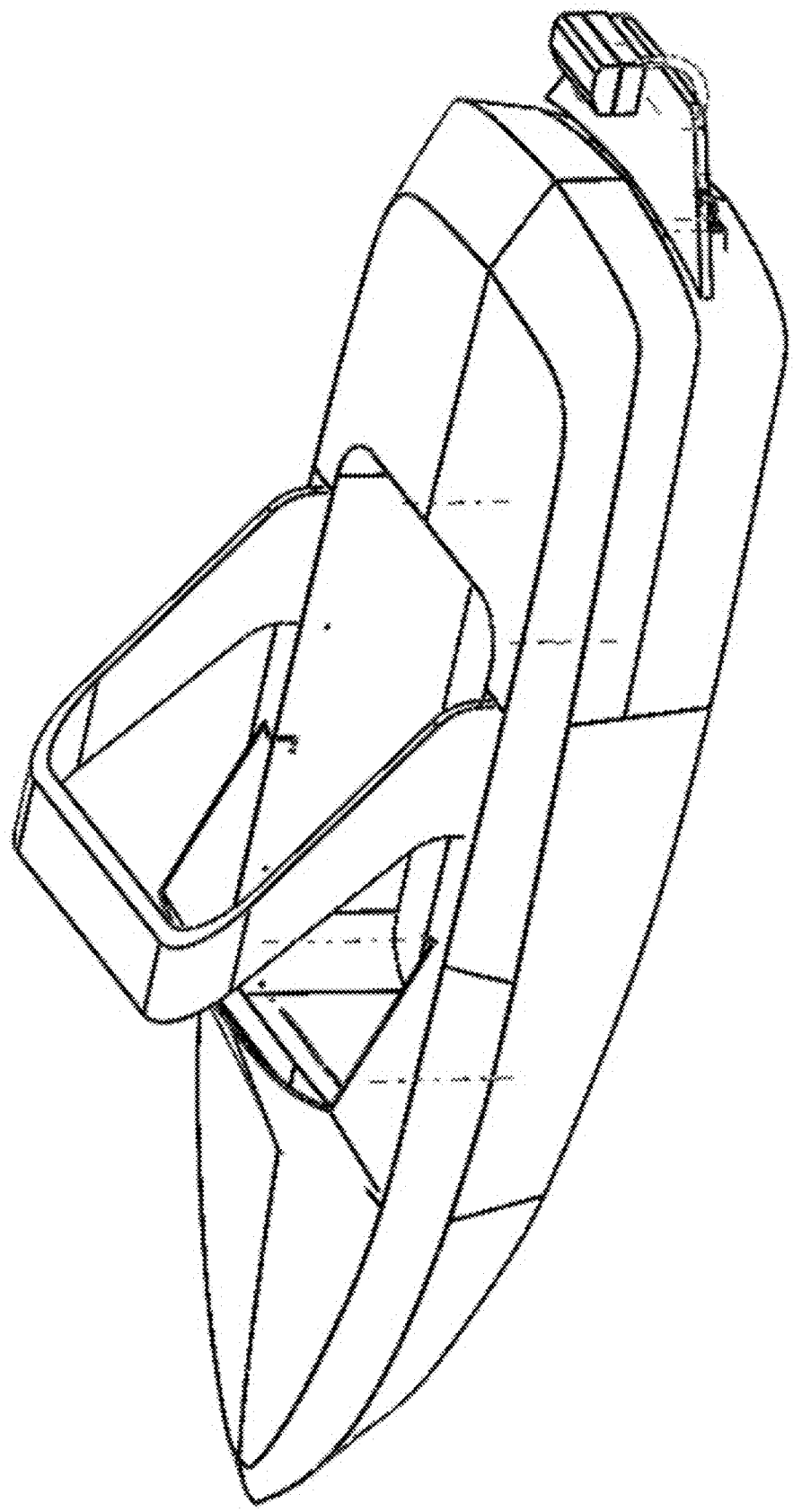
FIGS. 20A-F depict exemplary embodiments of a swim platform accessory mount installed with one or more accessories.
Figure 20B:
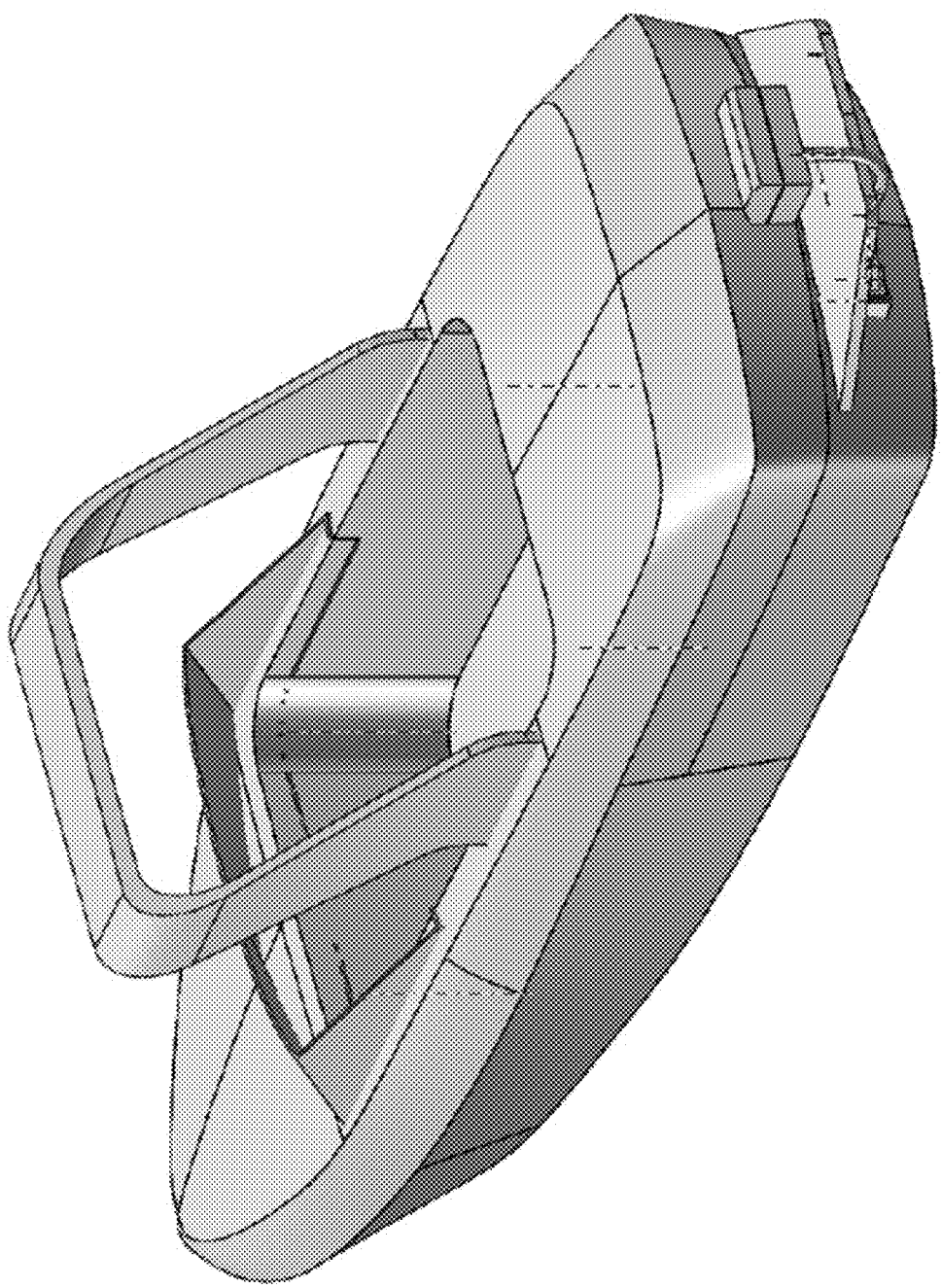
Figure 20C:
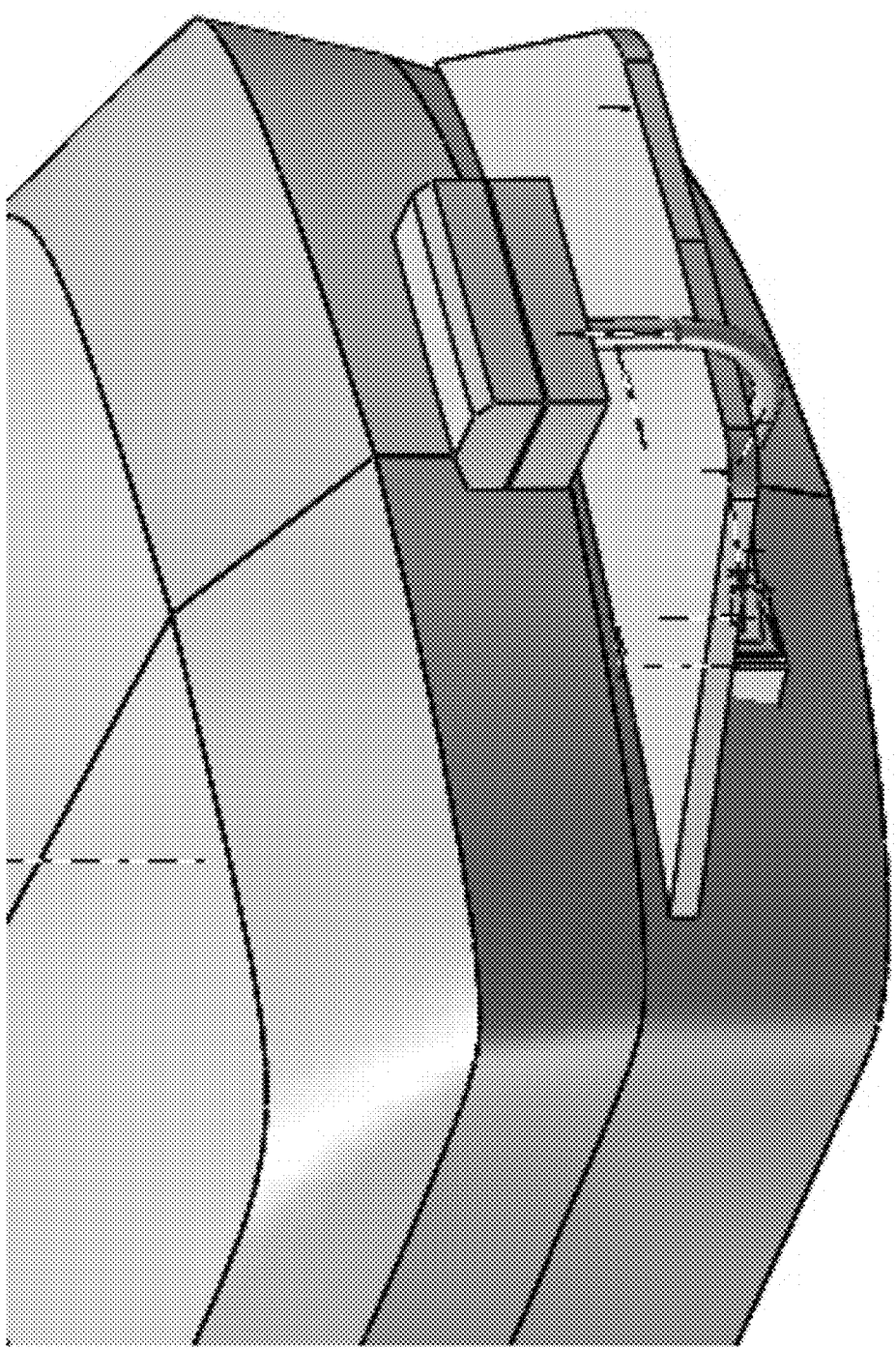
Figure 20D:
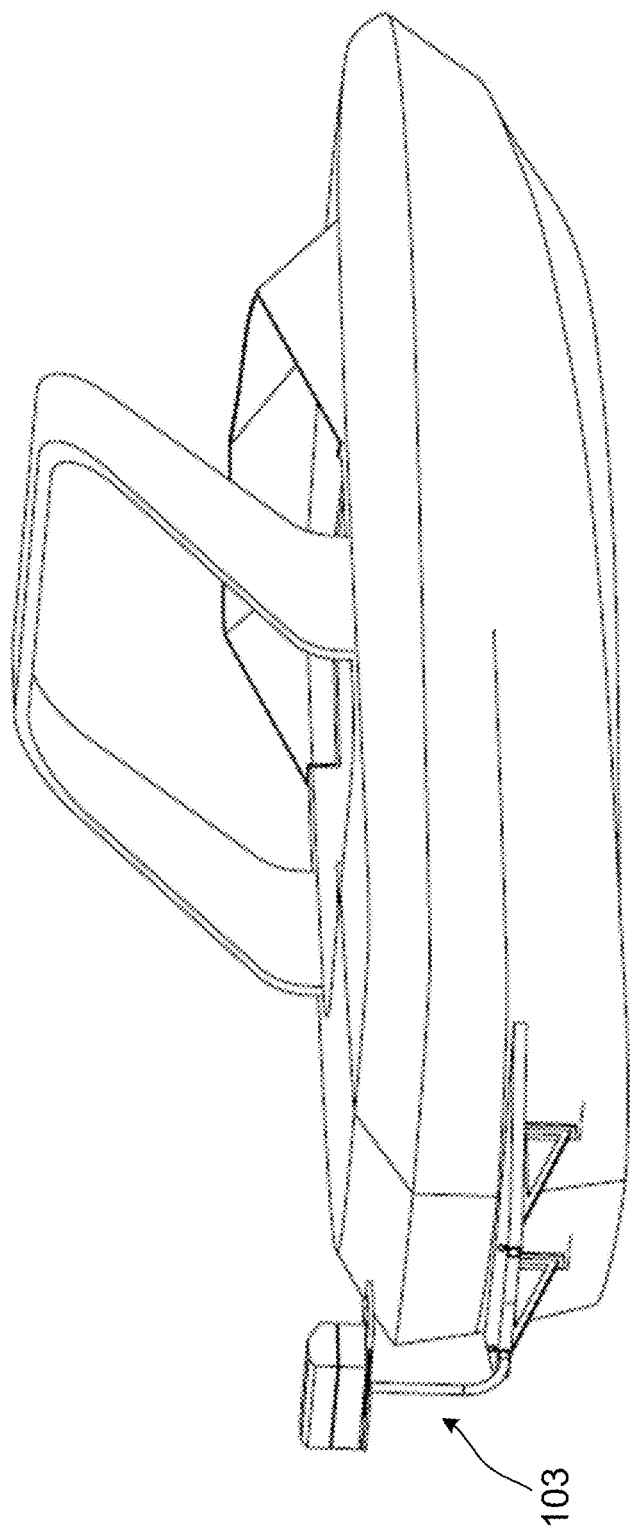
Figure 20E:
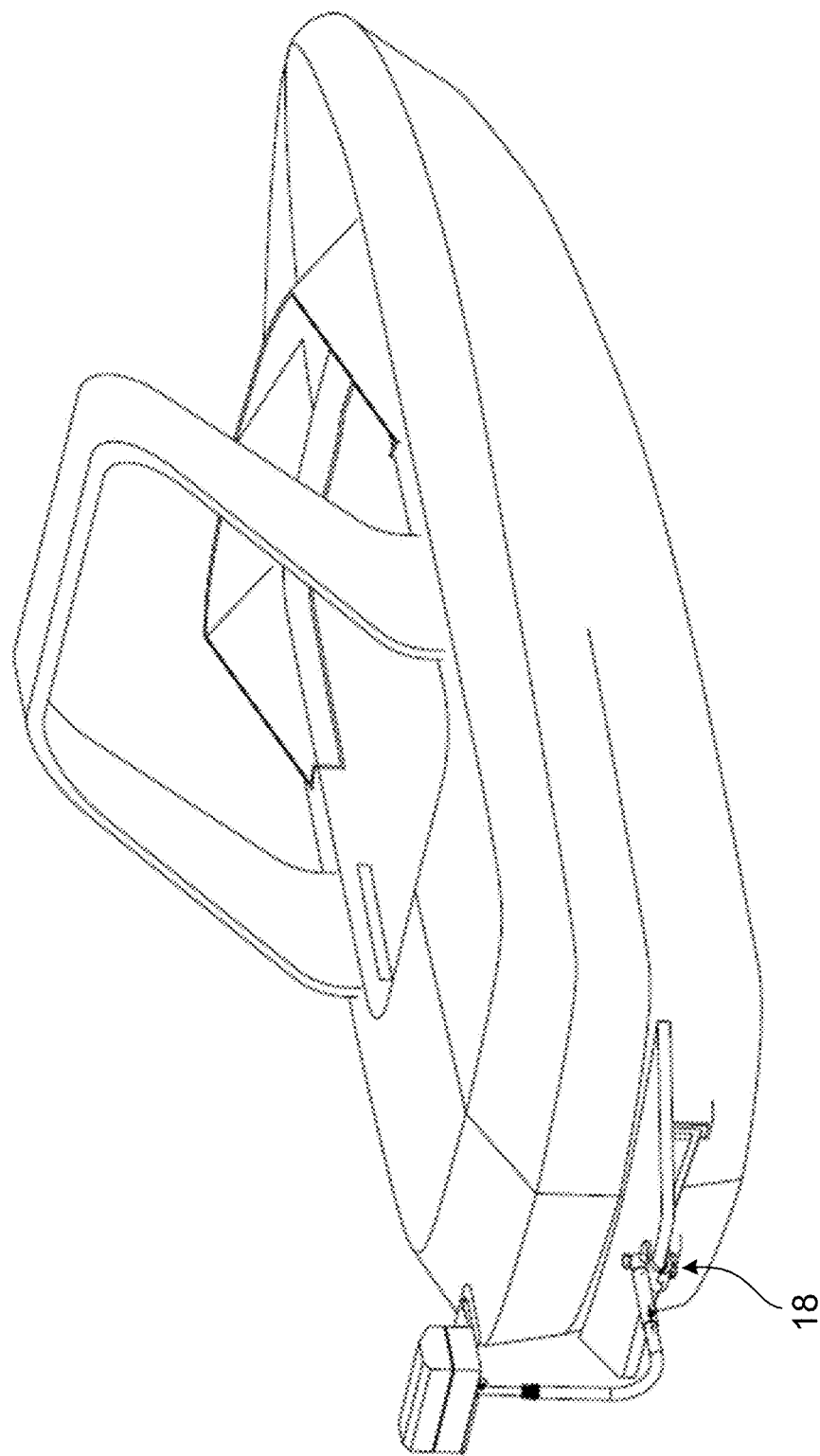
Figure 20F:
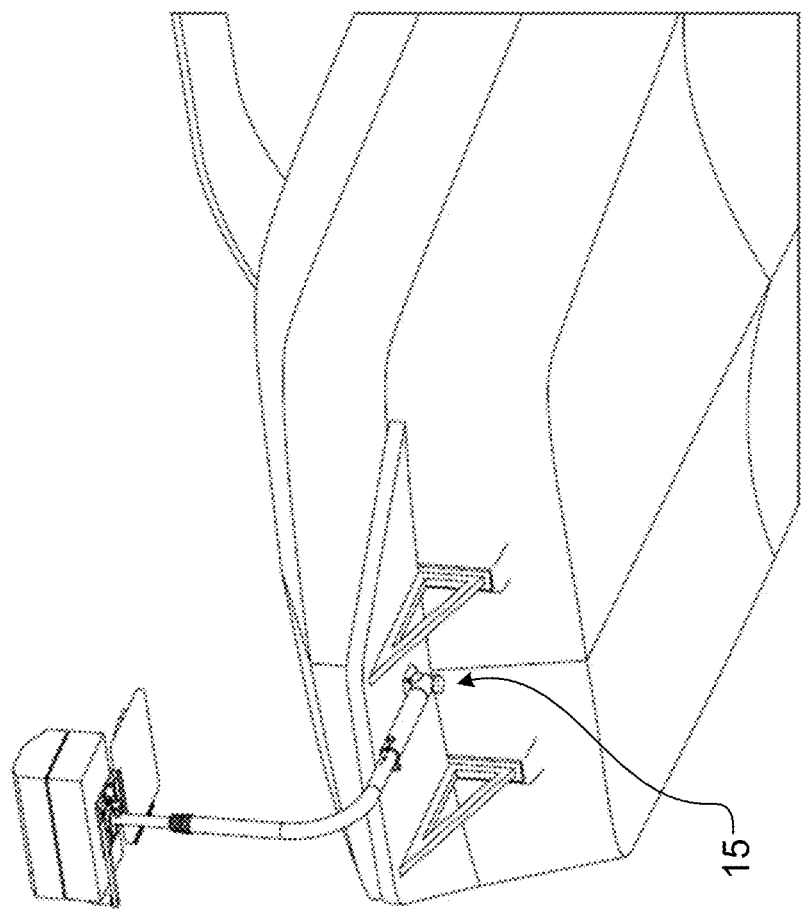

FIGS. 20A-F depict additional views of the BBQ grill 20 installed on the accessory adapter 12, as described herein. More specifically, FIG. 20D depicts the BBQ grill 20 installed on the accessory adapter 12 with the molded sleeve platform mount 103, as previously described (refer to FIG. 14). FIG. 20E depicts the BBQ grill 20 installed on the accessory adapter 12 with the universal platform clamp mount 18, as previously described (refer to FIGS. 11A-C). FIG. 20F depicts the BBQ grill 20 installed on the accessory adapter 12 with the universal under platform mount 15, as previously described (refer to FIGS. 8A-C and 9A-B).

Figure 21A:
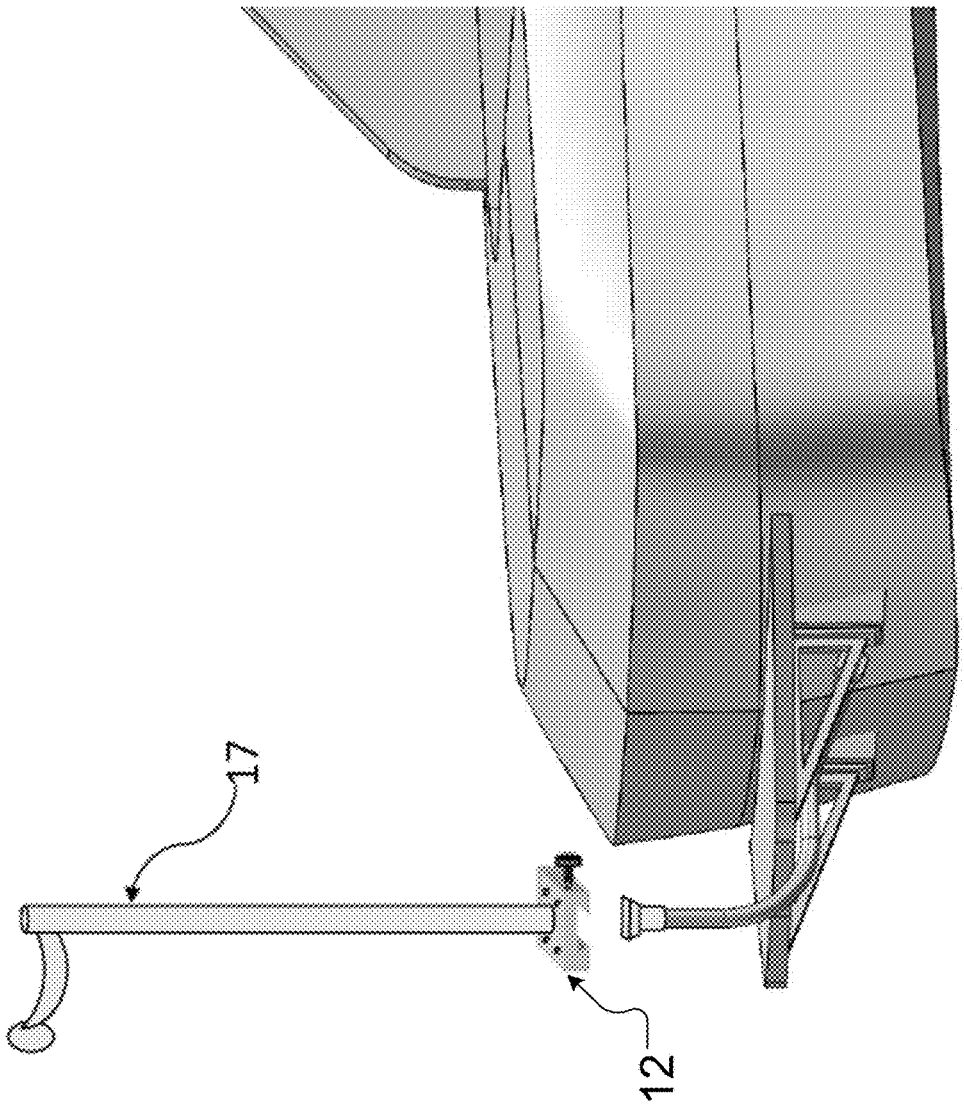
Figure 22A:
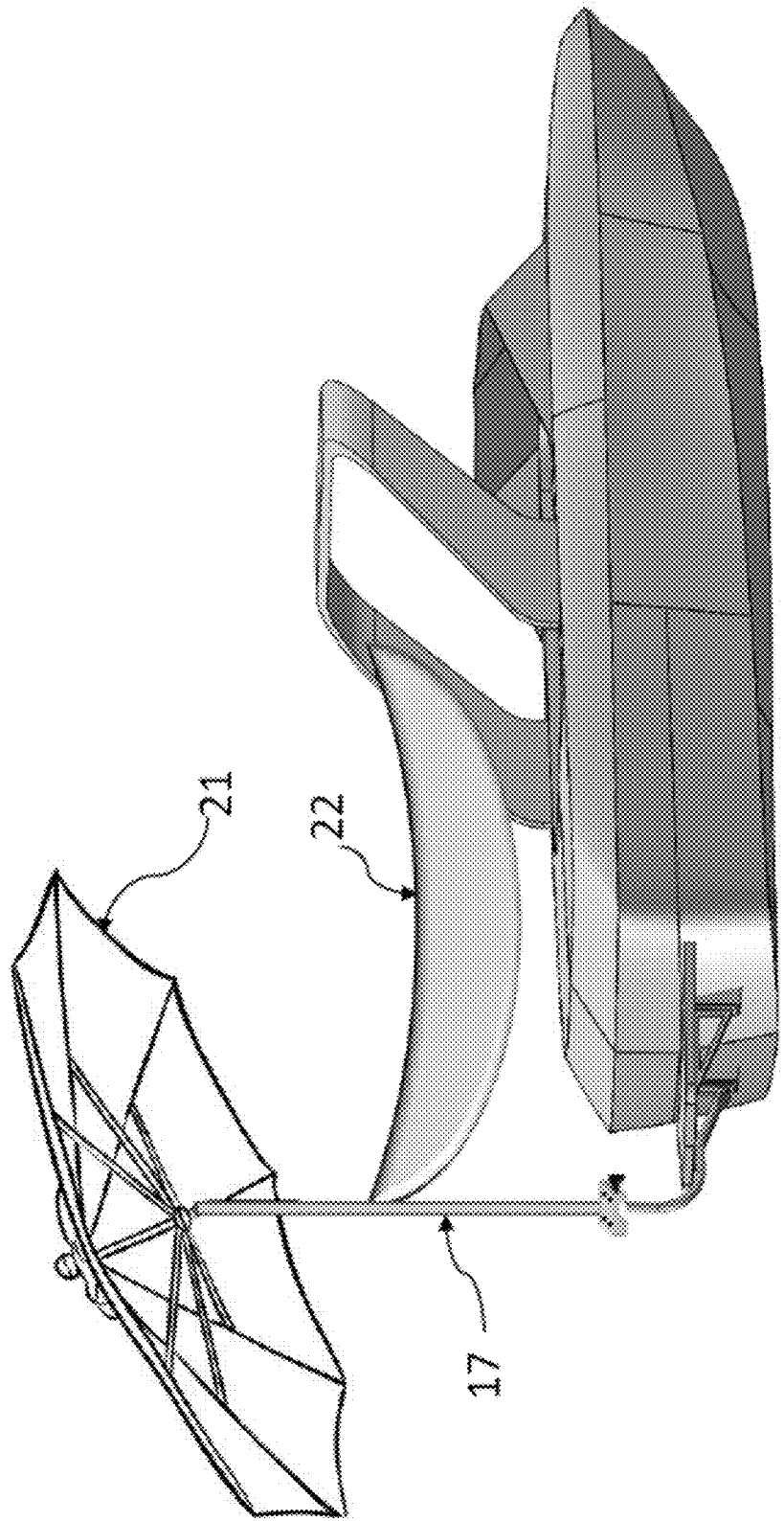
FIGS. 22A-D depict exemplary embodiments of the swim platform accessory mount installed with the accessory adapter extension and one or more accessories.
Figure 22B:
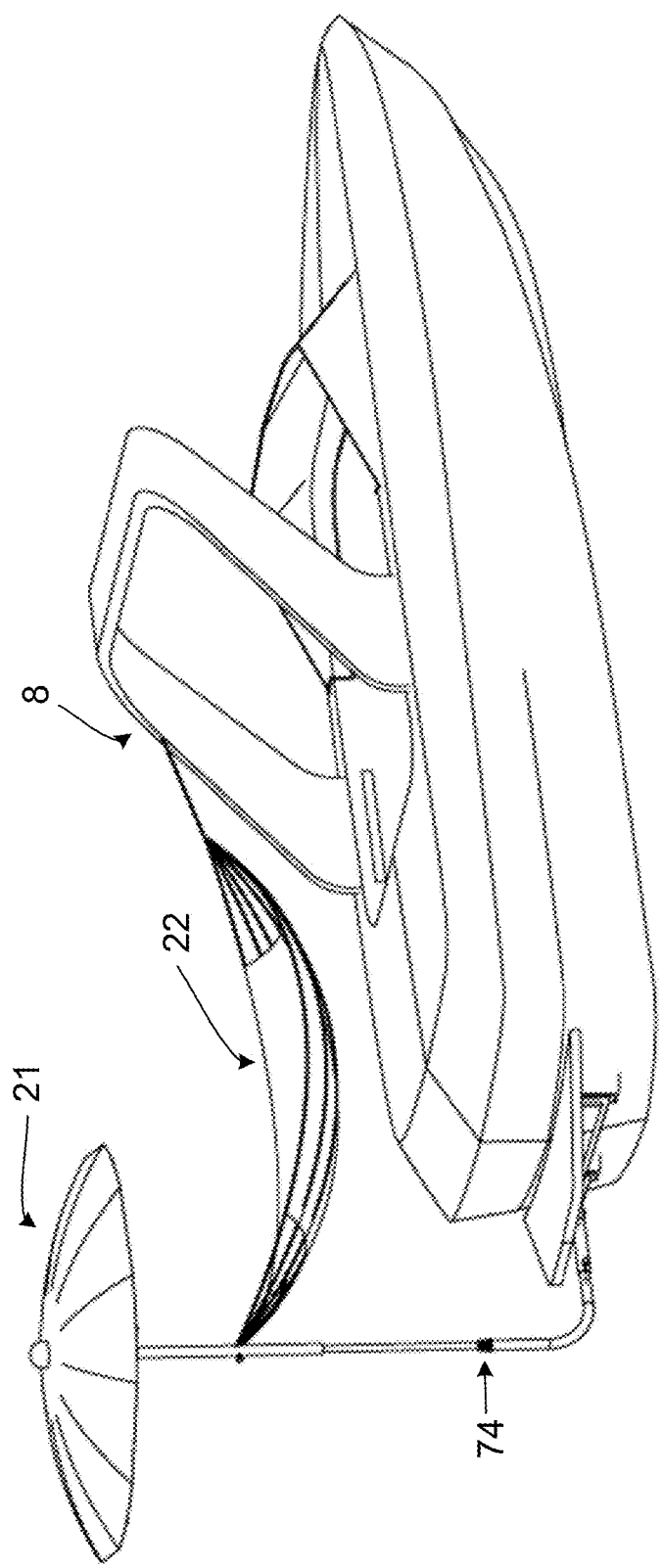
Figure 22C:
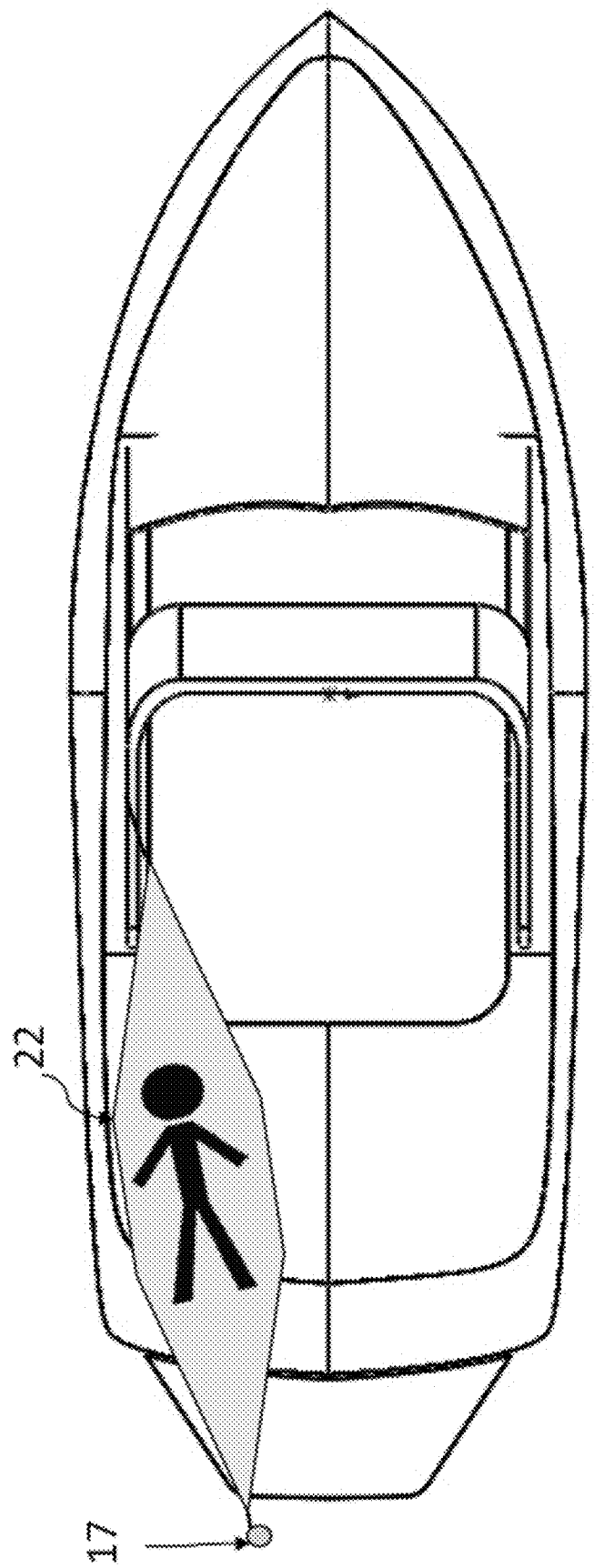
Figure 22D:
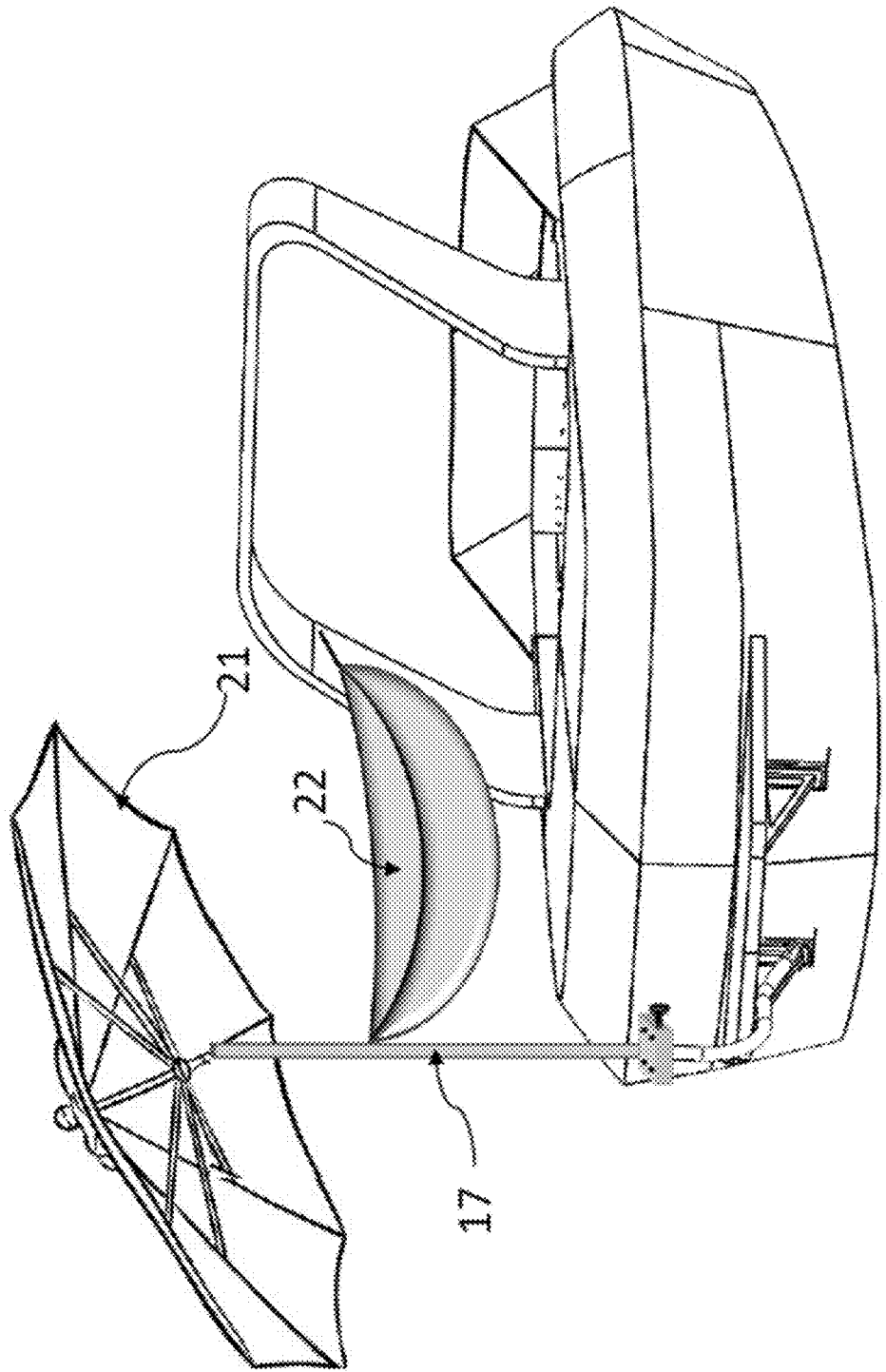

FIGS. 21A-B depict the swim platform accessory mount 9 installed with an accessory adapter extension 17. The accessory adapter extension 17 can be used for accessories that require a higher mounting point than is available by the upper accessory arm 11 when it is extended to the highest point on the accessory arm 10. Examples of the accessories that require the accessory adapter extension 17 are described throughout and only represent a small sample of accessories. The exemplary accessories described herein do not include all possible accessories that can be mounted to the accessory adapter extension 17 using the accessory adapter 12.

As shown in the embodiment depicted in FIG. 21A, the accessory adapter extension 17 connects (e.g., mounts) to the accessory adapter 12. Once secured in place, the accessory adapter extension 17 is stabilized and able to support high stress applications and/or heavy accessories, such as hammocks, canopies, TV stands, camping showers, and other accessories. As depicted in FIG. 21B, the accessory adapter extension 17 can alternatively couple to the accessory arm 10 by the coupler 74, as previously described herein. This configuration also can ensure that the accessory adapter extension 17 is secured in place, stabilized, and able to support high stress applications and/or heavy accessories.

FIGS. 22-23 depict various exemplary embodiments of the swim platform accessory mount 9 installed with the accessory adapter extension 17 and one or more accessories. In FIGS. 22A-D, the umbrella 21 is used in combination with a hammock 22. The umbrella 21 can be used individually or in combination with any accessory of the user's choice. Typically, the stern of the watersport tow boat is not shaded by factory or aftermarket Bimini covers. This is not convenient when the boat is not moving and/or when shade or other protection from weather elements is desired at the stern or the swim platform 2. As a result, the umbrella 21 provides for the ability to shade and/or protect that area of the boat 1. The examples provided herein are only a representative sample and do not include all possible accessories that can be mounted to the accessory adapter extension 17 and/or the accessory adapter 12.

Hammocks are popular and less expensive accessories that people like to use in parks and other land-based locations. More people are interested in putting a hammock on watersport tow boats. The accessory adapter extension 17 provides for the ability to conveniently mount one or two hammocks 22 between the accessory adapter extension 17 and one or two of the boat towers 8.

FIGS. 23A-D depict an exemplary use of the umbrella 21 in combination with a first hammock 22A and a second hammock 22B. In the embodiments depicted in FIGS. 23A-D, the umbrella 21, the first hammock 22A, and the second hammock 22B connect (e.g., attach) to the accessory adapter extension 17. The first hammock 22A then attaches to one boat tower 8A and the second hammock 22B attaches to the other (e.g., second) boat tower 8B. Each of the hammocks 22A and 22B connect (e.g., attach) to the accessory adapter extension 17 using common attachment options that come with the hammocks 22A and 22B. For example, if the hammock 22 comes with ropes that typically attach and secure the hammock 22 around/to a tree trunk, the same ropes can be used to secure the hammock 22 around the accessory adapter extension 17.

Figure 23A:
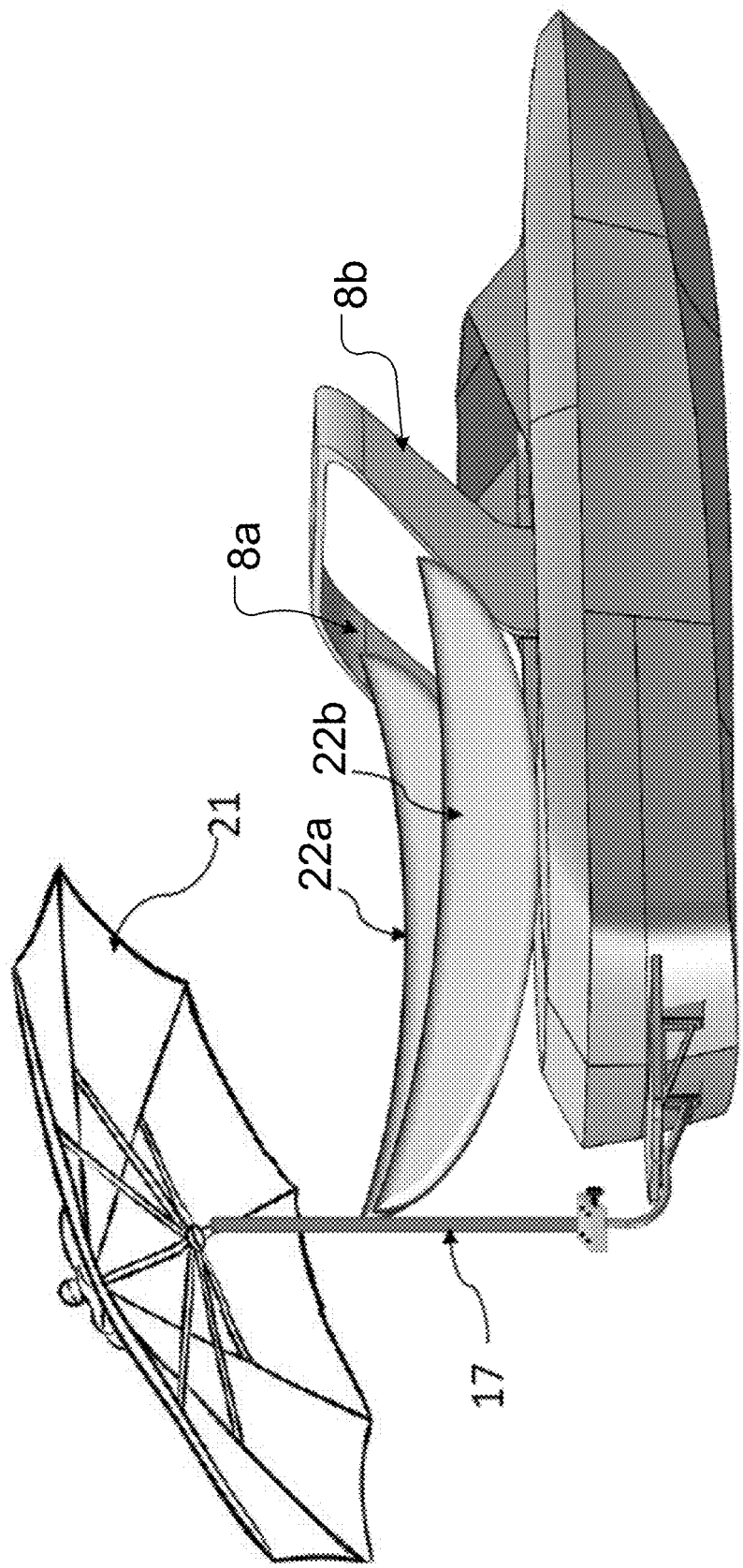
FIGS. 23A-D depict exemplary embodiments of the swim platform accessory mount installed with the accessory adapter extension and one or more accessories.
Figure 23B:
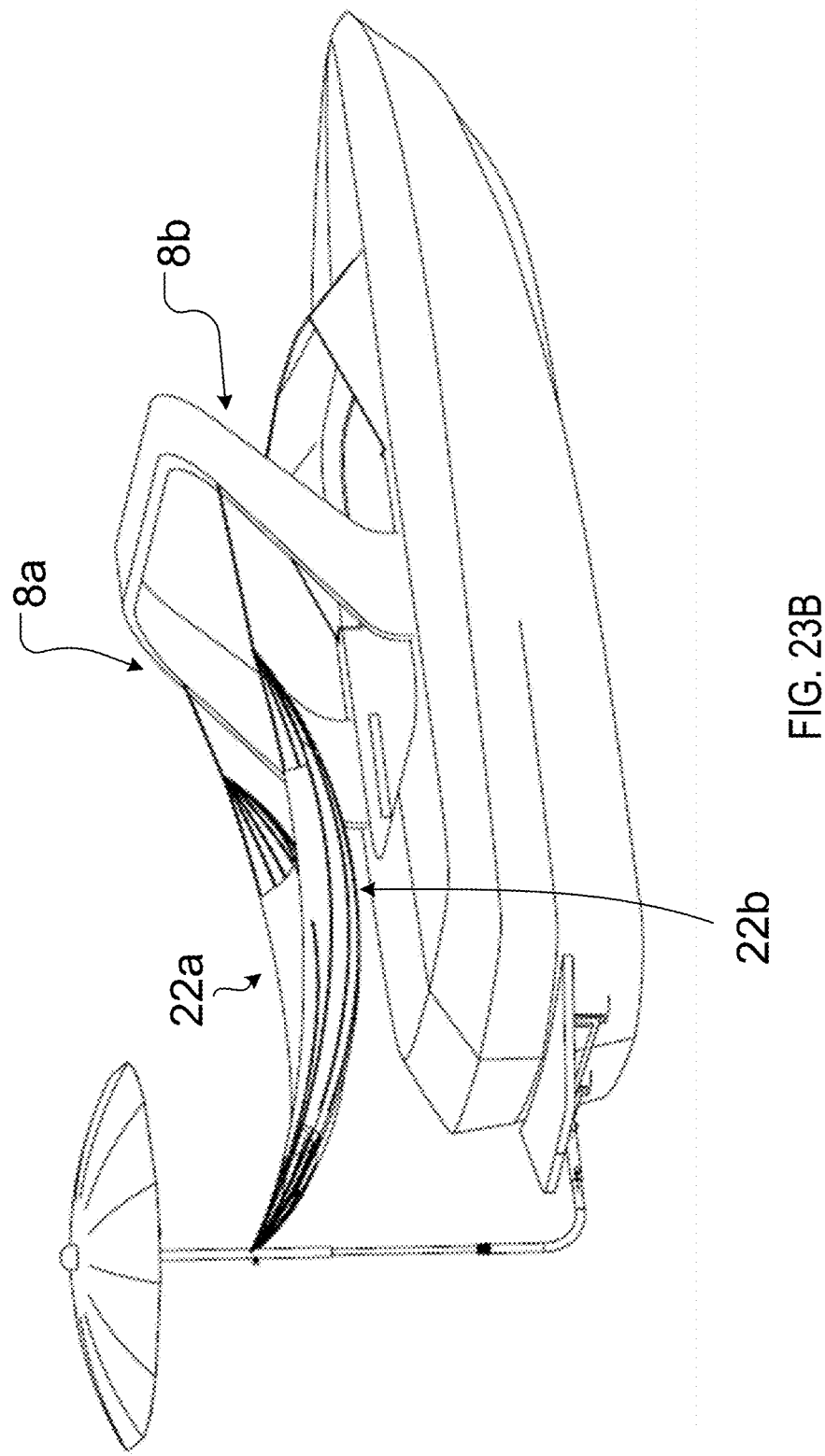
Figure 23C:
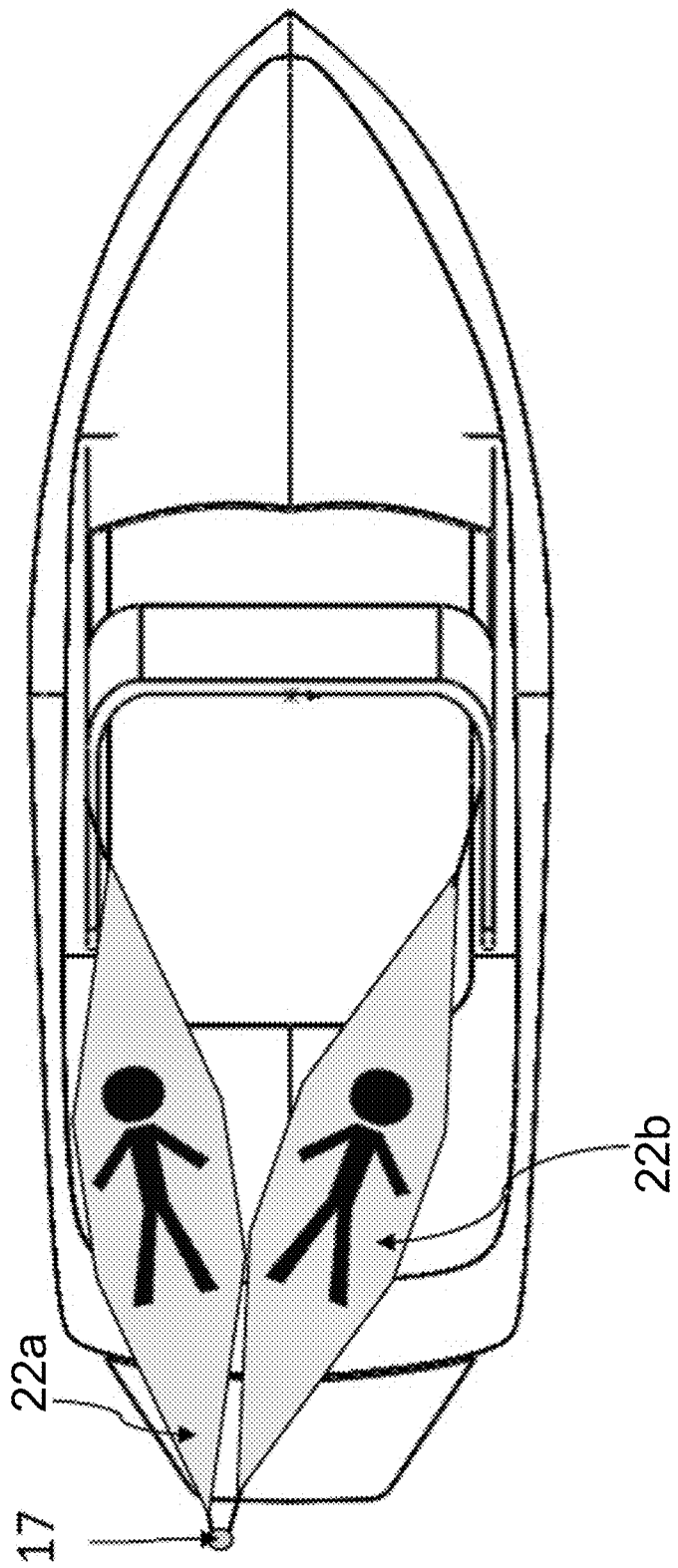

FIG. 23C depicts a top view of an exemplary use of the first hammock 22A and the second hammock 22B. This configuration is the same as previously described.

Figure 23D:
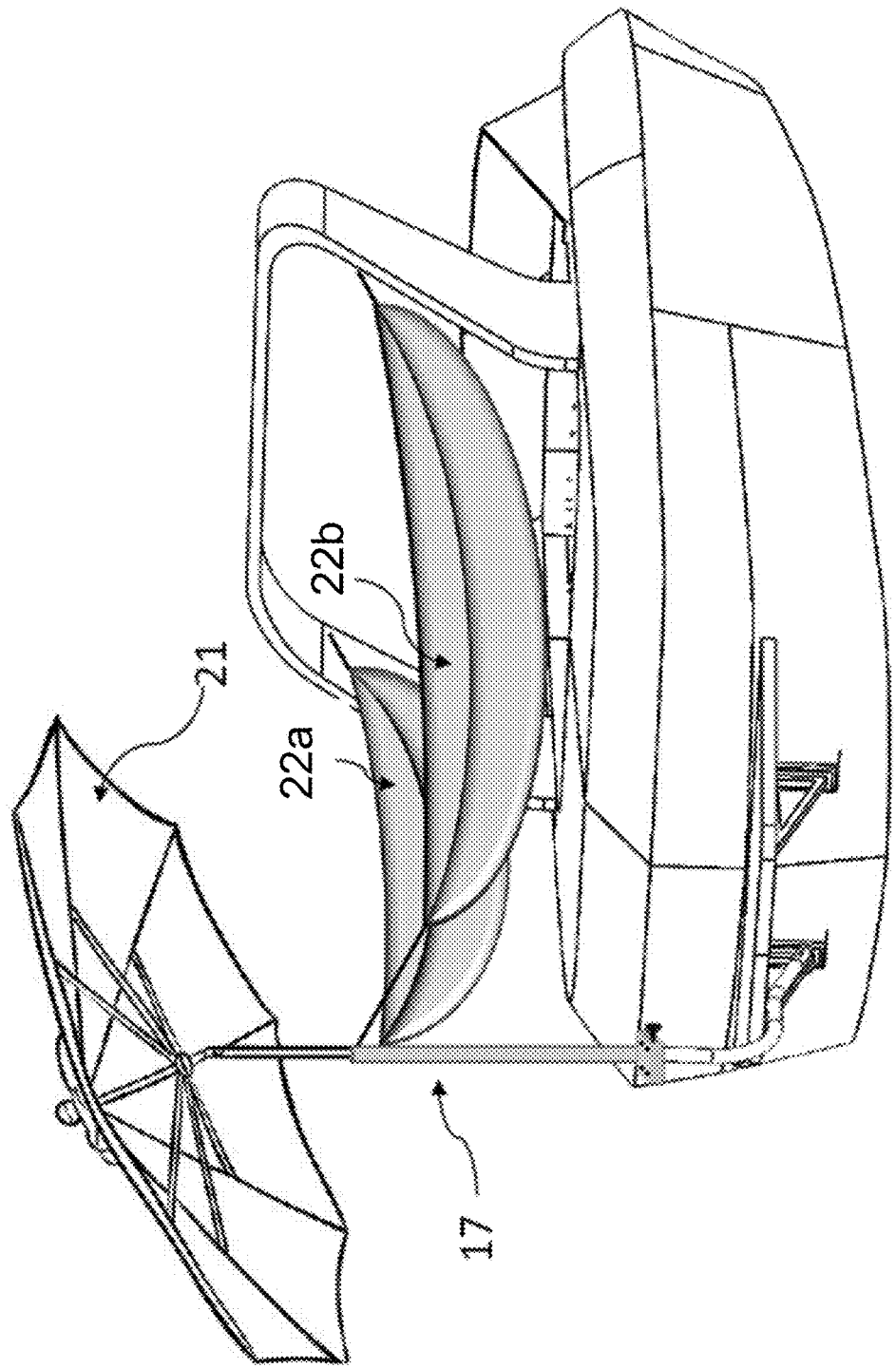

FIG. 23D depicts another view of an exemplary use of the umbrella 21 in combination with the first hammock 22A and the second hammock 22B, as previously described.

Figure 24:
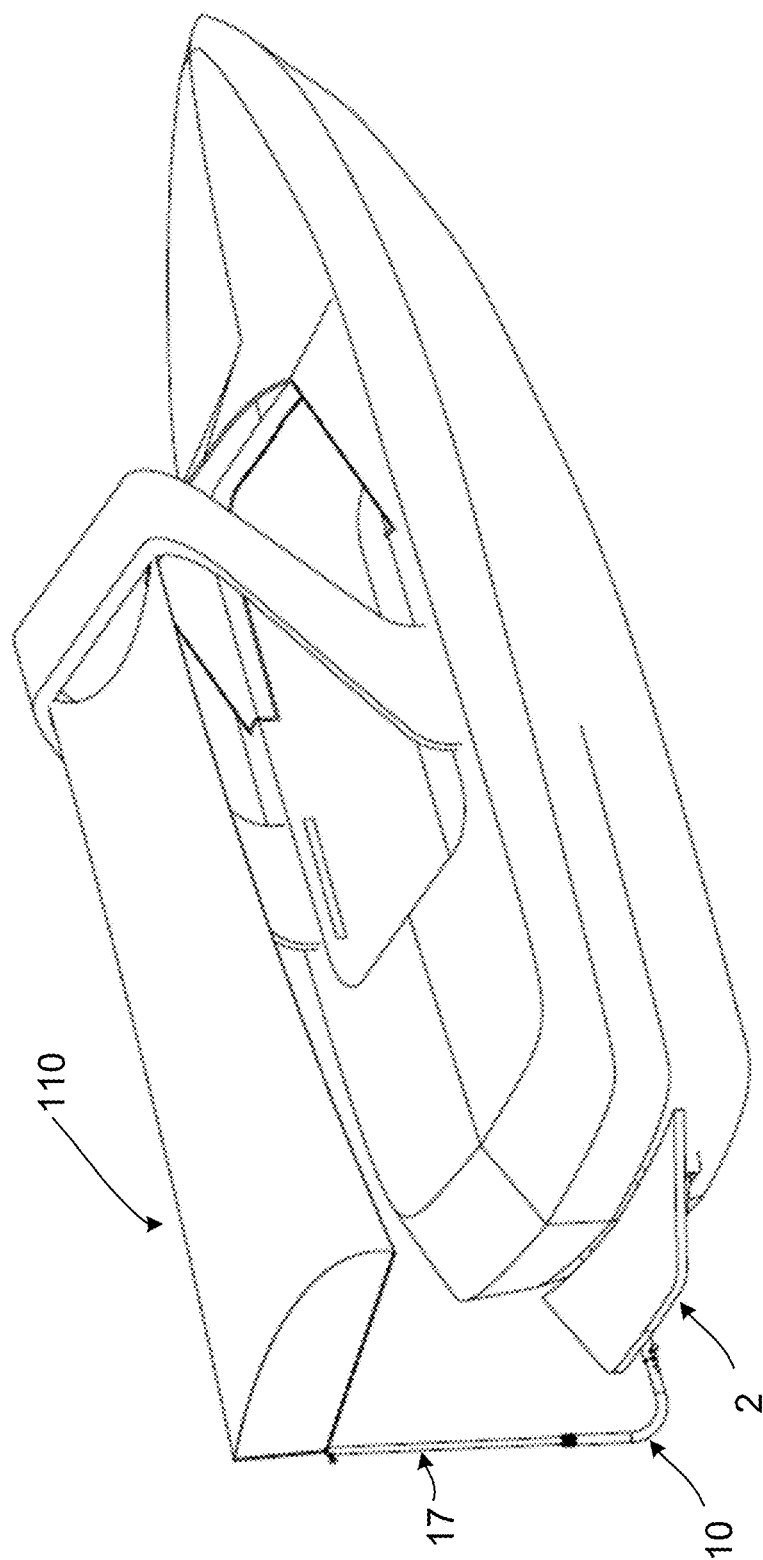
FIG. 24 depicts the swim platform accessory mount installed with the accessory adapter extension and a sun shade accessory.

FIG. 24 depicts the swim platform accessory mount installed with the accessory adapter extension 17 and a sun shade 110. The sun shade 110 can be used in conjunction with at least one of the accessory adapter 12, and/or the accessory arm 10. In the depicted embodiment, the accessory adapter extension 17 is used to extend the height of the accessory arm 10. This sun shade 110 allows a mounting point above and aft of the swim platform 2 in order to provide for shade from the sun and/or protection around that area of the boat while the boat is in use and/or while the user is using the swim platform 2 area. This configuration is advantageous because shade is not normally available on watersport boats in the swim platform 2 area due to lack of features being able to attach to that area of the boat.

FIGS. 25A-E depict the swim platform accessory mount 9 installed with a paddle board rack option 23. The ability to transport one or more paddle boards in watersport tow boats is limited due to a size of the paddle board versus a size of the boat 1. Most paddle boards do not fit in the tower mounted racks (not shown) and cannot be safely stored on top of the Bimini in/under one or more surf straps (not shown). A safe and effective option is to transport one or more paddle boards in the seating area 7, but as a result, the one or more paddle boards occupy all available passenger space.

Figure 25A:
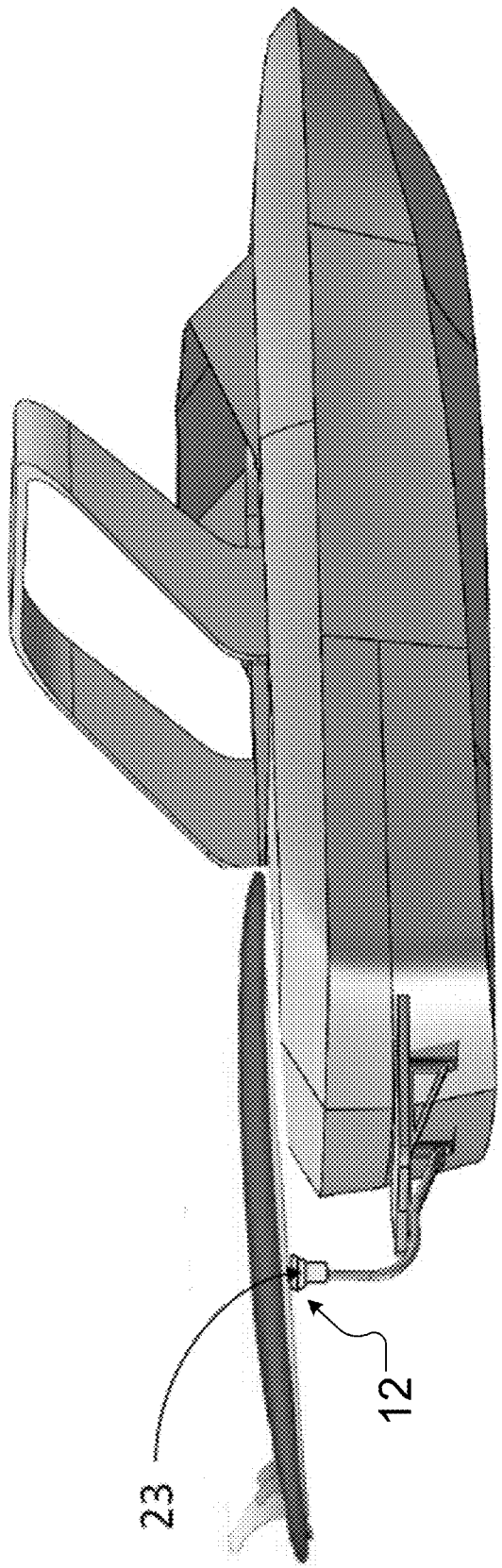
FIGS. 25A-E depict the swim platform accessory mount installed with a paddle board rack option.

In FIG. 25A, the paddle board rack 23 is used to transport a single paddle board. This configuration permits the paddle board to be transported safely without occupying the seating area 7. The paddle board rack 23 can be mounted/attached/installed onto the accessory adapter 12. In other embodiments, the upper accessory arm 11 can be installed in the accessory arm 10 and raised to a particular height before the accessory adapter 12 is attached to the paddle board rack 23, such that the one or more paddle boards can be raised to a height above the stern of the boat and/or the swim platform 2. This type of configuration can permit passengers on board the boat 1 to use the swim platform 2 for all its intended purposes without interference by the paddle board rack 23 or the one or more paddle boards placed on the paddle board rack 23. Additionally, the paddle board rack 23 can be used while other watersport activities are taking place and/or while the boat is being used. There is no need to remove the paddle boards from the paddle board rack 23 and put the one or more boards in any location in the water or on land to be able to partake in other watersport and/or boat activities.

Figure 25B:
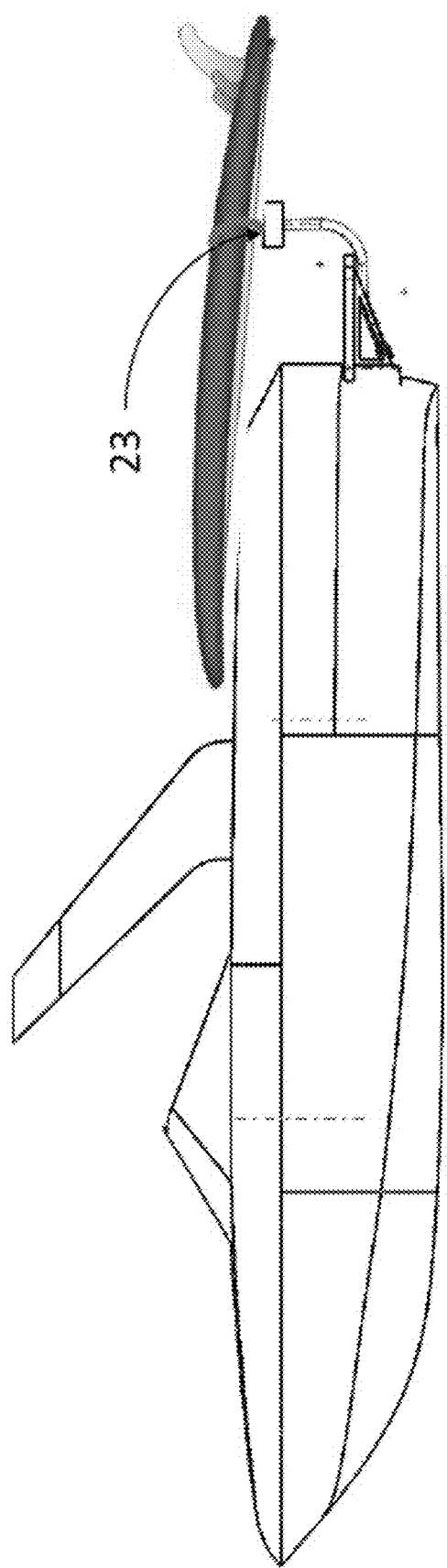

FIG. 25B depicts a side view of an exemplary use of the paddle board rack 23 mounted to the accessory adapter 12 as previously described.

Figure 25C:
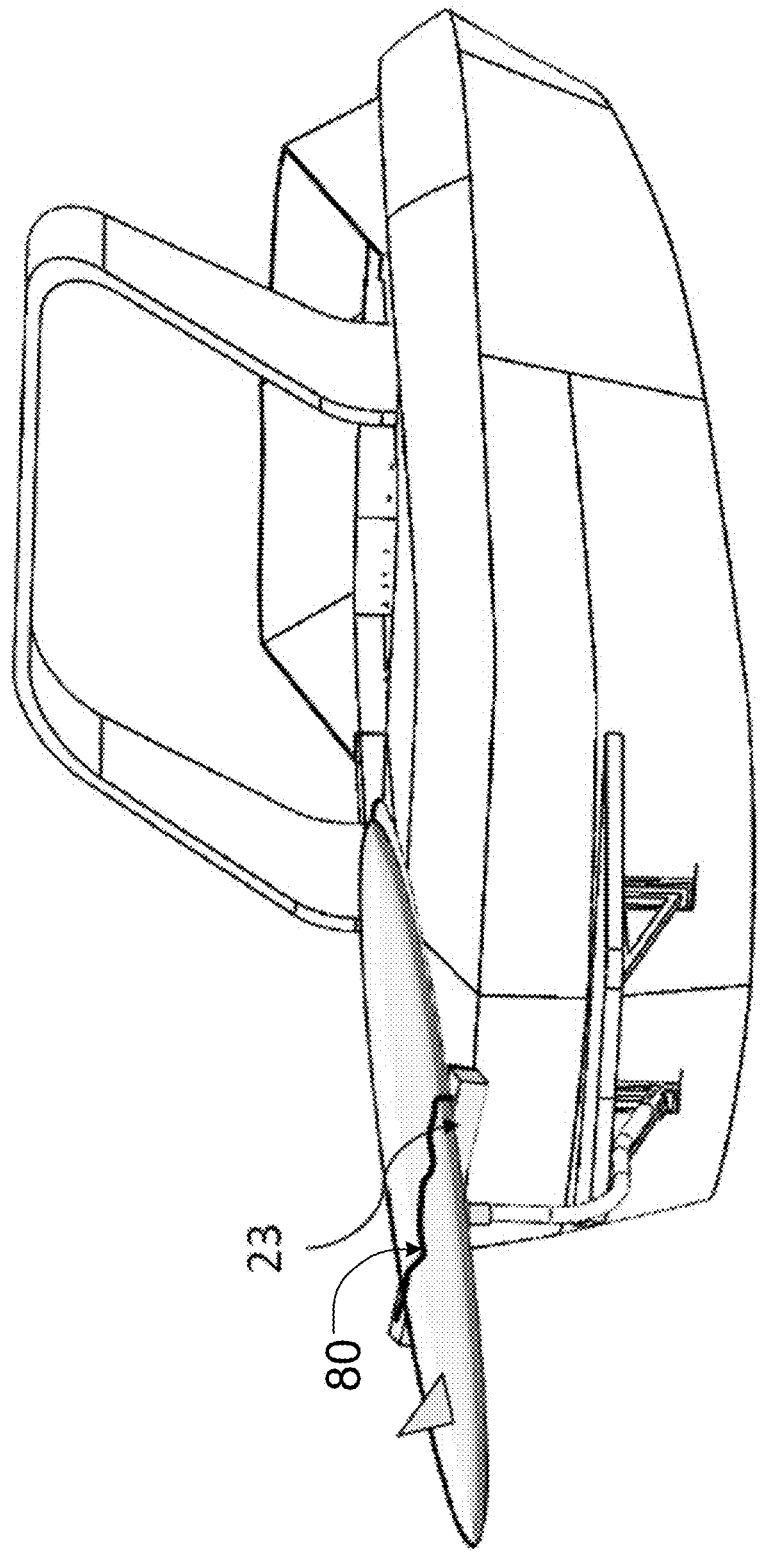

FIG. 25C depicts another view of an exemplary use of the paddle board rack 23 mounted to the accessory adapter 12 as previously described. In this embodiment, the user may choose to secure the paddle board in place with a bungee cord 80 or other type of material/device/rope/string to secure the paddle board in place (e.g., so that it does not move around while the boat is moving and/or still) and transport the paddle board safely. As a result, the paddle board is less likely to move from its position on the paddle board rack 23 while the boat 1 is in use, no matter a speed of the boat 1.

Figure 25D:
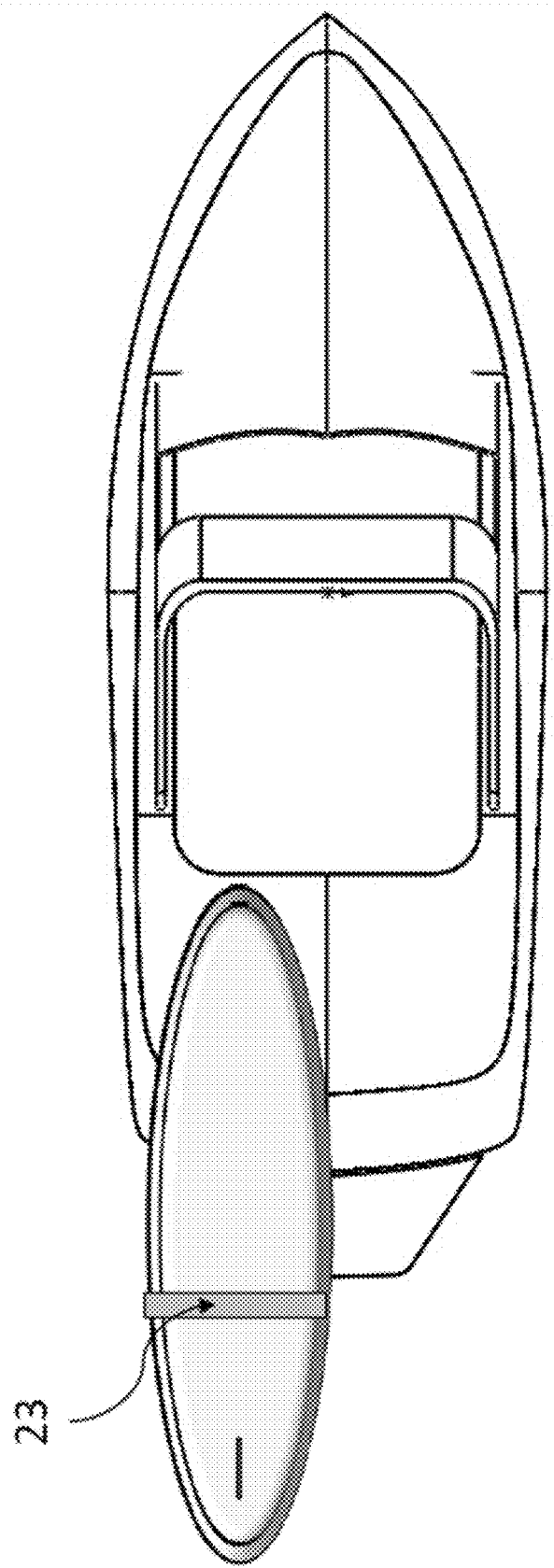

FIG. 25D depicts a top view of an exemplary use of the paddle board rack 23 mounted to the accessory adapter 12 as previously described. In this embodiment, the paddle board rack 23 includes a strap or other material to hold the paddle board in place while the paddle board is on the paddle board rack 23.

Figure 25E:
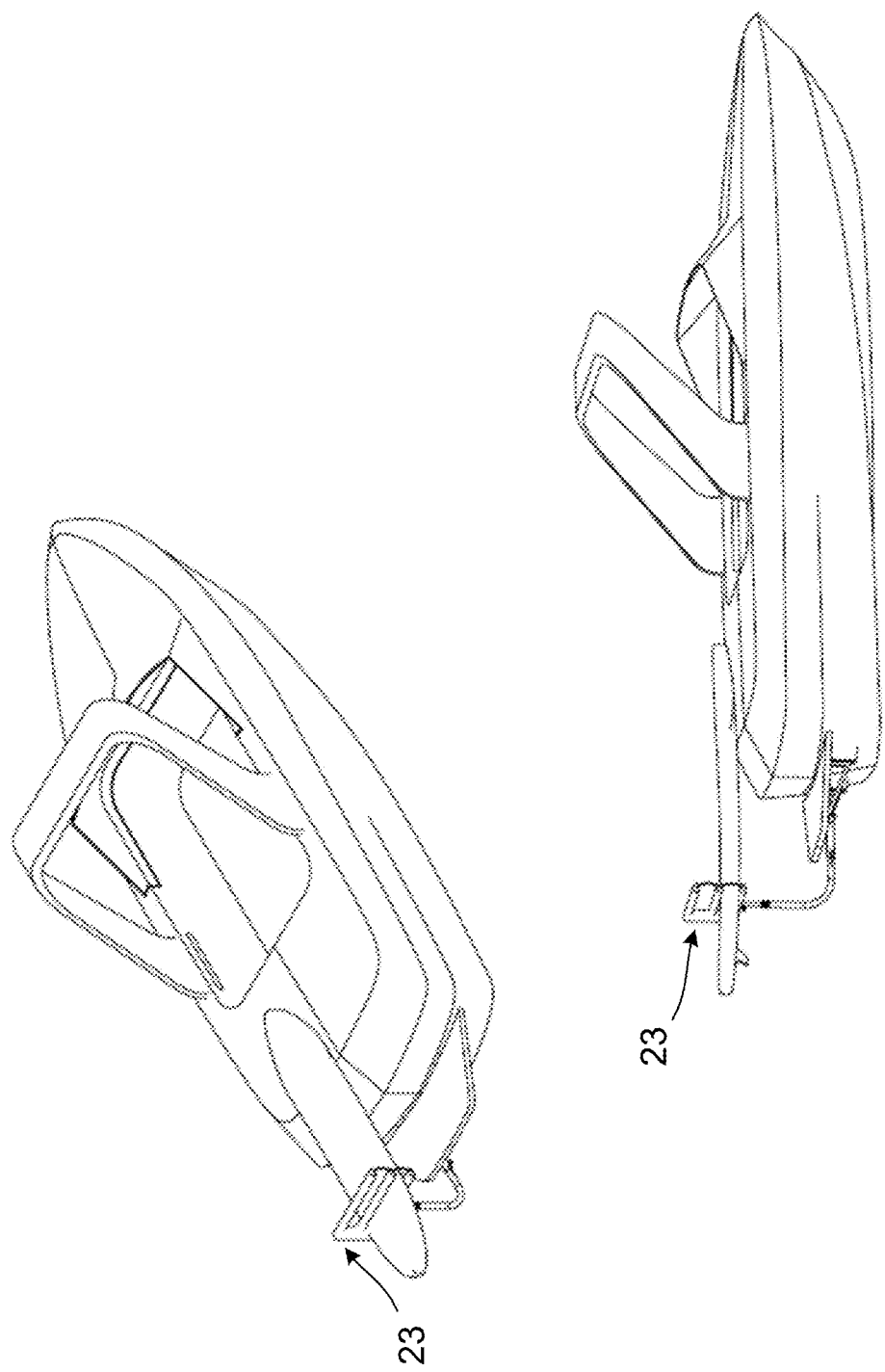

FIG. 25E depicts additional views of an exemplary use of the paddle board rack 23 mounted to the accessory adapter 12, as previously described.

FIGS. 26A-D depict an exemplary use of the paddle board rack 23 and a double paddle board rack 24. The double paddle board rack 24 can be used to allow two or more paddle boards to be transported safely without occupying the seating area 7. The double paddle board rack 24 can be used while the boat is in use and/or while the passengers are engaging in other watersport activities. There is no need to remove the one or more paddle boards from the double paddle board rack 24 and put the paddle boards in any water or land location in order to do other activities in the water and/or onboard the boat.

In this embodiment, the paddle board rack 23 is mounted/secured to the accessory adapter 12. After the first paddle board is placed on the paddle board rack 23, the double paddle board rack 24 is placed on top of the first paddle board. The second paddle board then gets placed on top of the paddle board rack 24, such that the second paddle board does not touch, damage, and/or scrape a surface of the first paddle board. Additionally, the double paddle board rack 24 comprises a material that does not cause damage, scratches, scrapes, or other modifications to the surface of the first paddle board. Finally, bungees 80A, or any other type of securing mechanism (e.g., straps), straps around the first and second paddle boards and attaches to the paddle board rack 23. The securing mechanism 80A ensures an end portion of each of the paddle boards does not interfere with use of the boat and does not interfere with any activities the passengers may be engaging in onboard the boat and/or in the water. Securing mechanism 80B is also tethered/secured around both of the paddle boards and attached to an attachment holder 82. The attachment holder 82 can be optionally placed along a long side of the boat 1 and/or on both long sides of the boat 1. Alternatively, the attachment holder 82 can be placed on only one side of the boat 1. The attachment holder 82 can be secured in place by drilling into the side of the boat 1. Alternatively, the attachment holder 82 can be secured in place using strong, weather/water/salt resistant adhesive/material that keeps the attachment holder 82 securely in place. The adhesive is preferred if the user does not wish to damage or drill or modify the boat 1 in any way.

Figure 26A:
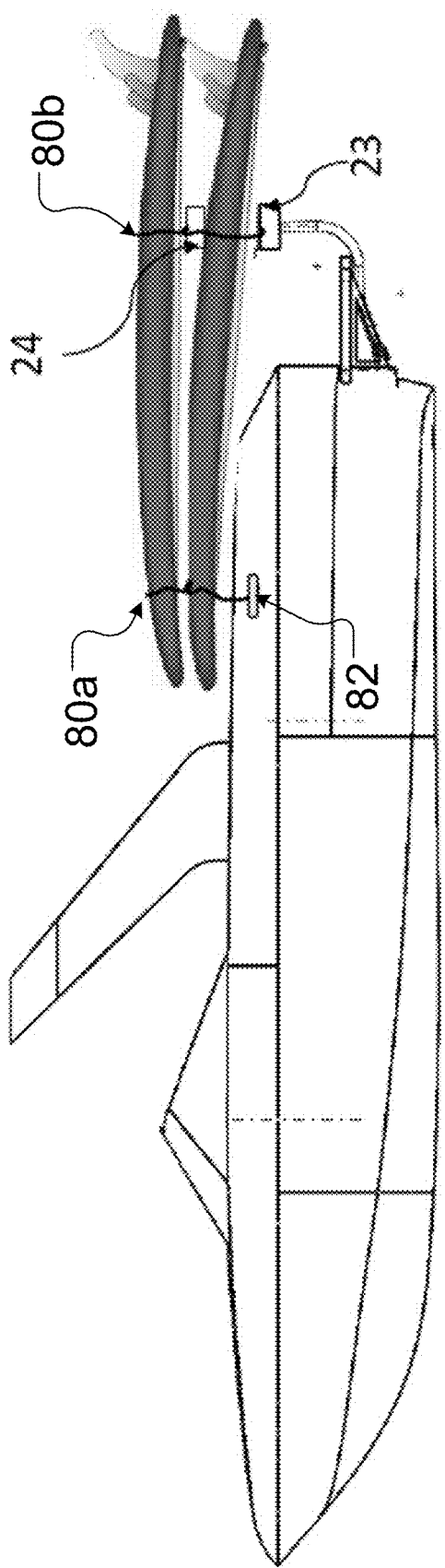
FIGS. 26A-D depict the swim platform accessory mount installed with a double paddle board rack option.
Figure 26B:
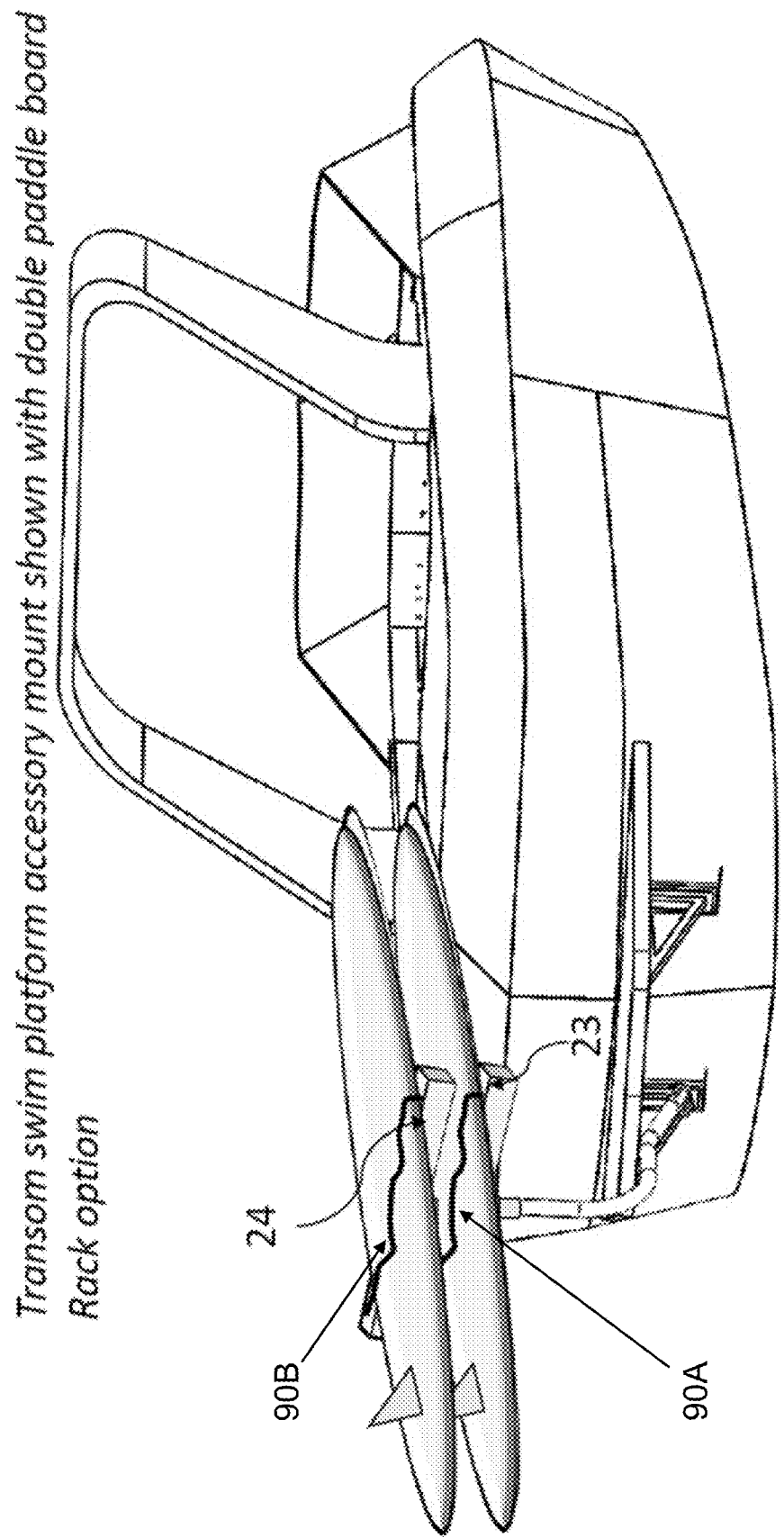

FIG. 26B is another view of an exemplary use of the paddle board rack 23 in combination with the double paddle board rack 24. In this embodiment, a securing mechanism 90A (e.g., bungee, strap) secures the first paddle board into place on the paddle board rack 23, and a second securing mechanism 90B (e.g., bungee, strap) secures the second paddle board into place on the double paddle board rack 24. In this embodiment, the paddle boards are independently secured to their respective racks 23 and 24. Additionally, in this embodiment, the user is not required to drill or modify the boat 1 in any way.

Figure 26C:
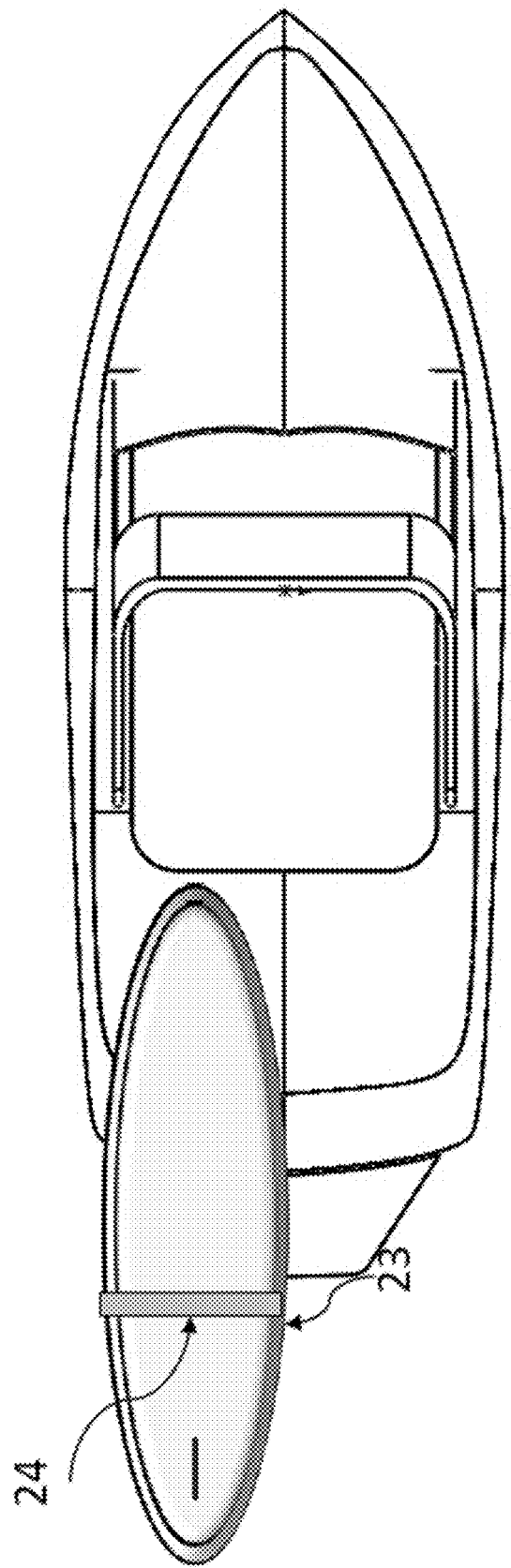
Figure 26D:
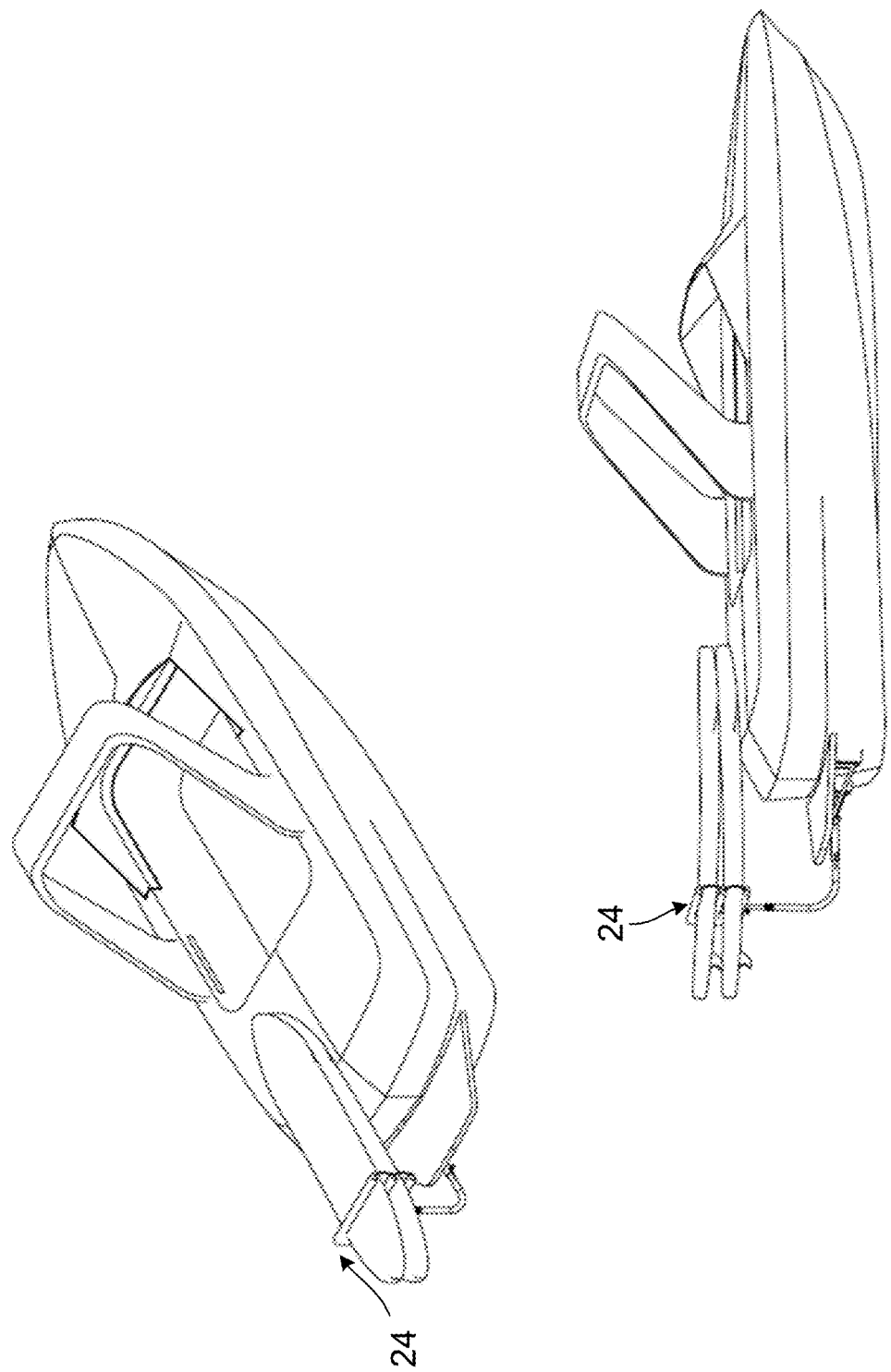

FIG. 26C depicts a top view of an exemplary use of the paddle board rack 23 in combination with the double paddle board rack 24. In this embodiment, the double paddle board rack 24 includes a securing mechanism that wraps around both the first and the second paddle boards and secures them in place. This embodiment does not require the user to drill or modify the boat in any way to secure the paddle boards in place. FIG. 26D depicts additional views of the double paddle board rack 24 as previously described.

Figure 27B:
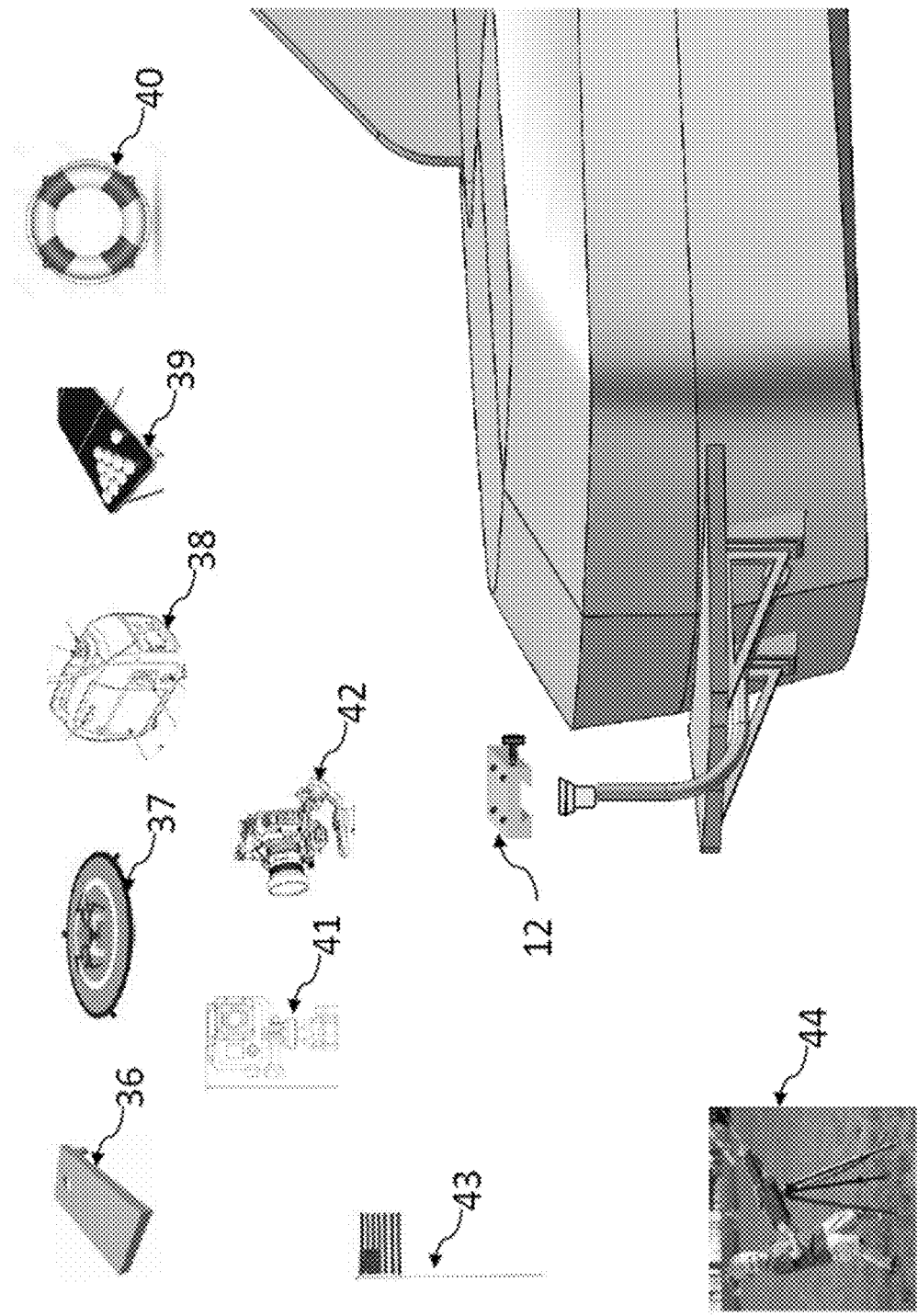

FIGS. 27A-B depict exemplary embodiments of the accessory adapter extension 17 used for various types of activities. In each of these embodiments, different types of accessories can be mounted onto the accessory adapter extension 17. For example, as depicted in FIG. 27A, the user can attach a camp shower 30, a life jacket 31, a shade sail attachment 32, a towel drying rack 33, a camp lantern 34 (e.g., battery and/or gas), and/or a movie screen and projector 35. These are only some examples of accessories that can attach to the accessory adapter extension 17. Other types of accessories not listed can be attached to the accessory adapter extension 17 according to the user's needs and desires.

As depicted in FIG. 27B, the user can attach a cornhole attachment 36, a drone landing pad 37, an electric generator 38, a beer pong table attachment 39, a lifesaving ring attachment 40, a GoPro mount 41, a camera mount 42 (e.g., video and/or photography), a flagpole holder 43, and/or a squirt gun holder 44 (or other watersport toys). Other types of accessories not listed can be attached to the accessory adapter 12 according to the user's needs and desires.

Additional accessories (not shown) that can be attached to the accessory adapter 12 and/or the accessory arm extension 17 include but are not limited to a gas generator, a TV stand, an inflatable outdoor movie screen, a table, seating, a camping bed, a fish cleaning station, a lake sink with or without a food pump, a fishing pole holder, a lantern or other light holder, an inner tube holder, solo water balloon launch arms, a basketball hoop, a camp shower head, a boat dock holder, a gang plank attachment point, a bike rack, a game of bags, and/or any other type of accessory and/or activity that the passengers want to bring onboard the boat and/or use while in the water, surfing, and/or wake boarding.

Moreover, the mounting system described herein can be configured to additional vehicles other than a boat. For example, the mounting system can be applied to trucks (e.g., pickup trucks), cars, ATVs, etc. For example, the accessory arm 10 can couple/secure in place with a straight mount or standard size receiver hitch at the back of a vehicle, such as a pickup truck. For users that tailgate, for example, this configuration is advantageous because the users can attach the mounting system to the hitch of a pickup truck and then attach a grill to the mounting system, thereby allowing the users to easily grill while tailgating. Additional benefits and advantageous from this configuration are apparent according to the disclosure herein.

What is claimed is:

1. An accessory mount system for a watersport tow boat, the accessory mount system comprising:
    a boat mount that is configured to be attached to a boat mounting surface that is adjacent to or part of a swim platform that extends from a rear of the watersport tow boat, wherein the boat mount includes a mounting surface that is configured to be fixedly attached to the boat mounting surface, wherein the boat mount also includes an accessory arm mounting surface, the boat mounting surface comprises a bracket that supports and attaches the swim platform to the boat, the boat mount includes separable top and bottom portions that are configured to extend around and be secured to the bracket, wherein the top portion and the bottom portion of the boat mount are secured around the bracket by one or more screws connecting the top portion and the bottom portion to each other;
    an accessory arm that includes a first end and a second end, wherein the first end is configured to be fixedly attached to the accessory arm mounting surface of the boat mount, wherein the second end is configured to be positioned above a top surface of the swim platform when the accessory arm is attached to the watersport tow boat via the boat mount;
    an extendible portion between the first end and the second end, wherein the extendible portion has at least one of an extendible height along a substantially vertical dimension and is configured to, at least in part, extend above the top surface of the swim platform and an extendible length along a substantially horizontal dimension and is configured to, at least in part, extend underneath a bottom surface of the swim platform; and
    an accessory adapter positioned at the second end of the accessory arm, wherein the accessory adapter includes one or more surfaces configured to support and releasably attach one or more accessories to the watersport tow boat.

2. The accessory mount system of claim 1, wherein the accessory arm mounting surface of the boat mount includes one or more alignment pins that fixedly attached to the boat mount and extend from the accessory arm mounting surface.

3. The accessory mount system of claim 2, wherein the boat mount includes at least two alignment pins that are configured to extend into at least two corresponding alignment apertures defined in the accessory arm to fixedly align the boat mount and the accessory arm.

4. The accessory mount system of claim 2, wherein the accessory arm mounting surface defines a threaded opening that is configured to receive a pin.

5. The accessory mount system of claim 1, wherein the top portion and the bottom portion collectively define a void that is dimensioned to fit the bracket.

6. The accessory mount system of claim 1, wherein the top portion and the bottom portion collectively define a void that is contoured and dimensioned to fit a plurality of differently dimensioned swim platform brackets.

7. The accessory mount system of claim 6, wherein the void is defined with a stepped configuration that is adapted to fit swim platform brackets of different combinations of height and width dimensions.

8. The accessory mount system of claim 1, wherein the accessory arm is configured (i) to extend from the first end along and follow the contour of a boat component to a side of the swim platform and (ii) to extend beyond the side and above of the swim platform to the second end.

9. The accessory mount system of claim 8, wherein:
the boat component comprises a bracket that supports and attaches the swim platform to the boat, and
the side of the swim platform comprises a rear side of the swim platform.

10. The accessory mount system of claim 8, wherein:
the boat component comprises an underside of the swim platform, and
the side of the swim platform comprises a rear side of the swim platform.

11. The accessory mount system of claim 8, wherein:
the boat component comprises a transom of the boat, and
the side of the swim platform comprises a lateral side of the swim platform.

12. The accessory mount system of claim 1, wherein the accessory mount system further comprises the one or more accessories, wherein the one or more accessories include at least one of a grill, an umbrella, a hammock, a storage rack, a camp shower, a life jacket dryer, a shade sail attachment, a towel drying rack, a light, a movie screen, a projector, a table, a game surface, a camera, a drone launching pad, and an accessory extension that extends from the accessory adapter.

13. The accessory mount system of claim 1, wherein the accessory arm includes a second extendible portion between the first and the second end, the second extendible portion having an extendible length along a substantially horizontal dimension and being configured to, at least in part, extend underneath a bottom surface of the swim platform.

14. The accessory mount system of claim 1, wherein the accessory mount system further comprises the one or more accessories, wherein the one or more accessories includes a grill.

15. An accessory mount system for a watersport tow boat, the accessory mount system comprising:

a boat mount that is configured to be attached to a boat mounting surface that is adjacent to or part of a swim platform that extends from a rear of the watersport tow boat, wherein the boat mount includes a mounting surface that is configured to be fixedly attached to the boat mounting surface, wherein the boat mount also includes an accessory arm mounting surface, the boat mounting surface comprises a bracket that supports and attaches the swim platform to the boat, the boat mount includes separable top and bottom portions that are configured to extend around and be secured to the bracket, wherein the boat mount is secured to the bracket without the use of any components being screwed into the bracket;

an accessory arm that includes a first end and a second end, wherein the first end is configured to be fixedly attached to the accessory arm mounting surface of the boat mount, wherein the second end is configured to be positioned above a top surface of the swim platform when the accessory arm is attached to the watersport tow boat via the boat mount;

an extendible portion between the first end and the second end, wherein the extendible portion has at least one of an extendible height along a substantially vertical dimension and is configured to, at least in part, extend above the top surface of the swim platform and an extendible length along a substantially horizontal dimension and is configured to, at least in part, extend underneath a bottom surface of the swim platform; and an accessory adapter positioned at the second end of the accessory arm, wherein the accessory adapter includes one or more surfaces configured to support and releasably attach one or more accessories to the watersport tow boat.

16. The accessory mount system of claim 15, wherein the accessory arm is configured (i) to extend from the first end along and follow the contour of a boat component to a side of the swim platform and (ii) to extend beyond the side and above of the swim platform to the second end.

17. The accessory mount system of claim 15, wherein the accessory mount system further comprises the one or more accessories, wherein the one or more accessories includes a grill.

18. An accessory mount system for a watersport tow boat, the accessory mount system comprising:

a boat mount that is configured to be attached to a boat mounting surface that is adjacent to or part of a swim platform that extends from a rear of the watersport tow boat, wherein the boat mount includes a mounting surface that is configured to be fixedly attached to the boat mounting surface, wherein the boat mount also includes an accessory arm mounting surface, the boat mounting surface comprises a solid bracket that supports and attaches the swim platform to the boat, wherein the boat mount is screwed into the solid bracket;

an accessory arm that includes a first end and a second end, wherein the first end is configured to be fixedly attached to the accessory arm mounting surface of the boat mount, wherein the second end is configured to be positioned above a top surface of the swim platform when the accessory arm is attached to the watersport tow boat via the boat mount;

an extendible portion between the first end and the second end, wherein the extendible portion has at least one of an extendible height along a substantially vertical dimension and is configured to, at least in part, extend above the top surface of the swim platform and an extendible length along a substantially horizontal dimension and is configured to, at least in part, extend underneath a bottom surface of the swim platform; and an accessory adapter positioned at the second end of the accessory arm, wherein the accessory adapter includes one or more surfaces configured to support and releasably attach one or more accessories to the watersport tow boat.

19. The accessory mount system of claim 18, wherein the accessory arm is configured (i) to extend from the first end along and follow the contour of a boat component to a side of the swim platform and (ii) to extend beyond the side and above of the swim platform to the second end.

20. The accessory mount system of claim 18, wherein the accessory mount system further comprises the one or more accessories, wherein the one or more accessories includes a grill.

21. An accessory mount system for a watersport tow boat, the accessory mount system comprising:

a boat mount that is configured to be attached to a boat mounting surface that is adjacent to or part of a swim platform that extends from a rear of the watersport tow boat, wherein the boat mount includes a mounting surface that is configured to be fixedly attached to the boat mounting surface, wherein the boat mount also includes an accessory arm mounting surface, the boat mounting surface comprises the swim platform, wherein the boat mount is screwed into an underside of the swim platform;

an accessory arm that includes a first end and a second end, wherein the first end is configured to be fixedly attached to the accessory arm mounting surface of the boat mount, wherein the second end is configured to be positioned above a top surface of the swim platform when the accessory arm is attached to the watersport tow boat via the boat mount;

an extendible portion between the first end and the second end, wherein the extendible portion has at least one of an extendible height along a substantially vertical dimension and is configured to, at least in part, extend above the top surface of the swim platform and an extendible length along a substantially horizontal dimension and is configured to, at least in part, extend underneath a bottom surface of the swim platform; and an accessory adapter positioned at the second end of the accessory arm, wherein the accessory adapter includes one or more surfaces configured to support and releasably attach one or more accessories to the watersport tow boat.

22. The accessory mount system of claim 21, wherein the accessory arm is configured (i) to extend from the first end along and follow the contour of a boat component to a side of the swim platform and (ii) to extend beyond the side and above of the swim platform to the second end.

23. The accessory mount system of claim 21, wherein the accessory mount system further comprises the one or more accessories, wherein the one or more accessories includes a grill.

24. An accessory mount system for a watersport tow boat, the accessory mount system comprising:

a boat mount that is configured to be attached to a boat mounting surface that is adjacent to or part of a swim platform that extends from a rear of the watersport tow boat, wherein the boat mount includes a mounting surface that is configured to be fixedly attached to the boat mounting surface, wherein the boat mount also includes an accessory arm mounting surface, the boat mounting surface comprises the swim platform, wherein the boat mount comprises a platform clamp mount that is secured to the swim platform with a clamp without the use of any components being screwed into the swim platform;

an accessory arm that includes a first end and a second end, wherein the first end is configured to be fixedly attached to the accessory arm mounting surface of the boat mount, wherein the second end is configured to be positioned above a top surface of the swim platform when the accessory arm is attached to the watersport tow boat via the boat mount;

an extendible portion between the first end and the second end, wherein the extendible portion has at least one of an extendible height along a substantially vertical dimension and is configured to, at least in part, extend above the top surface of the swim platform and an extendible length along a substantially horizontal dimension and is configured to, at least in part, extend underneath a bottom surface of the swim platform; and an accessory adapter positioned at the second end of the accessory arm, wherein the accessory adapter includes one or more surfaces configured to support and releasably attach one or more accessories to the watersport tow boat.

25. The accessory mount system of claim 24, wherein the accessory mount system further comprises the one or more accessories, wherein the one or more accessories includes a grill.

26. The accessory mount system of claim 24, wherein the accessory mount system further comprises the one or more accessories, wherein the one or more accessories include a grill and an umbrella.

27. An accessory mount system for a watersport tow boat, the accessory mount system comprising:

a boat mount that is configured to be attached to a boat mounting surface that is adjacent to or part of a swim platform that extends from a rear of the watersport tow boat, wherein the boat mount includes a mounting surface that is configured to be fixedly attached to the boat mounting surface, wherein the boat mount also includes an accessory arm mounting surface, the boat mounting surface comprises a transom of the boat, wherein the boat mount is screwed into the transom;

an accessory arm that includes a first end and a second end, wherein the first end is configured to be fixedly attached to the accessory arm mounting surface of the boat mount, wherein the second end is configured to be positioned above a top surface of the swim platform when the accessory arm is attached to the watersport tow boat via the boat mount;

an extendible portion between the first end and the second end, wherein the extendible portion has at least one of an extendible height along a substantially vertical dimension and is configured to, at least in part, extend above the top surface of the swim platform and an extendible length along a substantially horizontal dimension and is configured to, at least in part, extend underneath a bottom surface of the swim platform; and an accessory adapter positioned at the second end of the accessory arm, wherein the accessory adapter includes one or more surfaces configured to support and releasably attach one or more accessories to the watersport tow boat.

28. The accessory mount system of claim 27, wherein the accessory arm is configured (i) to extend from the first end along and follow the contour of a boat component to a side of the swim platform and (ii) to extend beyond the side and above of the swim platform to the second end.

29. The accessory mount system of claim 27, wherein the accessory mount system further comprises the one or more accessories, wherein the one or more accessories includes a grill.

* * * * *